(12) United States Patent
Murray et al.

(10) Patent No.: US 10,739,534 B2
(45) Date of Patent: Aug. 11, 2020

(54) FIBER OPTIC CASSETTE

(71) Applicants: CommScope Technologies LLC, Hickory, NC (US); CommScope Asia Holdings B.V., Bussum (NL); CommScope Connectivity Spain, S.L., Alcobendas—Madrid (ES); CommScope Connectivity UK Limited, Dorcan, Swindon (GB)

(72) Inventors: David P. Murray, Bristol (GB); Ton Bolhaar, BP Ophemert (NL); Paul Schneider, Germonde (NL); Rafael Mateo, Barcelona (ES); Luis Cobacho, Barcelona (ES); Michael Wentworth, Belle Plaine, MN (US); Steven J. Brandt, Savage, MN (US); Marcellus P J Buijs, ET Ede (NL); Alexander Dorrestein, NR Helmond (NL); Jan Willem Rietveld, Benschop (NL)

(73) Assignees: CommScope Technologies LLC, Hickory, NC (US); CommScope Asia Holdings B.V., Bussum (NL); CommScope Connectivity Spain, S.L., Alcobendas-Madrid (ES); CommScope Connectivity UK Limited, Dorcan (GB)

(*) Notice: Subject to any disclaimer, the term of this patent is extended or adjusted under 35 U.S.C. 154(b) by 0 days.

(21) Appl. No.: 16/416,479

(22) Filed: May 20, 2019

(65) Prior Publication Data

US 2019/0339465 A1 Nov. 7, 2019

Related U.S. Application Data

(63) Continuation of application No. 15/898,760, filed on Feb. 19, 2018, now Pat. No. 10,295,761, which is a
(Continued)

(51) Int. Cl.
*G02B 6/38* (2006.01)
*G02B 6/44* (2006.01)
(Continued)

(52) U.S. Cl.
CPC ......... *G02B 6/3897* (2013.01); *G02B 6/3608* (2013.01); *G02B 6/387* (2013.01);
(Continued)

(58) Field of Classification Search
CPC .......................... G02B 6/3897; G02B 6/3608
See application file for complete search history.

(56) References Cited

U.S. PATENT DOCUMENTS 4,697,874 A 10/1987 Nozick
4,733,936 A 3/1988 Mikolaicyk et al.
(Continued)

FOREIGN PATENT DOCUMENTS

CN 102272650 12/2011
EP 0587336 A2 3/1994
(Continued)

OTHER PUBLICATIONS

International Search Report for International Application No. PCT/US2013/061662 dated Jan. 22, 2014 (2 pages).
(Continued)

*Primary Examiner* — Sung H Pak
(74) *Attorney, Agent, or Firm* — Merchant & Gould P.C.

(57) ABSTRACT

A fiber optic cassette includes a body defining a front and an opposite rear. A cable entry location is defined on the body for a cable to enter the cassette, wherein a plurality of optical fibers from the cable extend into the cassette and form terminations at non-conventional connectors adjacent the front of the body. A flexible substrate is positioned between the cable entry location and the non-conventional connectors adjacent the front of the body, the flexible substrate rigidly
(Continued)

supporting the plurality of optical fibers. Each of the non-conventional connectors adjacent the front of the body includes a ferrule, a ferrule hub supporting the ferrule, and a split sleeve surrounding the ferrule.

23 Claims, 64 Drawing Sheets

Related U.S. Application Data continuation of application No. 15/299,768, filed on Oct. 21, 2016, now Pat. No. 9,897,767, which is a continuation of application No. 14/432,013, filed as application No. PCT/US2013/061662 on Sep. 25, 2013, now Pat. No. 9,488,788.

(60) Provisional application No. 61/707,323, filed on Sep. 28, 2012.

(51) Int. Cl.
 G02B 6/36 (2006.01)
 G02B 6/42 (2006.01)
 G02B 6/40 (2006.01)

(52) U.S. Cl.
 CPC ......... *G02B 6/3821* (2013.01); *G02B 6/3825* (2013.01); *G02B 6/3855* (2013.01); *G02B 6/3869* (2013.01); *G02B 6/3877* (2013.01); *G02B 6/3879* (2013.01); *G02B 6/4281* (2013.01); *G02B 6/4453* (2013.01); *G02B 6/4471* (2013.01); *G02B 6/4478* (2013.01); *G02B 6/40* (2013.01); *Y10T 29/49954* (2015.01)

(56) References Cited

U.S. PATENT DOCUMENTS

| | | | |
|---|---|---|---|
| 4,840,449 A | 6/1989 | Ghandeharizadeh |
| 4,989,946 A | 2/1991 | Williams et al. |
| 5,155,785 A | 10/1992 | Holland et al. |
| 5,204,925 A | 4/1993 | Bonanni et al. |
| 5,292,390 A | 3/1994 | Burack et al. |
| 5,327,513 A | 7/1994 | Nguyen et al. |
| 5,430,823 A | 7/1995 | Dupont et al. |
| 5,438,641 A | 8/1995 | Malacarne |
| 5,461,690 A | 10/1995 | Lampert |
| 5,509,096 A | 4/1996 | Easley |
| 5,530,783 A | 6/1996 | Belopolsky et al. |
| 5,613,030 A | 3/1997 | Hoffer et al. |
| 5,636,310 A | 6/1997 | Walles |
| 5,655,044 A | 8/1997 | Finzel et al. |
| 5,664,037 A | 9/1997 | Weidman |
| 5,734,777 A | 3/1998 | Merriken et al. |
| 5,742,480 A | 4/1998 | Sawada et al. |
| 5,878,179 A | 3/1999 | Schricker |
| 5,889,910 A | 3/1999 | Igl et al. |
| 5,966,492 A | 10/1999 | Bechamps et al. |
| 5,970,196 A | 10/1999 | Greveling et al. |
| 5,971,626 A | 10/1999 | Knodell et al. |
| 5,974,214 A | 10/1999 | Shacklette et al. |
| 5,975,769 A | 11/1999 | Larson et al. |
| 5,981,064 A | 11/1999 | Burack et al. |
| 6,005,991 A | 12/1999 | Knasel |
| 6,012,852 A | 1/2000 | Kadar-Kallen et al. |
| 6,022,150 A | 2/2000 | Erdman et al. |
| 6,027,252 A | 2/2000 | Erdman et al. |
| 6,208,779 B1 | 3/2001 | Rowlette, Sr. et al. |
| 6,215,938 B1 | 4/2001 | Reitmeier et al. |
| 6,224,269 B1 | 5/2001 | Engstrand et al. |
| 6,226,431 B1 | 5/2001 | Brown et al. |
| 6,229,933 B1 | 5/2001 | Curzio et al. |
| 6,259,844 B1 | 7/2001 | Logan et al. |
| 6,269,214 B1 | 7/2001 | Naudin et al. |
| 6,301,413 B1 | 10/2001 | Bringuier |
| 6,351,590 B1 | 2/2002 | Shahid |
| 6,356,690 B1 | 3/2002 | McAlpine et al. |
| 6,377,738 B1 | 4/2002 | Anderson et al. |
| 6,442,323 B1 | 8/2002 | Sorosiak |
| 6,445,866 B1 | 9/2002 | Clairadin et al. |
| 6,464,404 B1 | 10/2002 | Robinson et al. |
| 6,480,661 B2 | 11/2002 | Kadar-Kallen et al. |
| 6,496,638 B1 | 12/2002 | Andersen |
| 6,510,273 B2 | 1/2003 | Ali et al. |
| 6,554,483 B1 | 4/2003 | Sun et al. |
| 6,573,451 B2 | 6/2003 | Komiya et al. |
| 6,594,434 B1 | 7/2003 | Davidson et al. |
| 6,594,436 B2 | 7/2003 | Sun et al. |
| 6,600,860 B2 | 7/2003 | Sun et al. |
| 6,600,866 B2 | 7/2003 | Gatica et al. |
| 6,619,853 B2 | 9/2003 | Grois et al. |
| 6,648,376 B2 | 11/2003 | Christianson |
| 6,668,124 B2 | 12/2003 | Kondo et al. |
| 6,690,862 B1 | 2/2004 | Rietveld |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,808,444 B1 | 10/2004 | Kuprin et al. |
| 6,810,193 B1 | 10/2004 | Mueller |
| 6,845,208 B2 | 1/2005 | Thibault et al. |
| 6,850,671 B2 | 2/2005 | Carnevale et al. |
| 6,865,330 B2 | 3/2005 | Lecomte et al. |
| 6,873,773 B2 | 3/2005 | Sun et al. |
| 6,925,241 B2 | 8/2005 | Bohle et al. |
| 6,934,457 B2 | 8/2005 | Vincent et al. |
| H002144 H | 2/2006 | Baechtle et al. |
| 7,006,748 B2 | 2/2006 | Dagley et al. |
| 7,068,907 B2 | 6/2006 | Schray |
| 7,092,592 B2 | 8/2006 | Verhagen et al. |
| 7,113,686 B2 | 9/2006 | Bellekens et al. |
| 7,130,498 B2 | 10/2006 | Meis et al. |
| 7,233,712 B2 | 6/2007 | Arellano |
| 7,302,153 B2 | 11/2007 | Thom |
| 7,406,240 B2 | 7/2008 | Murano |
| 7,433,915 B2 | 10/2008 | Edwards et al. |
| 7,460,757 B2 | 12/2008 | Hoehne et al. |
| 7,496,268 B2 | 2/2009 | Escoto et al. |
| 7,543,993 B2 | 6/2009 | Blauvelt et al. |
| 7,553,091 B2 | 6/2009 | McColloch |
| 7,668,427 B2 | 2/2010 | Register |
| 7,689,089 B2 | 3/2010 | Wagner et al. |
| 7,706,656 B2 | 4/2010 | Zimmel |
| 7,722,261 B2 | 5/2010 | Kadar-Kallen et al. |
| 7,738,755 B2 | 6/2010 | Shioda |
| 7,738,760 B2 | 6/2010 | Fredrickson et al. |
| 7,747,125 B1 | 6/2010 | Lee et al. |
| 7,751,674 B2 | 7/2010 | Hill |
| 7,756,371 B1 | 7/2010 | Burnham et al. |
| 7,775,725 B2 | 8/2010 | Grinderslev |
| 7,856,166 B2 | 12/2010 | Biribuze et al. |
| 7,889,961 B2 | 2/2011 | Cote et al. |
| 7,942,004 B2 | 5/2011 | Hodder |
| 7,945,138 B2 | 5/2011 | Hill et al. |
| 8,041,221 B2 | 10/2011 | Elberbaum |
| 8,059,932 B2 | 11/2011 | Hill et al. |
| 8,078,017 B2 | 12/2011 | Kodama et al. |
| 8,085,472 B2 | 12/2011 | Kadar-Kallen |
| 8,184,938 B2 | 5/2012 | Cooke et al. |
| 8,280,205 B2 | 10/2012 | Erdman et al. |
| 8,280,216 B2 | 10/2012 | Cooke et al. |
| 8,313,249 B2 | 11/2012 | Gurreri et al. |
| 8,342,755 B2 | 1/2013 | Nhep |
| 8,374,477 B2 | 2/2013 | Hill et al. |
| 8,457,458 B2 | 6/2013 | Kadar-Kallen et al. |
| 8,588,566 B2 | 11/2013 | Matsuyama et al. |
| 8,690,593 B2 | 4/2014 | Anderson et al. |
| 8,693,836 B2 | 4/2014 | Kimbrell et al. |
| 8,886,335 B2 | 11/2014 | Pianca |
| 9,011,020 B2 | 4/2015 | Tan et al. |
| 9,031,360 B2 | 5/2015 | Schneider et al. |
| 9,075,216 B2 | 7/2015 | Cote et al. |

(56) References Cited

U.S. PATENT DOCUMENTS

| | | | |
|---|---|---|---|
| 9,091,818 | B2 | 7/2015 | Kadar-Kallen |
| 9,223,094 | B2 | 12/2015 | Schneider et al. |
| 2002/0102088 | A1 | 8/2002 | Kondo et al. |
| 2002/0131719 | A1 | 9/2002 | Grois et al. |
| 2002/0150372 | A1 | 10/2002 | Schray et al. |
| 2003/0174953 | A1 | 9/2003 | Carnevale et al. |
| 2003/0174996 | A1 | 9/2003 | Henschel et al. |
| 2003/0182015 | A1 | 9/2003 | Domaille et al. |
| 2004/0062488 | A1 | 4/2004 | Wood |
| 2004/0175090 | A1 | 9/2004 | Vastmans et al. |
| 2006/0210222 | A1 | 9/2006 | Watte et al. |
| 2007/0003204 | A1 | 1/2007 | Makrides-Saravanos et al. |
| 2007/0230863 | A1 | 10/2007 | Fukuda et al. |
| 2008/0175550 | A1 | 7/2008 | Cobrn et al. |
| 2009/0067802 | A1 | 3/2009 | Hoehne et al. |
| 2010/0158465 | A1 | 6/2010 | Smrha |
| 2011/0002586 | A1 | 1/2011 | Nhep |
| 2011/0103748 | A1 | 5/2011 | Ott |
| 2011/0217016 | A1 | 9/2011 | Mullsteff |
| 2011/0262077 | A1 | 10/2011 | Anderson et al. |
| 2011/0268408 | A1 | 11/2011 | Giraud et al. |
| 2011/0268410 | A1 | 11/2011 | Giraud et al. |
| 2011/0268412 | A1 | 11/2011 | Giraud et al. |
| 2012/0008900 | A1 | 1/2012 | Schneider |
| 2012/0014645 | A1 | 1/2012 | Kadar-Kallen |
| 2012/0051706 | A1 | 3/2012 | Van Geffen et al. |
| 2013/0089292 | A1 | 4/2013 | Ott et al. |
| 2014/0133810 | A1 | 5/2014 | Schneider |
| 2015/0253514 | A1 | 9/2015 | Murray et al. |
| 2015/0260927 | A1 | 9/2015 | Murray et al. |

FOREIGN PATENT DOCUMENTS

| | | |
|---|---|---|
| EP | 0 563 995 | 10/1999 |
| EP | 1102095 A1 | 5/2001 |
| EP | 1103832 A2 | 5/2001 |
| EP | 1067418 A1 | 10/2001 |
| GB | 2367902 A | 10/2000 |
| JP | H07281052 A | 10/1995 |
| JP | H1068853 A | 3/1998 |
| JP | H10339818 A | 12/1998 |
| JP | 2001255421 A | 9/2001 |
| JP | 2002-254306 | 9/2002 |
| JP | 2002253341 A | 9/2002 |
| JP | 2007318741 A | 12/2007 |
| JP | 2010-019895 | 1/2010 |
| JP | 2010239535 A | 10/2010 |
| KR | 10-2005-0034103 | 4/2005 |
| WO | 94/17534 | 8/1994 |
| WO | 9913367 A2 | 3/1999 |
| WO | 9946621 A1 | 9/1999 |
| WO | 01/061317 | 8/2001 |
| WO | 03/021312 | 3/2003 |
| WO | 2008/027201 | 3/2008 |
| WO | 2011/094327 | 8/2011 |
| WO | 2011/100613 | 8/2011 |
| WO | 2013/106820 | 7/2013 |

OTHER PUBLICATIONS

International Written Opinion for International Application No. PCT/US2013/061662 dated Jan. 22, 2014 (13 pages).

European Search Report for Application No. 13842179.7 dated Apr. 6, 2016.

U.S. Appl. No. 62/027,657, filed Jul. 22, 2014 entitled "Door Hinge Mechanism for Telecommunications Panel.".

International Standard, "Fiber optic connector interfaces—Part 4-1: Type SC connector family—Simplified receptacle SC-PC connecter interfaces," Copyright IEC 61754-4-1, First edition, Jan. 2003 (9 pages).

Bokstaele, et al., "A scalable parallel optical interconnect family," IO Overview Paper, Apr. 2004 (10 pages).

Grimes, "Applications of Parallel Optical Interconnects," Lasers and Electro-Optics Society Annual Meeting, Nov. 18-21, 1996, pp. 6-7, vol. 2 (2 pages).

Schneider et al., "Fibre Optic Circuits," TechCon 2011 (10 pages).

Shahid et al., "Flexible High Density Optical Circuits," National Fiber Optic Engineers Conference, 2001 Technical Proceedings (8 pages).

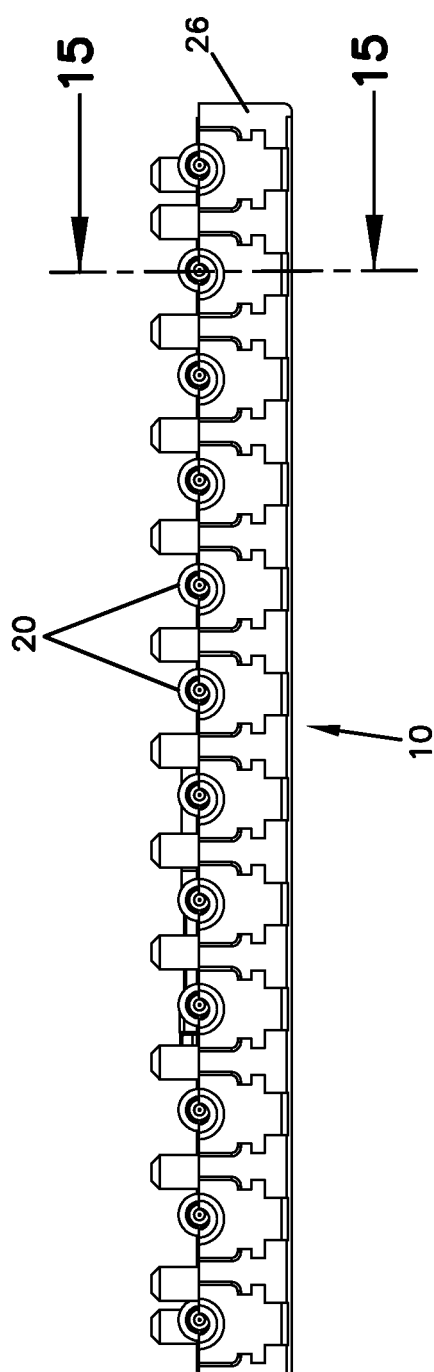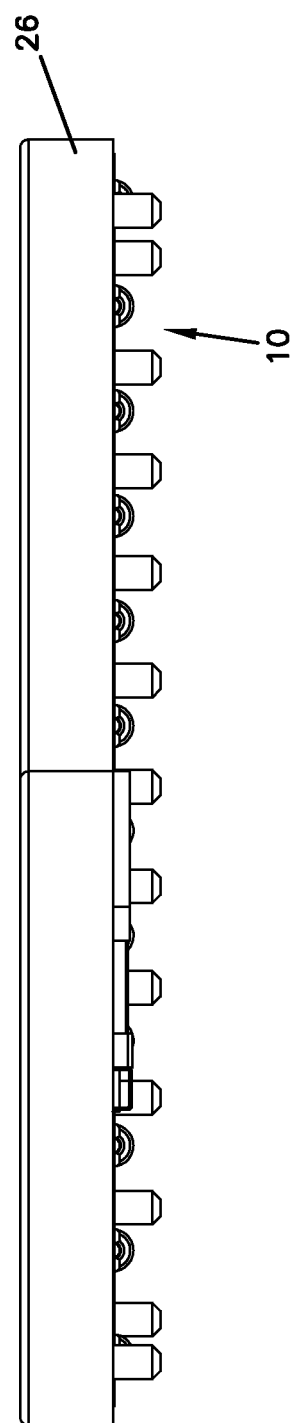
FIG. 7
FIG. 8

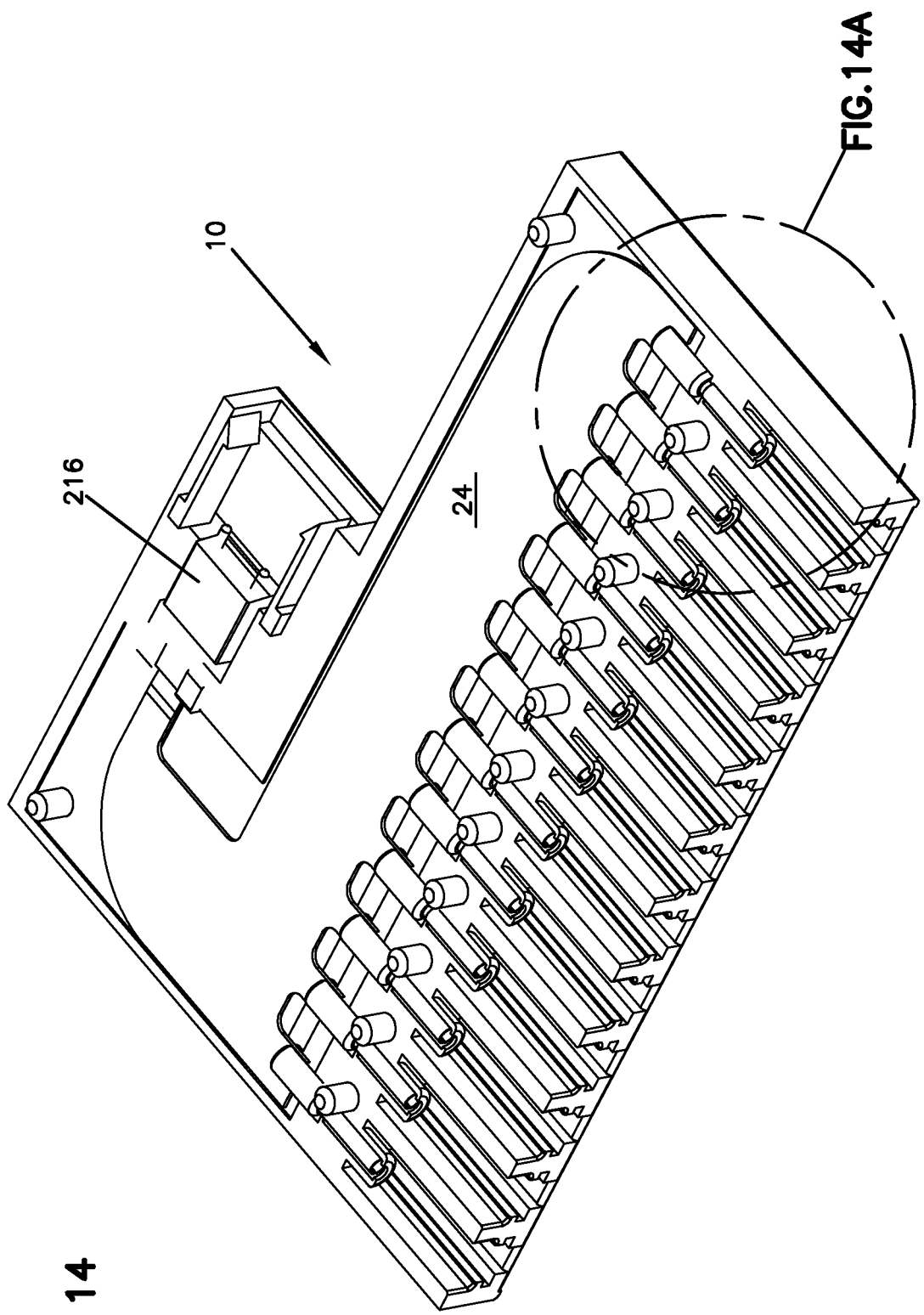

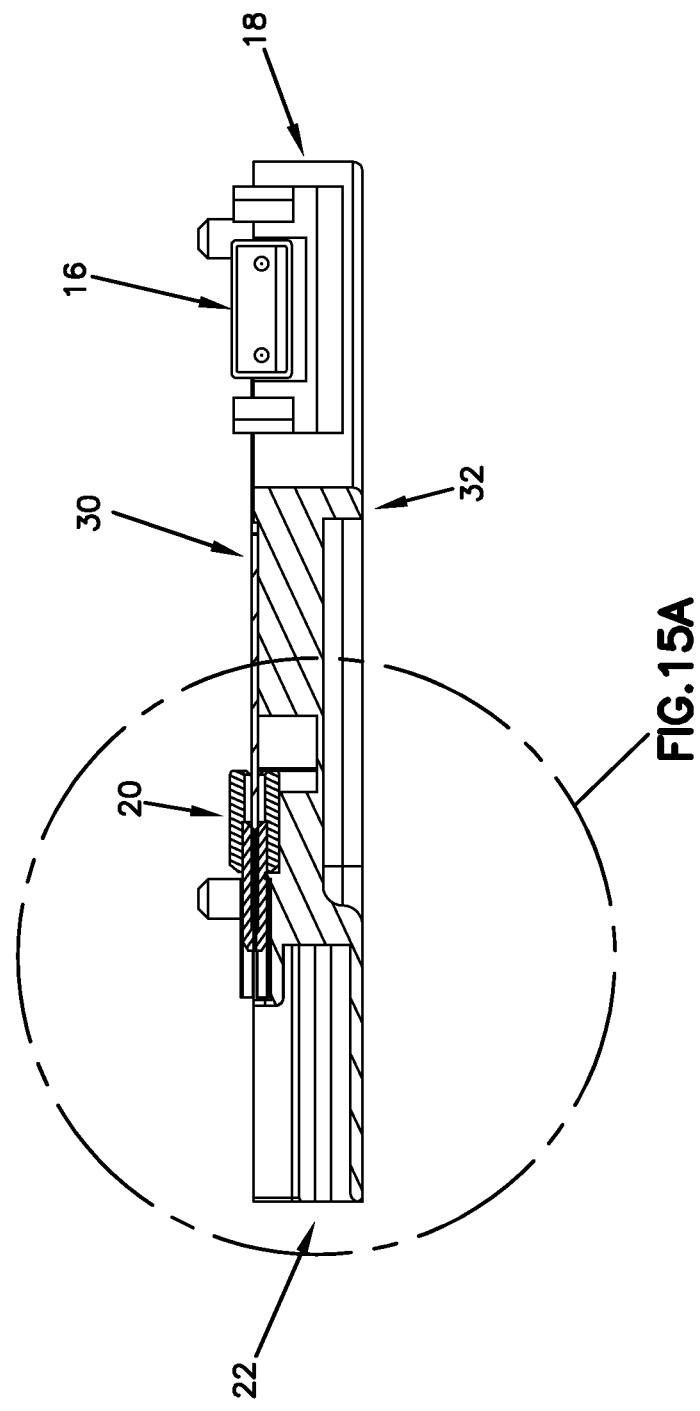

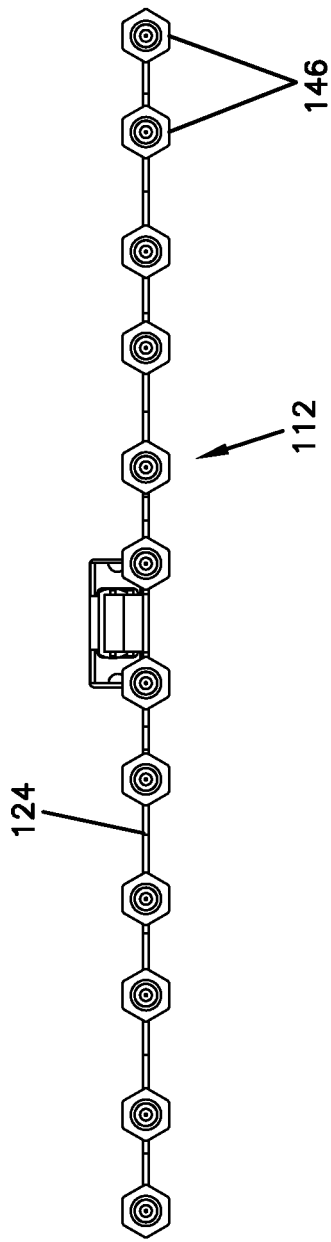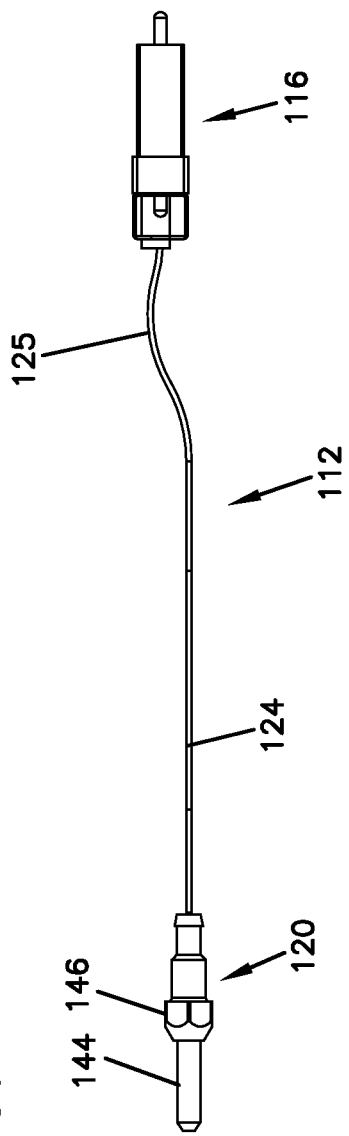
FIG. 35
FIG. 36

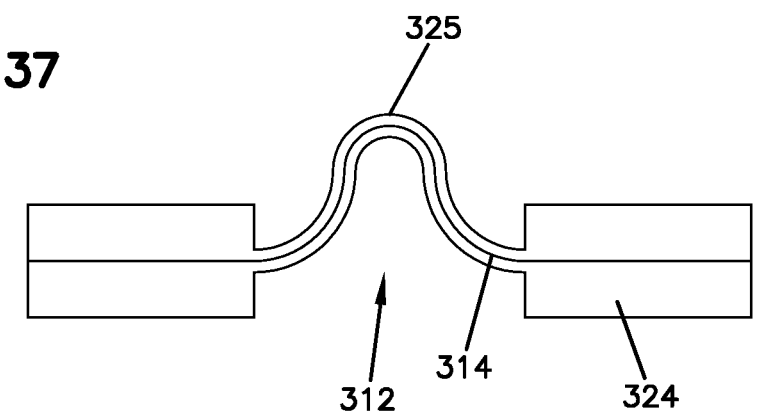
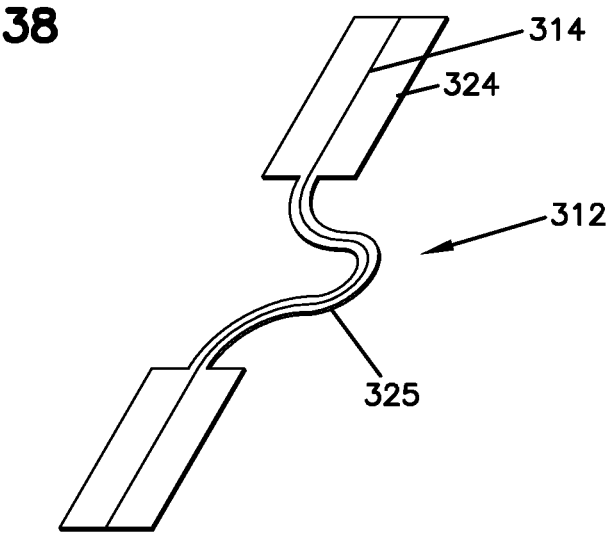
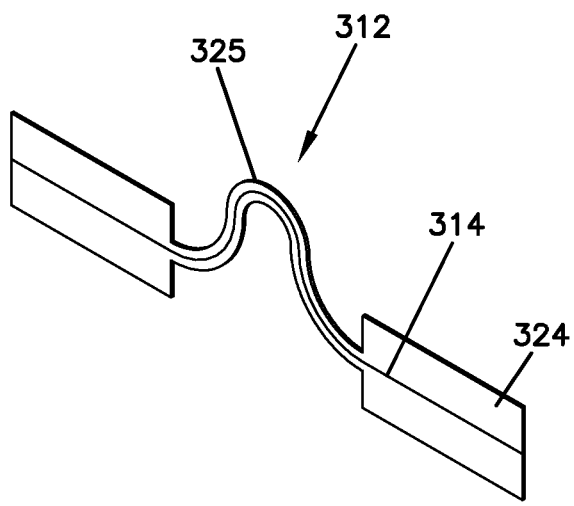

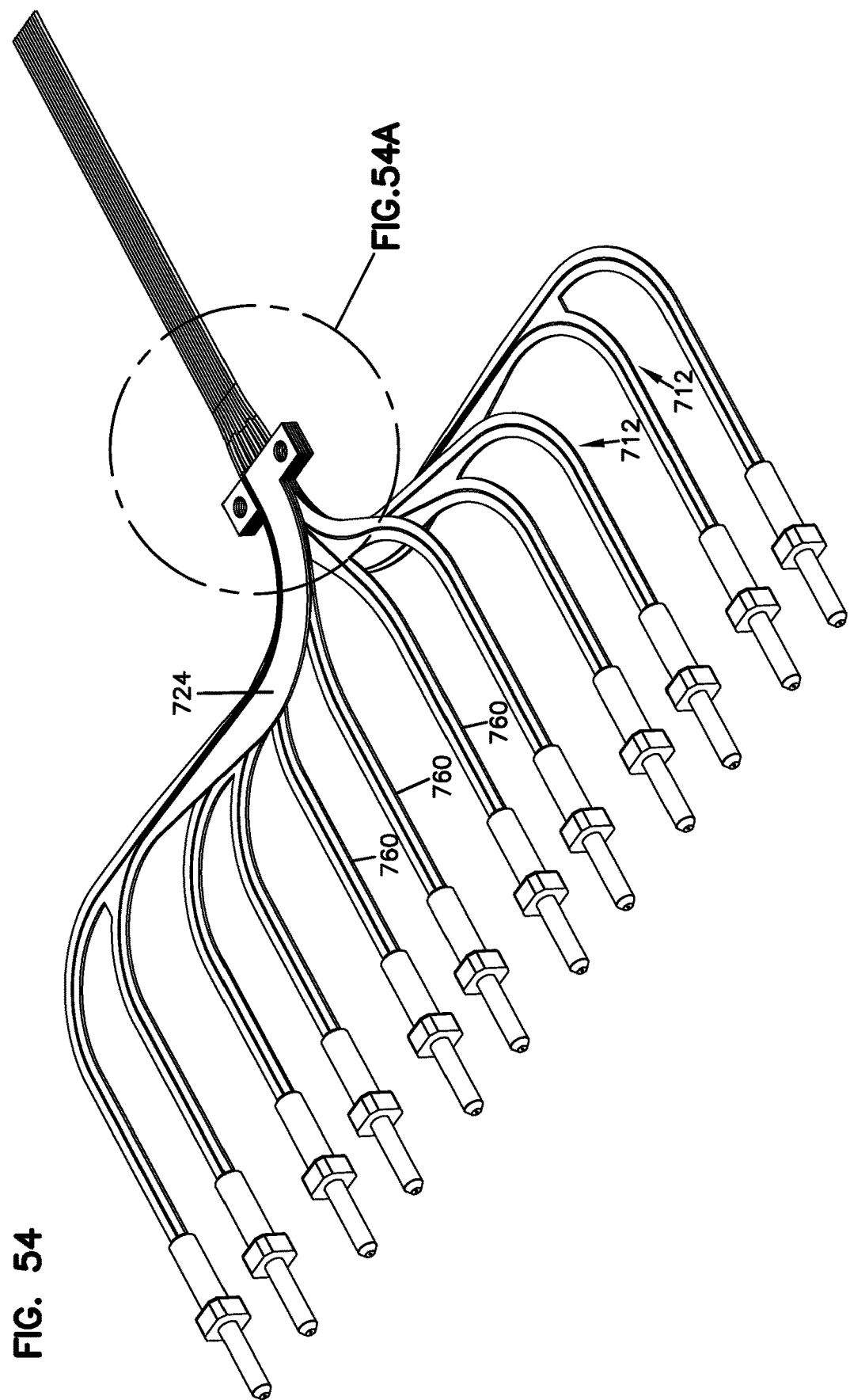

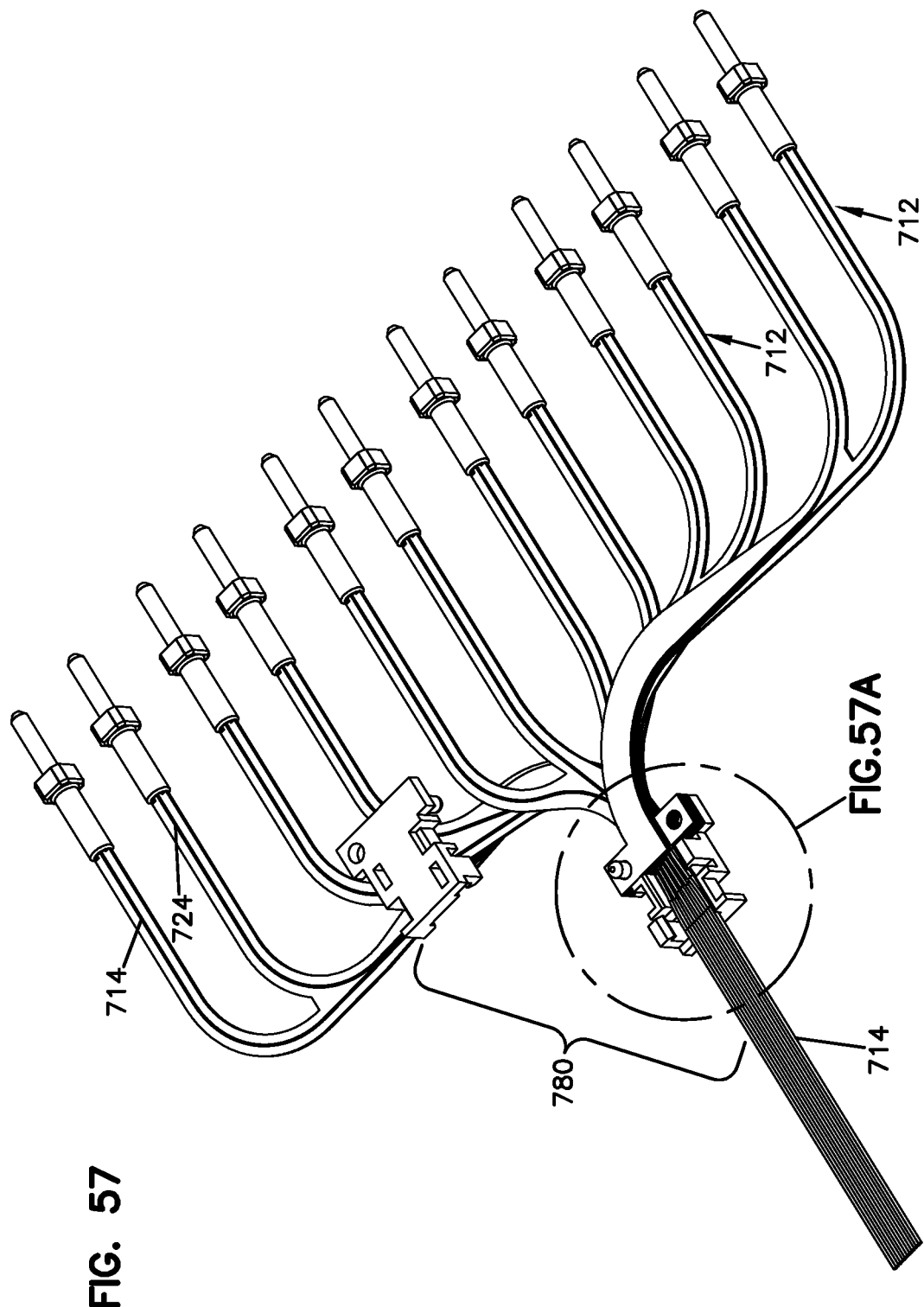

us 10,739,534 B2

FIBER OPTIC CASSETTE

CROSS REFERENCE TO RELATED APPLICATIONS

This application is a Continuation of U.S. patent application Ser. No. 15/898,760, filed on 19 Feb. 2018, now U.S. Pat. No. 10,295,761 issued on 21 May 2019, which is a Continuation of U.S. patent application Ser. No. 15/299,768 filed on 21 Oct. 2016, now U.S. Pat. No. 9,897,767 issued on 20 Feb. 2018, which is a Continuation of U.S. patent application Ser. No. 14/432,013 filed on 27 Mar. 2015, now U.S. Pat. No. 9,488,788 issued on 8 Nov. 2016, which is a National Stage of PCT/US2013/061662 filed on 25 Sep. 2013, and which claims priority to U.S. Patent Application Ser. No. 61/707,323 filed on 28 Sep. 2012, and which applications are incorporated herein by reference. To the extent appropriate, a claim of priority is made to each of the above disclosed applications.

BACKGROUND OF THE INVENTION

As demand for telecommunications increases, fiber optic networks are being extended in more and more areas. Management of the cables, ease of installation, and ease of accessibility for later management are important concerns. As a result, there is a need for fiber optic devices which address these and other concerns.

SUMMARY

An aspect of the present disclosure relates to fiber optic devices in the form of fiber optic cassettes that include at least one connector that provides a signal entry location and at least one connector that provides a signal exit location and a flexible fiber optical circuit thereinbetween for relaying the signal from the entry location to the exit location.

Another aspect of the present disclosure relates to a fiber optic cassette including a body defining a front and an opposite rear. A cable entry location is defined on the body for a cable to enter the cassette, wherein a plurality of optical fibers from the cable extend into the cassette and form terminations at non-conventional connectors adjacent the front of the body. A flexible substrate is positioned between the cable entry location and the non-conventional connectors adjacent the front of the body, the flexible substrate rigidly supporting the plurality of optical fibers. Each of the non-conventional connectors adjacent the front of the body includes a ferrule, a ferrule hub supporting the ferrule, and a split sleeve surrounding the ferrule.

According to another aspect of the present disclosure, a method of assembling a fiber optic cassette includes providing a body, mounting a multi-ferrule connector terminated to a multi-fiber cable to the body, separating out at least a plurality of the optical fibers of the multi-fiber cable and fixedly supporting the plurality of the optical fibers extending from the multi-ferrule connector on a flexible substrate, and terminating each of the plurality of optical fibers supported by the flexible substrate with a non-conventional connector that includes a ferrule, a ferrule hub that supports the ferrule and a split sleeve surrounding the ferrule.

According to another aspect of the present disclosure, a flexible optical circuit includes a flexible substrate and a plurality of optical fibers physically supported by the flexible substrate, wherein a first end of each of the optical fibers is terminated to a multi-ferrule connector that is coupled to the flexible substrate and a second end of each of the optical fibers is terminated to a non-conventional fiber optic connector that is coupled to the flexible substrate, the non-conventional fiber optic connector including a ferrule and a ferrule hub that supports the ferrule.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 7 is a front elevational view of the fiber optic cassette of FIG. 1;

FIG. 8 is a rear elevational view of the fiber optic cassette of FIG. 1;

FIG. 14 is another top, front, right side perspective view of the fiber optic cassette of FIG. 1;

FIG. 15 is a cross-sectional view taken along line 15-15 of FIG. 7;

FIG. 35 is a front elevational view of the flexible optical circuit of FIG. 33;

FIG. 36 is a right side view of the flexible optical circuit of FIG. 33;

FIG. 37 is a top plan view of a flexible optical circuit illustrating a substrate of the circuit with a bend formed therein;

FIG. 38 is a perspective view of the flexible optical circuit of FIG. 37;

FIG. 39 is another perspective view of the flexible optical circuit of FIG. 37;

FIG. 54 illustrates a top, front, right side perspective view of the plurality of duplex flexible optical circuits of FIG. 53 in a stacked arrangement;

FIG. 57 is a top, rear, left side exploded perspective view of the clamp structure of FIG. 56, the clamp structure shown with the stack of the duplex flexible optical circuits placed therein;

DETAILED DESCRIPTION

Figure 1:
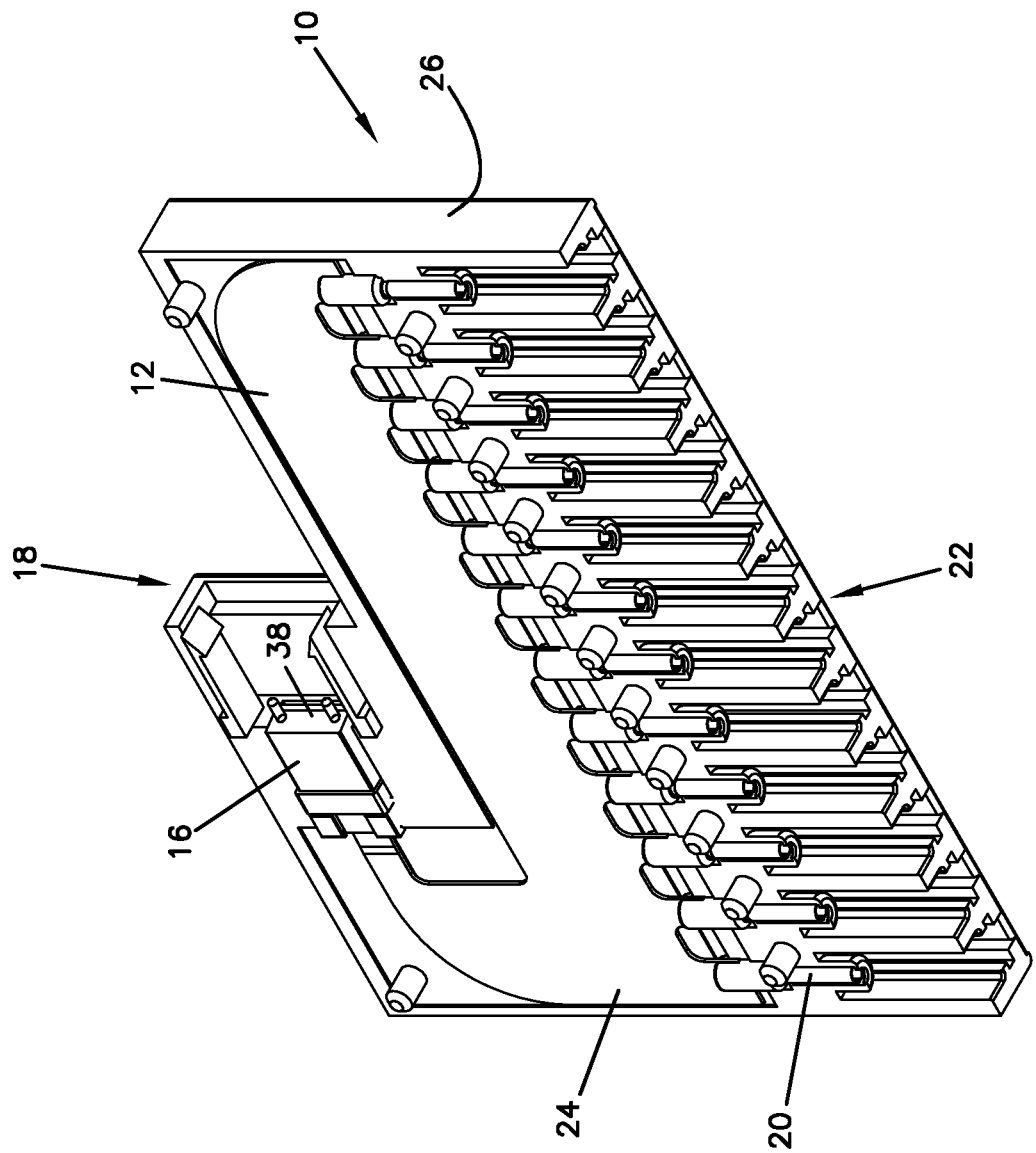
FIG. 1 is a top, front, right side perspective view of a fiber optic cassette having features that are examples of inventive aspects in accordance with the present disclosure.
Figure 2:
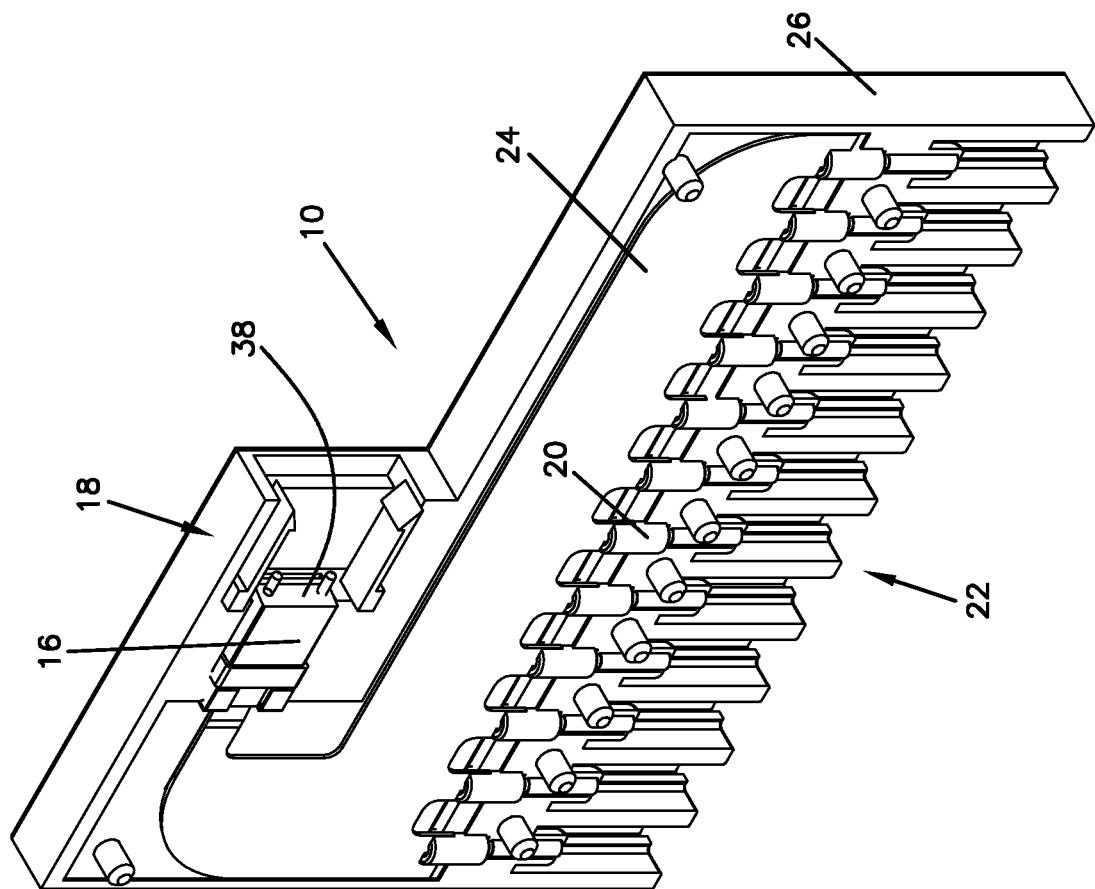
FIG. 2 is a top, rear, right side perspective view of the fiber optic cassette of FIG. 1.
Figure 3:
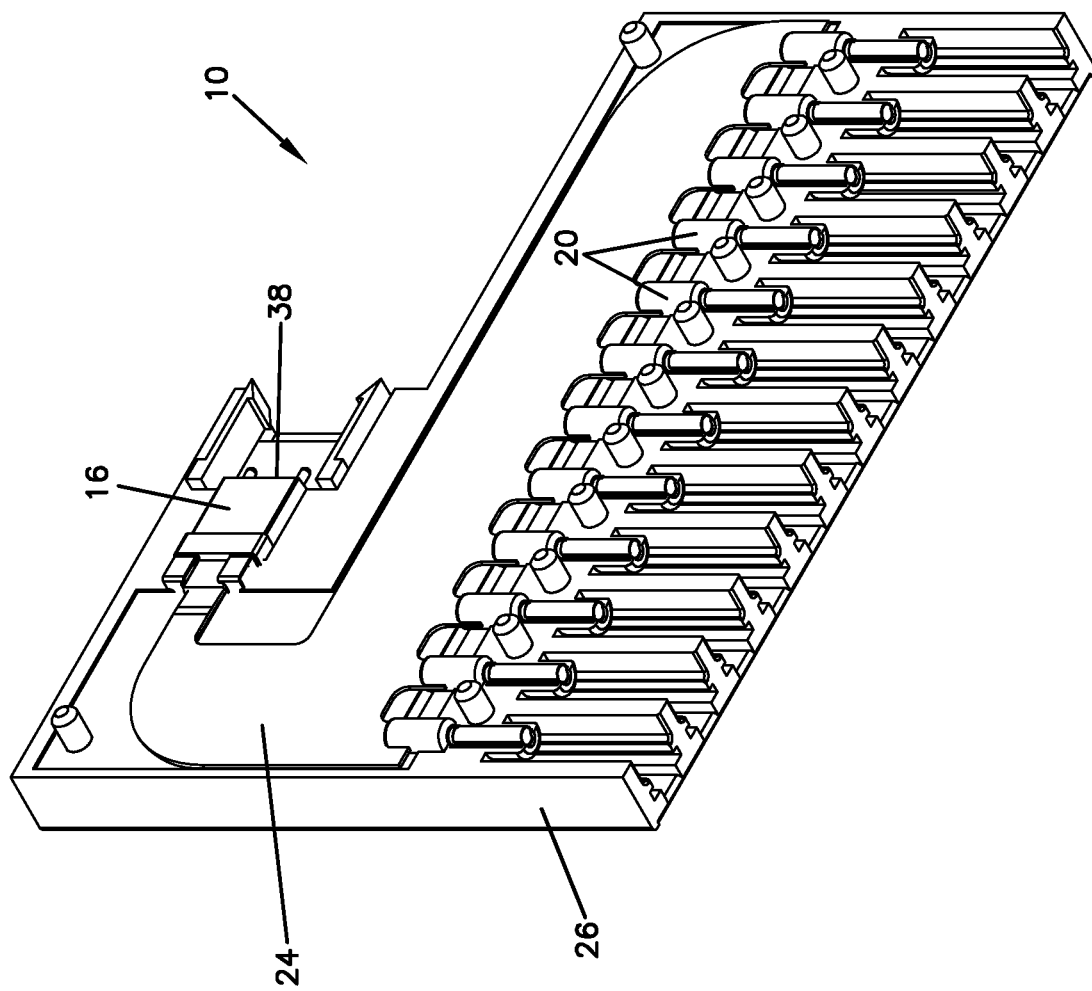
FIG. 3 is a top, front, left side perspective view of the fiber optic cassette of FIG. 1.
Figure 4:
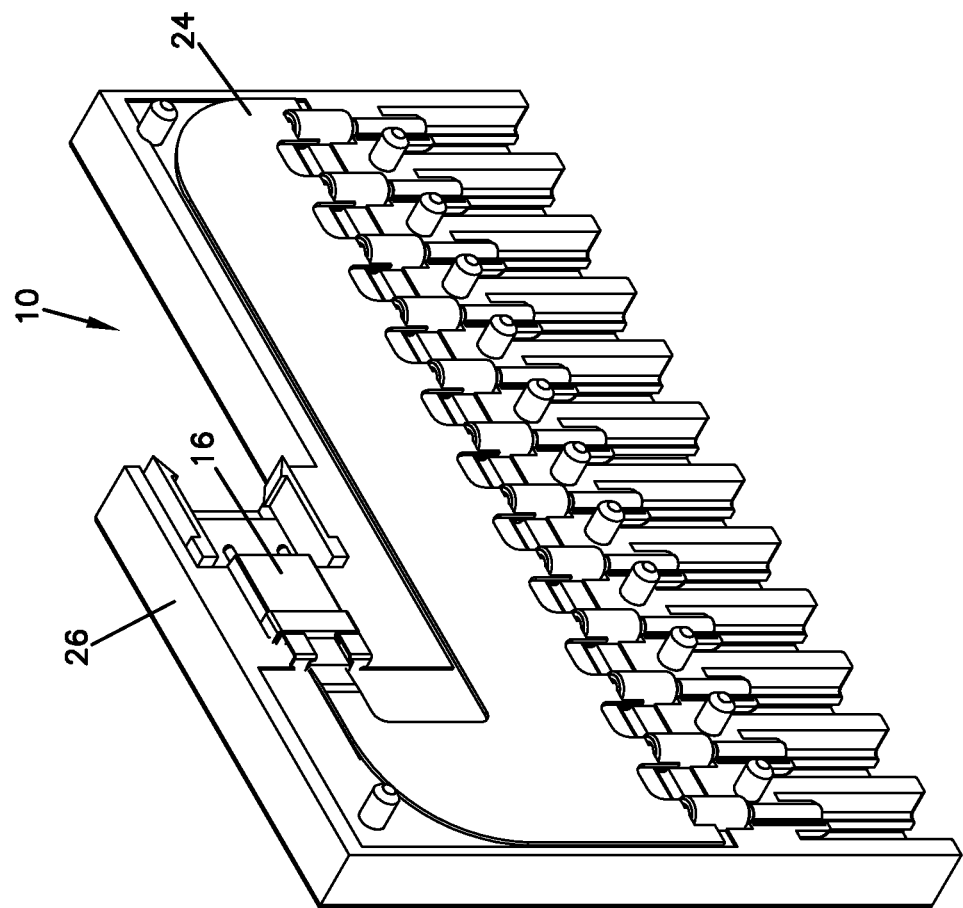
FIG. 4 is a top, rear, left side perspective view of the fiber optic cassette of FIG. 1.
Figure 5:
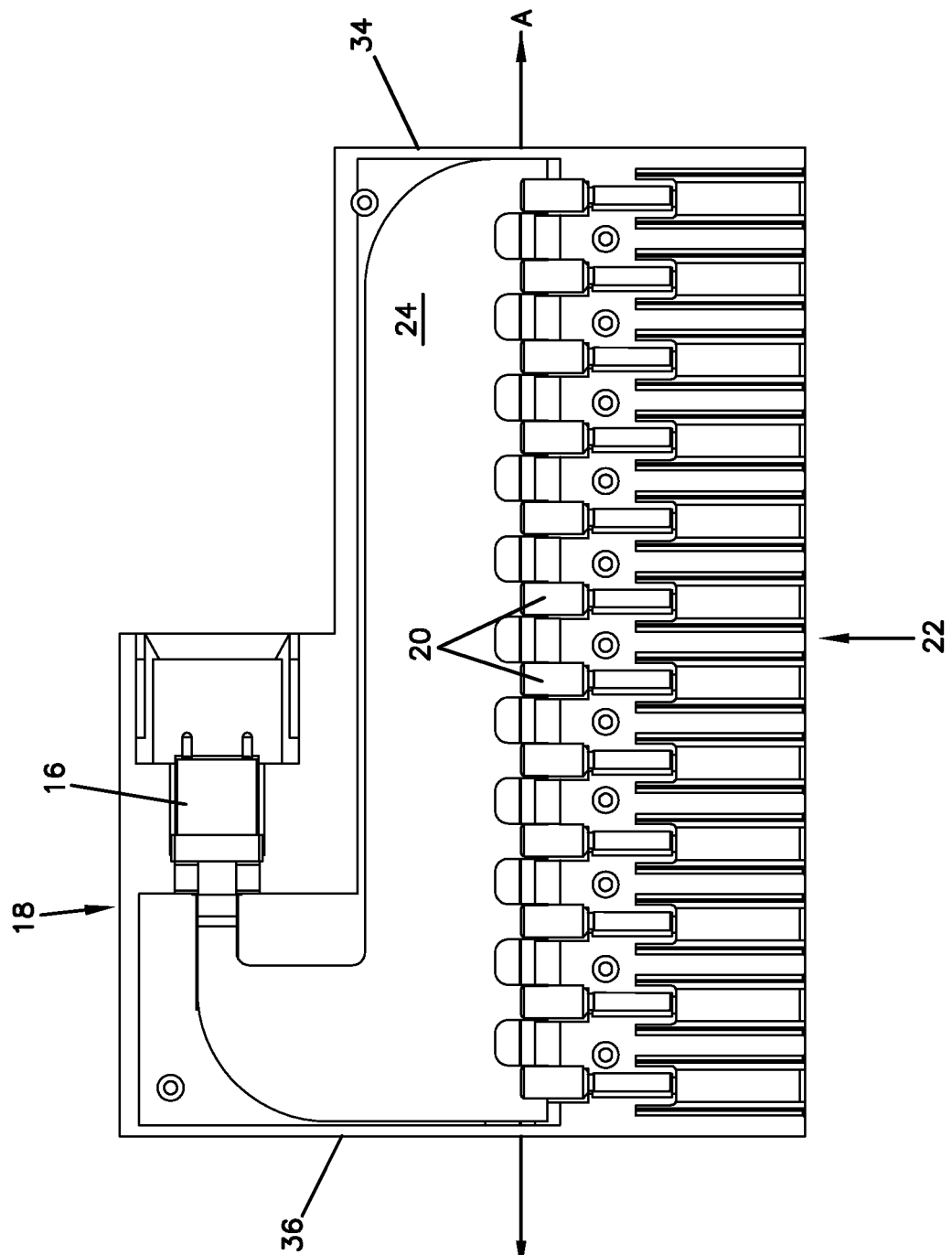
FIG. 5 is a top plan view of the fiber optic cassette of FIG. 1.
Figure 6:
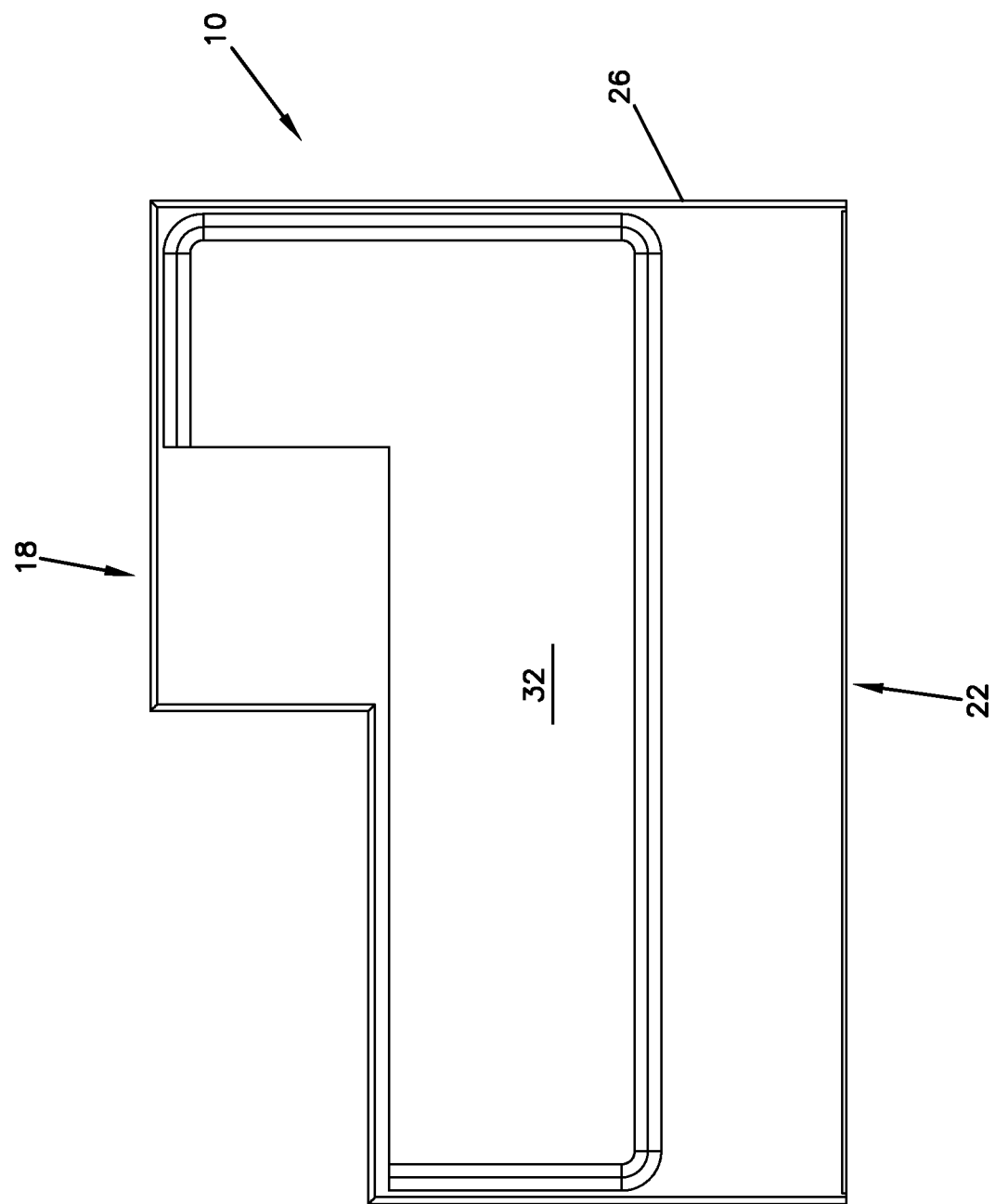
FIG. 6 is a bottom plan view of the fiber optic cassette of FIG. 1.
Figure 9:
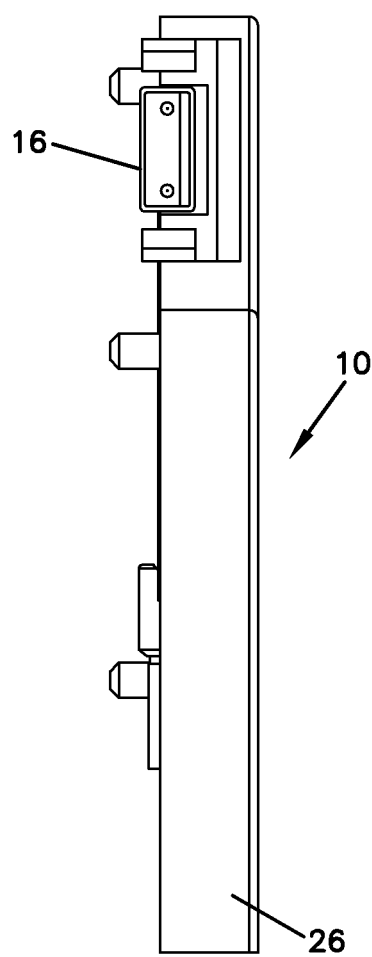
FIG. 9 is a right side view of the fiber optic cassette of FIG. 1.
Figure 10:
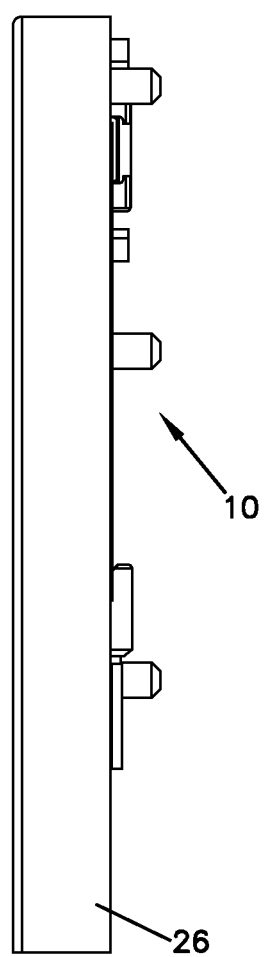
FIG. 10 is a left side view of the fiber optic cassette of FIG. 1.
Figure 11:
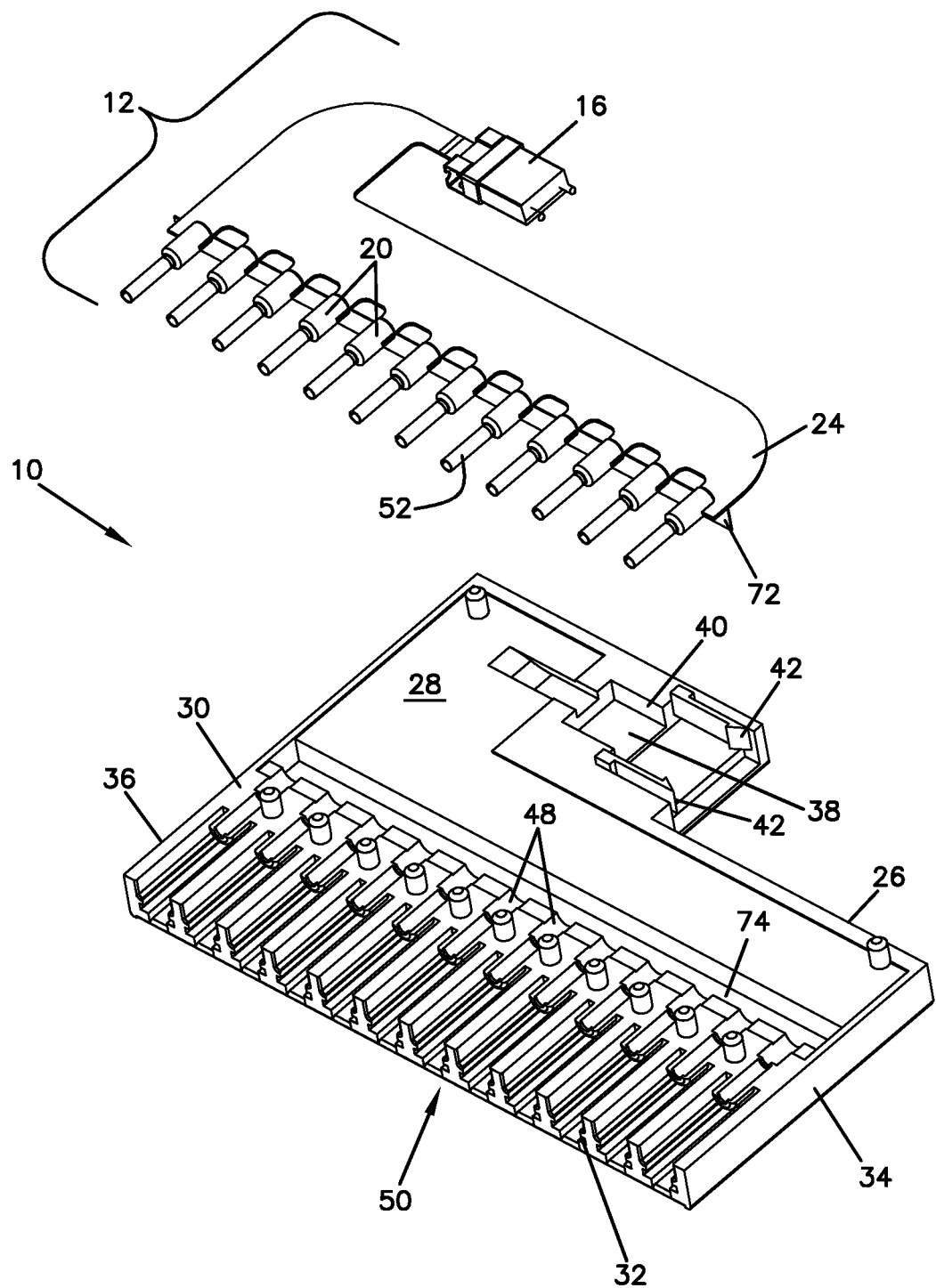
FIG. 11 is a partially exploded perspective view of the fiber optic cassette of FIG. 1.
Figure 12:
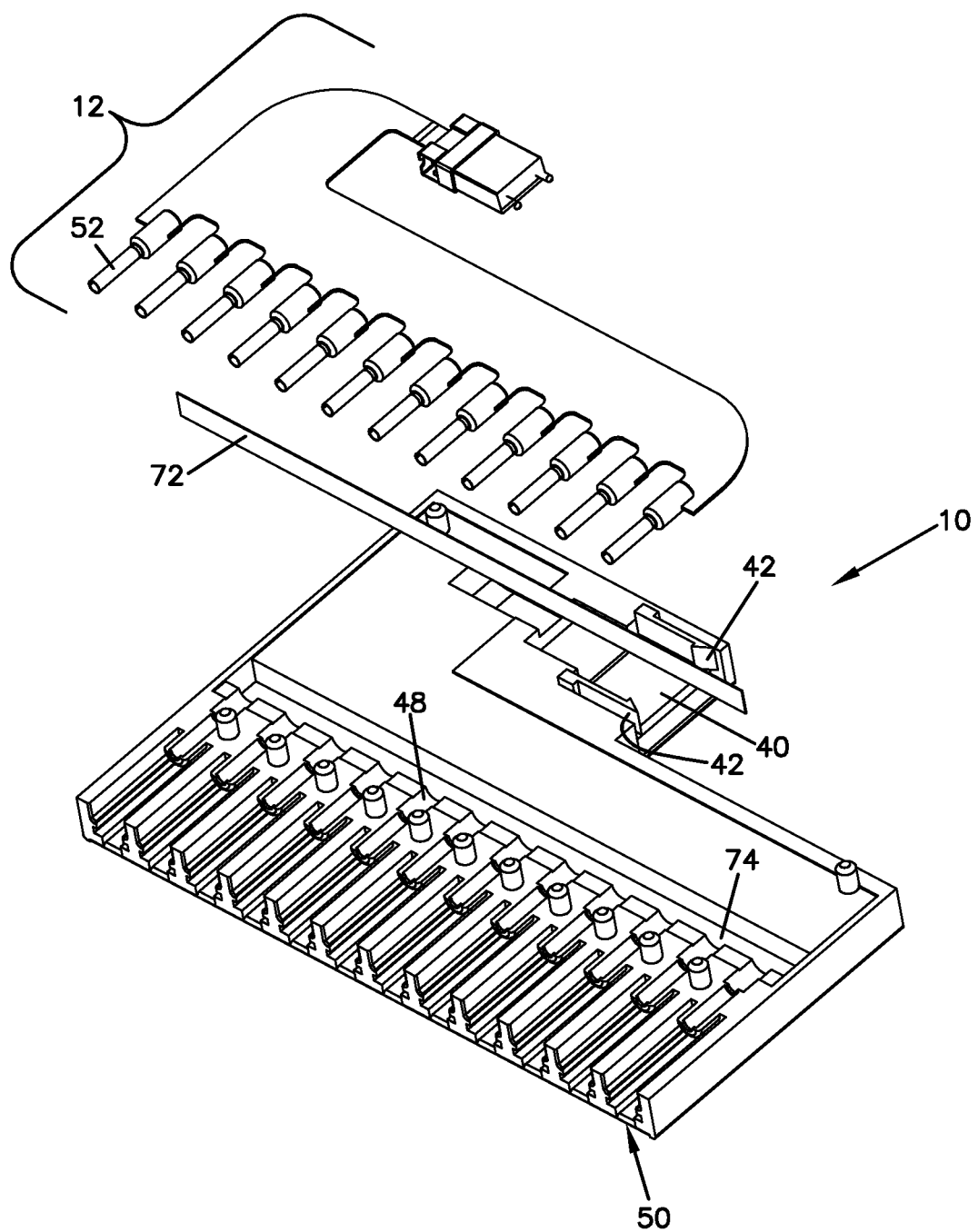
FIG. 12 is another partially exploded perspective view of the fiber optic cassette of FIG. 1.
Figure 13:
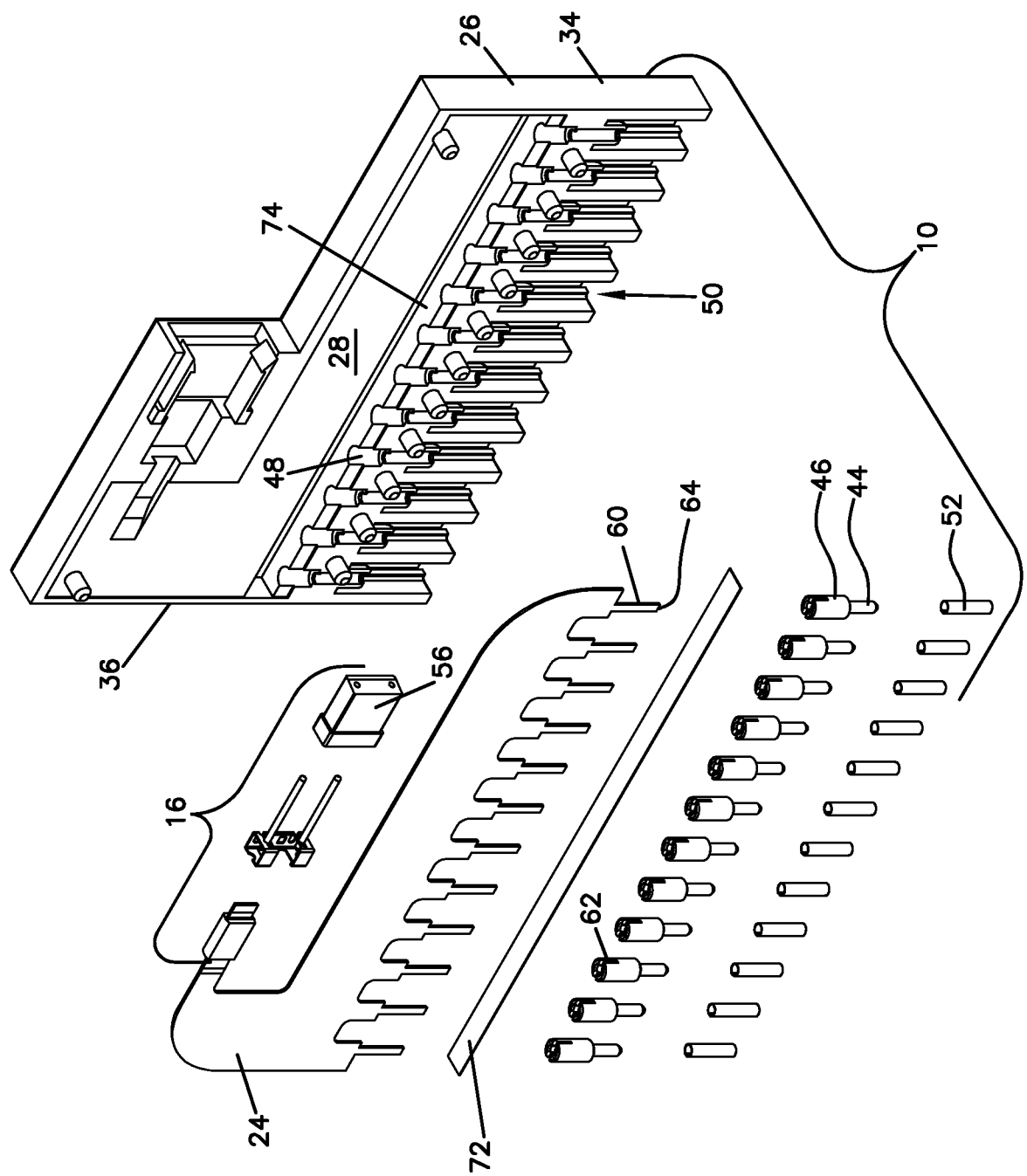
FIG. 13 is a fully exploded perspective view of the fiber optic cassette of FIG. 1.
Figure 14A:
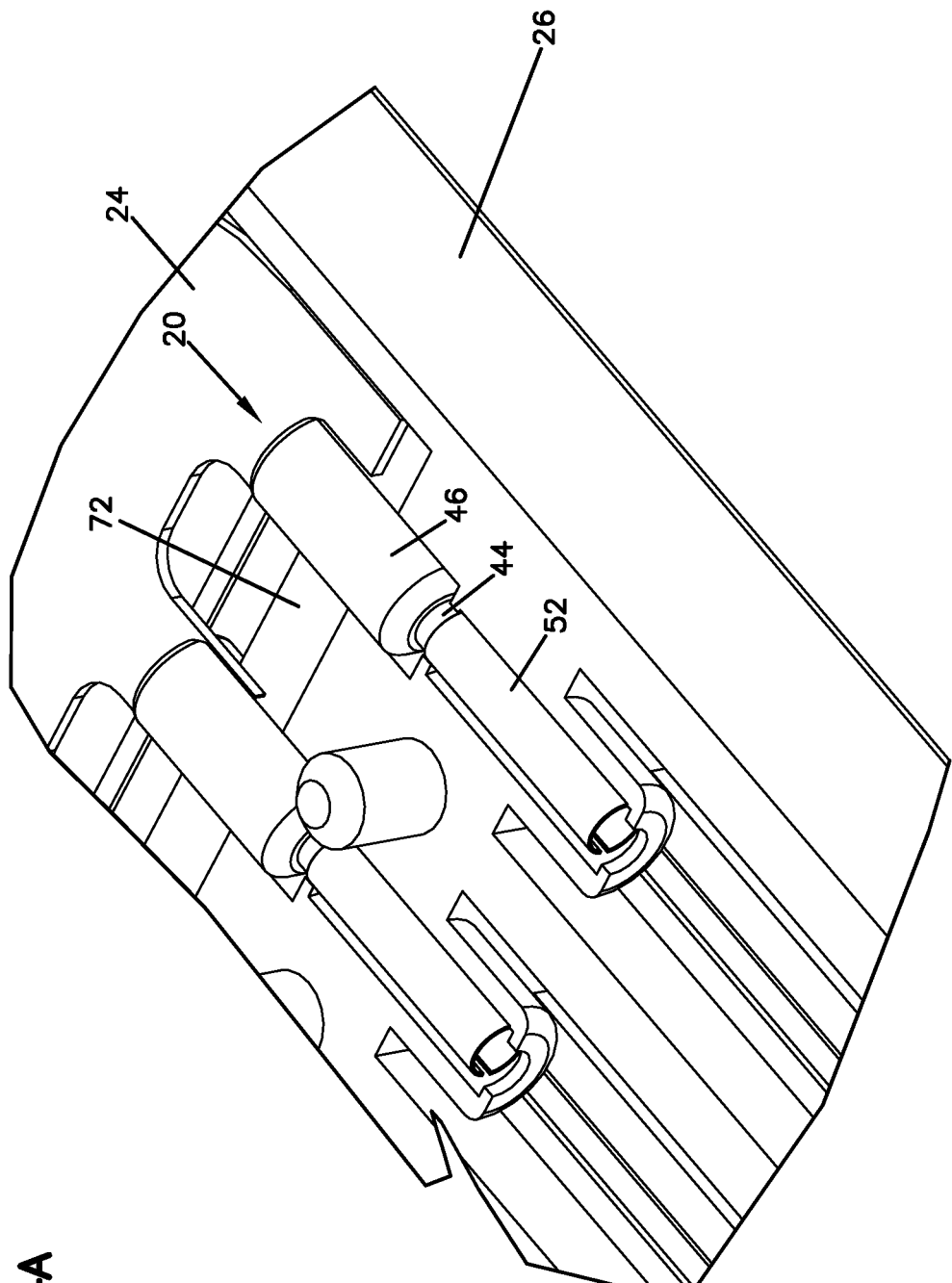
FIG. 14A is a close-up view illustrating the ferrule assemblies of the flexible optical circuit placed within the body of the cassette of FIG. 1.

The present disclosure is directed generally to fiber optic devices in the form of fiber optic cassettes. As will be described in further detail below, the different embodiments of the fiber optic cassettes of the present disclosure are designed to relay multiple fibers which terminate at a rear connector, such as an MPO style connector, to a plurality of ferrules positioned at a generally front portion of the cassette. The fiber optic cassettes of the present disclosure, thus, provide a transition housing or support between multi-fibered connectors, such as the MPO style connectors having MT ferrules, and single or dual fiber connectors, such as LC or SC type connectors.

As will be described in further detail below, the different embodiments of the fiber optic cassettes of the present disclosure utilize flexible optical circuits for the transition between the multi-fibered connectors positioned at one end of the cassette and the single or dual connectors positioned at an opposite end of the cassette.

Flexible optical circuits are passive optical components that comprise one or more (typically, multiple) optical fibers embedded on a flexible substrate, such as a Mylar™ or other flexible polymer substrate. Commonly, although not necessarily, one end face of each fiber is disposed adjacent one longitudinal end of the flexible optical circuit substrate and the other end face of each fiber is disposed adjacent the opposite longitudinal end of the flexible optical circuit substrate. The fibers extend past the longitudinal ends of the flexible optical circuit (commonly referred to as pigtails) so that they can be terminated to optical connectors, which can be coupled to fiber optic cables or other fiber optic components through mating optical connectors.

Flexible optical circuits essentially comprise one or more fibers sandwiched between two flexible sheets of material, such as Mylar™ or another polymer. An epoxy may be included between the two sheets in order to adhere them together. Alternately, depending on the sheet material and other factors, the two sheets may be heated above their melting point to heat-weld them together with the fibers embedded between the two sheets.

The use of flexible optical circuits within the fiber optic cassettes of the present disclosure provides a number of advantages, which will be discussed in further detail below. For example, the substrate of a flexible optical circuit is mechanically flexible, being able to accommodate tolerance variations in different cassettes, such as between connector ferrules and the housings that form the cassettes. The flexibility of the optical circuits also allow for axial movement in the fibers to account for ferrule interface variation. Also, by providing a rigid substrate within which the fibers are positionally fixed, use of flexible optical circuits allows a designer to optimize the fiber bend radius limits and requirements in configuring the cassettes, thus, achieving reduced dimensions of the cassettes. The bend radius of the fibers can thus be controlled to a minimum diameter. By utilizing optical fibers such as bend insensitive fibers (e.g., 8 mm bend radius) in combination with a flexible substrate that fixes the fibers in a given orientation, allowing for controlled bending, small form cassettes may be produced in a predictable and automated manner. Manual handling and positioning of the fibers within the cassettes may be reduced and eliminated through the use of flexible optical circuits.

Now referring to FIGS. 1-24, a first embodiment of a fiber optic cassette 10 that utilizes a flexible optical circuit 12 is shown. In the fiber optic cassette 10 of FIGS. 1-24, the flexible optical circuit 12 is depicted as transitioning optical fibers 14 between a conventional connector 16 (e.g., an MPO connector) at the rear 18 of the cassette 10 and a plurality of non-conventional connectors 20 at the opposite front end 22 of the cassette 10, wherein portions of a substrate 24 of the flexible optical circuit 12 are physically inserted into the non-conventional connectors 20.

It should be noted that the term "non-conventional connector" may refer to a fiber optic connector that is not of a conventional type such as an LC or SC connector and one that has generally not become a recognizable standard footprint for fiber optic connectivity in the industry.

The elimination of conventional mating connectors inside the cassette 10 may significantly reduce the overall cost by eliminating the skilled labor normally associated with terminating an optical fiber to a connector, including polishing the end face of the fiber and epoxying the fiber into the connector. It further allows the fiber optic interconnect device such as the optical cassette 10 to be made very thin.

Still referring to FIGS. 1-24, the cassette 10 includes a body 26 defining the front 22, the rear 18 and an interior 28. Body 26 further includes a top 30, a bottom 32, and sides 34, 36.

A signal entry location 38 may be provided by the MPO connector 16, which, in the illustrated embodiment, is along the rear 18 of the cassette body 26. A pocket 40 seats the MPO connector 16 while flexible cantilever arms 42 may be provided for coupling a second mating MPO connector to the cassette 10 with a snap-fit interlock. Non-conventional connectors 20 are arranged linearly adjacent the front 22 of the cassette 10 and positioned along a longitudinal axis A defined by the body 26. In the depicted embodiment of the cassette 10, the MPO connector 16 of the cassette 10 is positioned to extend parallel to the longitudinal axis A and generally perpendicular to ferrules 44 of the non-conventional connectors 20 at the front 22 of the cassette 10.

In general, cassette 10 includes the top 30 and bottom 32 which are generally parallel to each other and define the major surfaces of cassette body 26. Sides 34, 36, front 22, and rear 18 generally define the minor sides of cassette body 26. The cassette 10 can be oriented in any position, so that the top and bottom surfaces can be reversed, or positioned vertically, or at some other orientation.

Figure 15A:
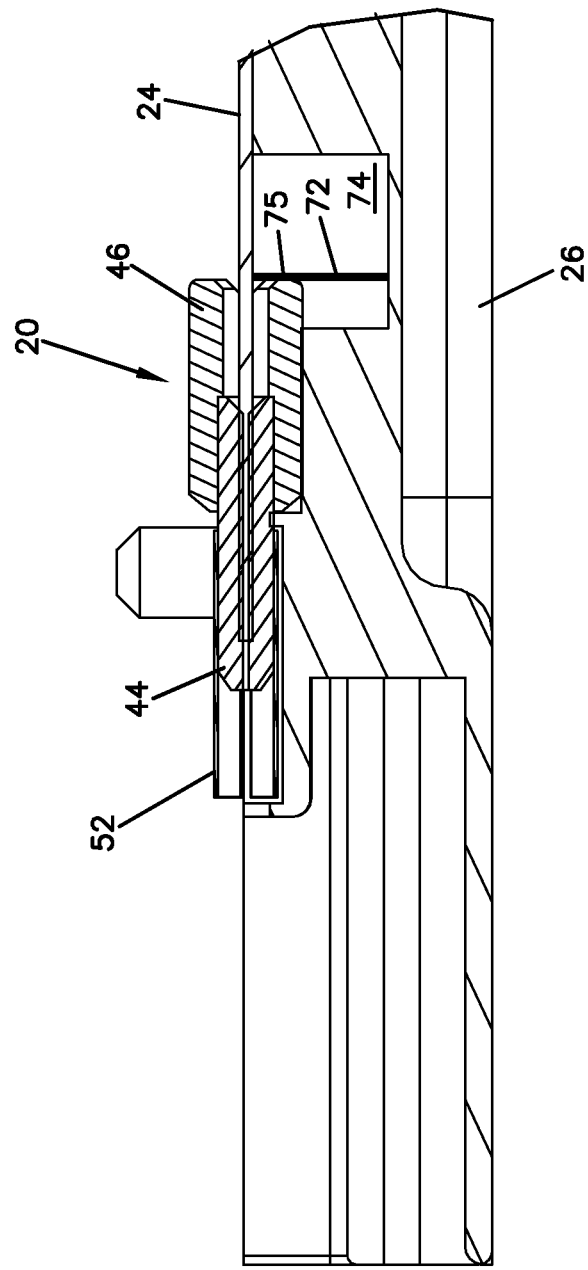
FIG. 15A is a close-up view showing the internal features of one of the ferrule assemblies of the flexible optical circuit placed within the cassette of FIG. 1.
Figure 16:
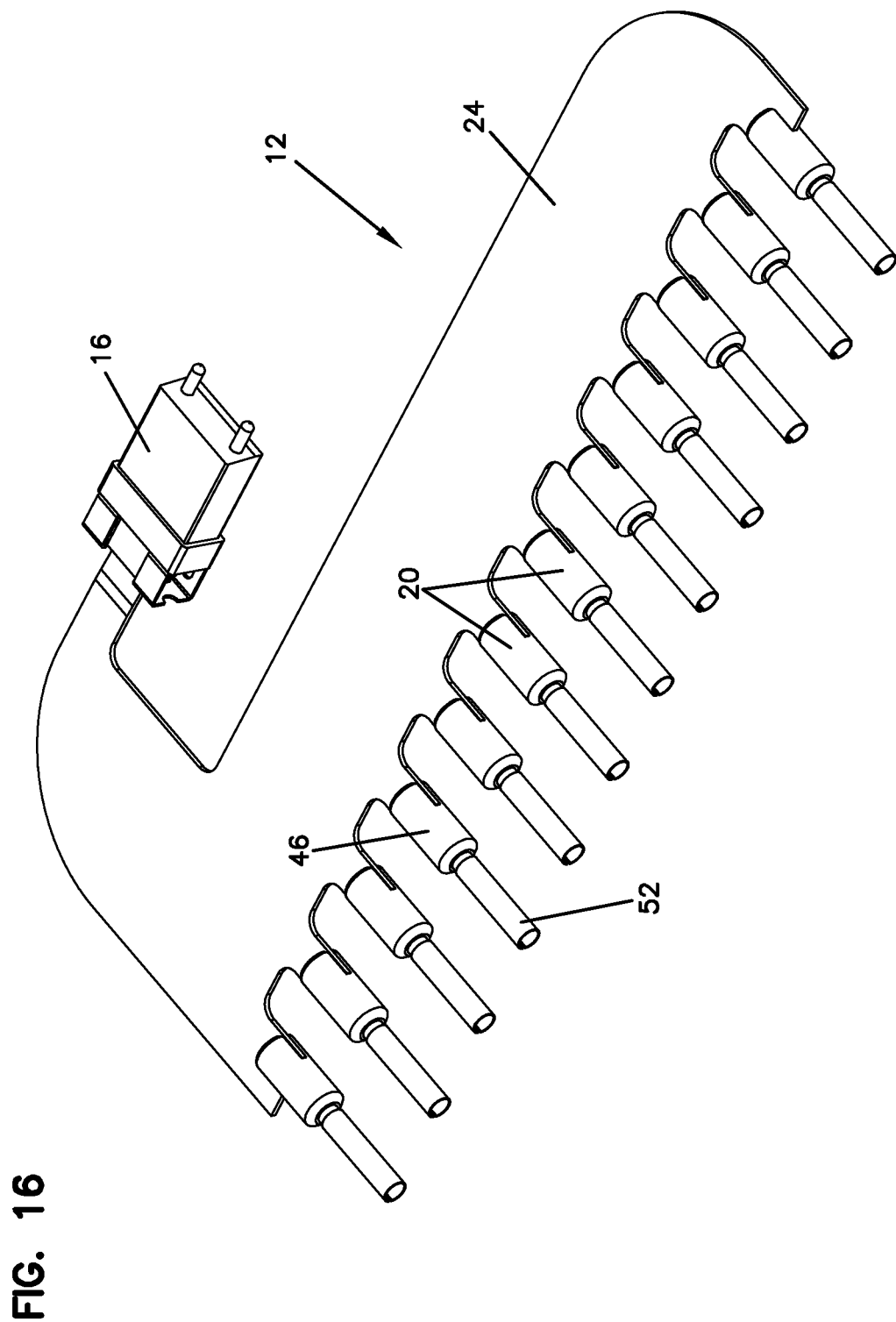
FIG. 16 is a top, front, right side perspective view of the flexible optical circuit of the fiber optic cassette of FIG. 1.
Figure 17:
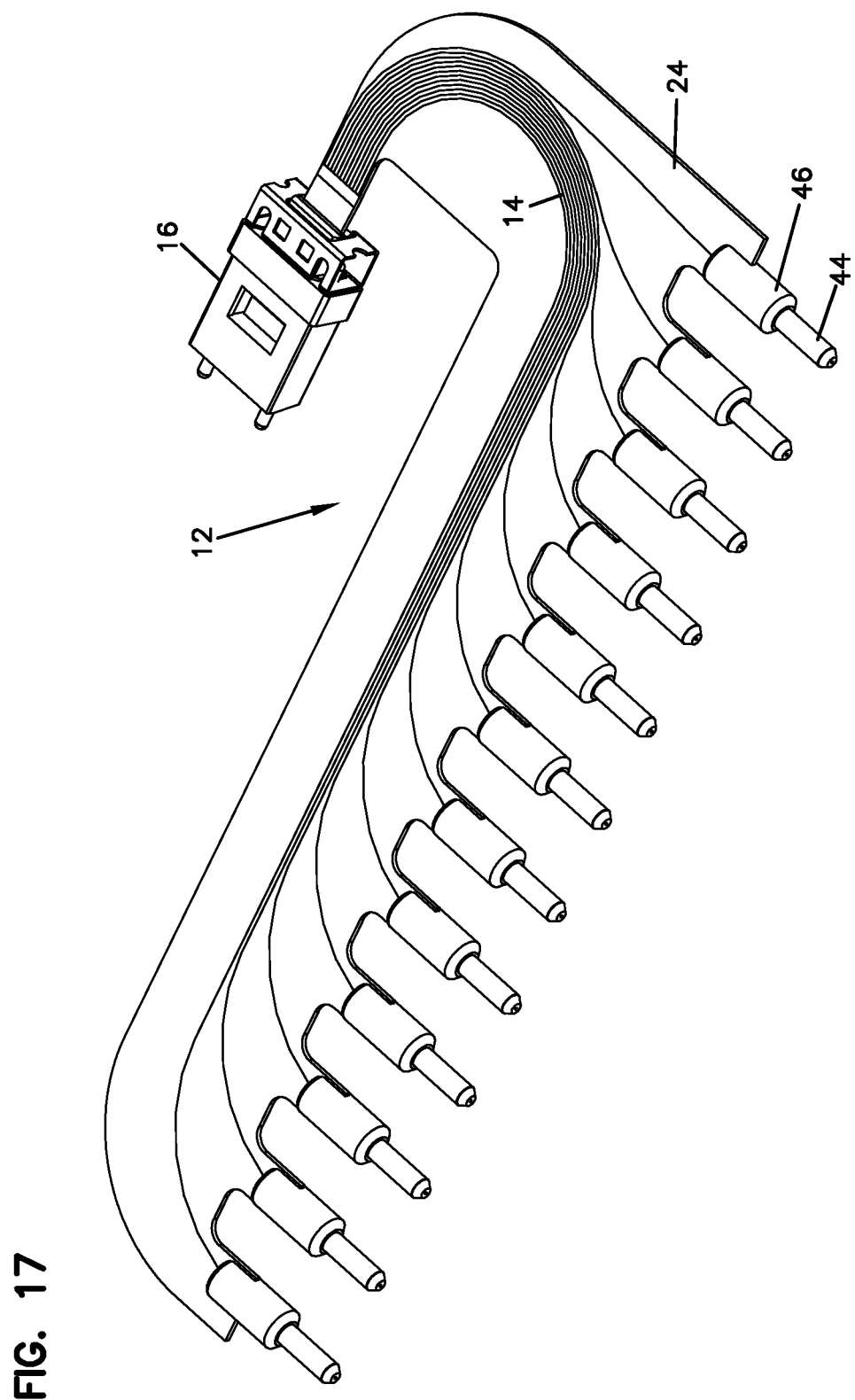
FIG. 17 is a bottom, front, left side perspective view of the flexible optical circuit of FIG. 16.
Figure 18:
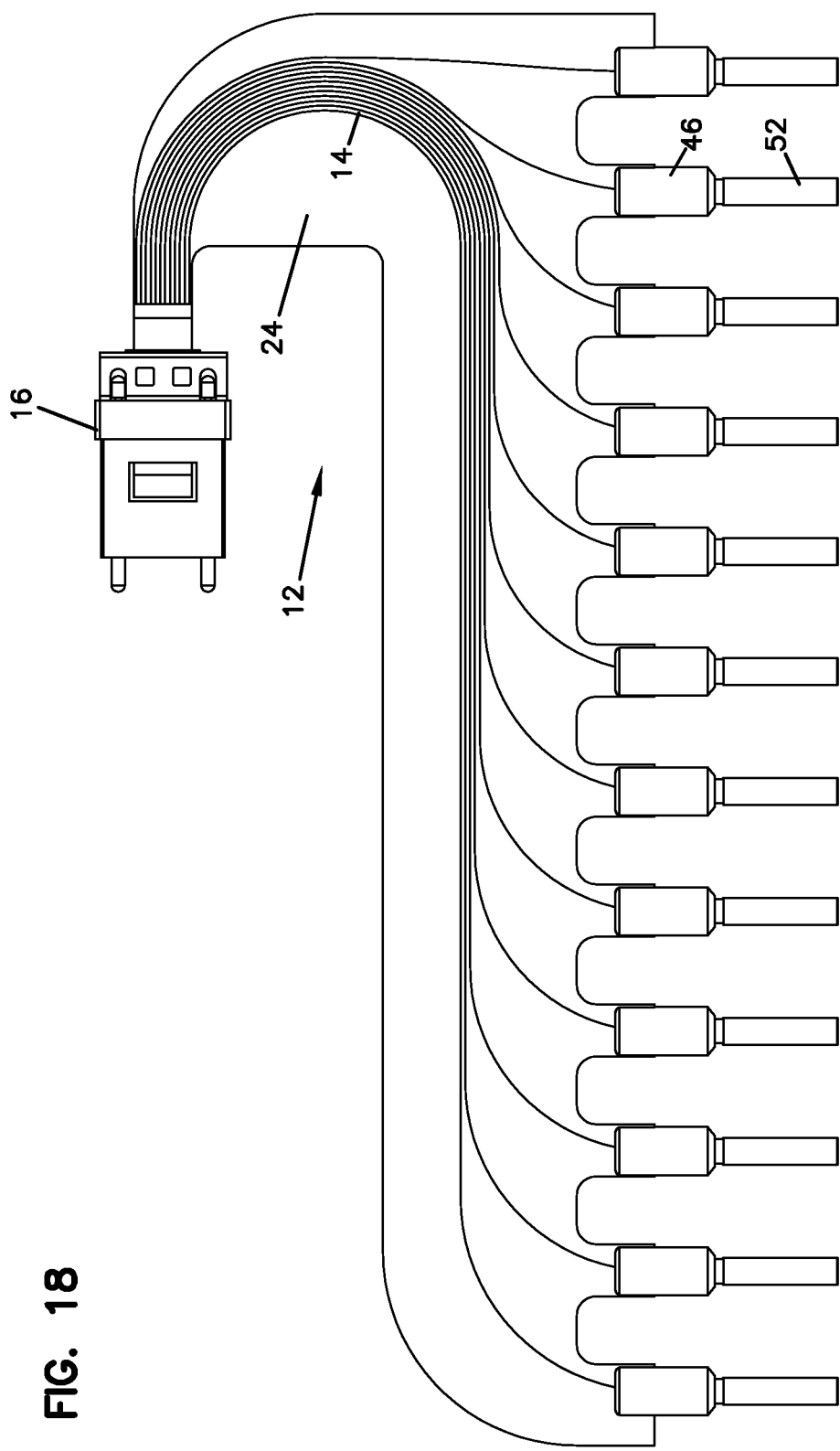
FIG. 18 is a bottom plan view of the flexible optical circuit of FIG. 16.
Figure 19:
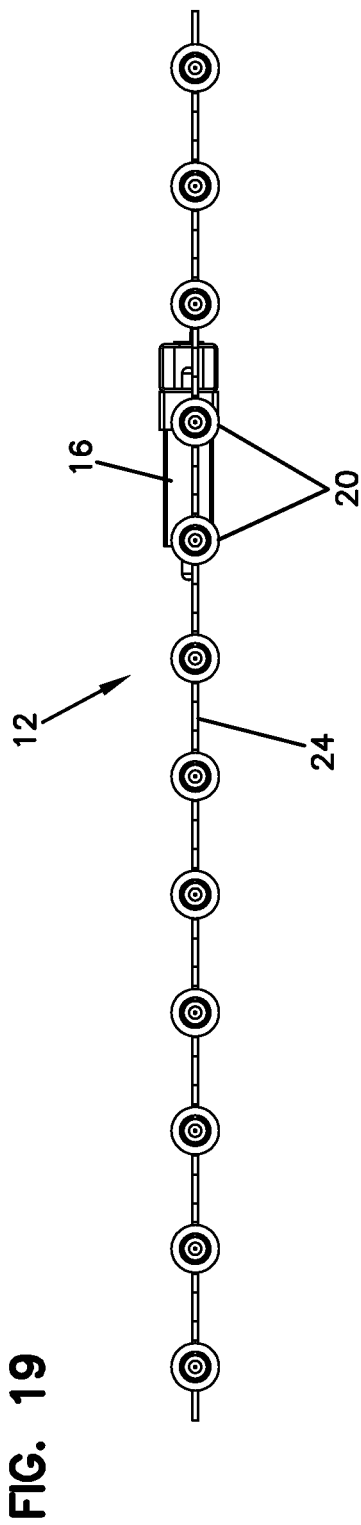
FIG. 19 is a front elevational view of the flexible optical circuit of FIG. 16.
Figure 20:
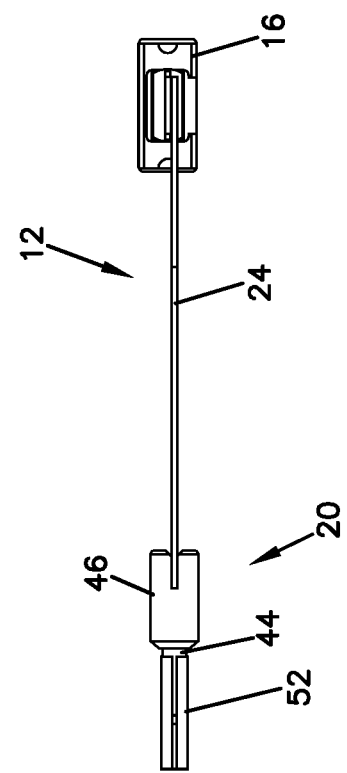
FIG. 20 is a left side view of the flexible optical circuit of FIG. 16.
Figure 21:
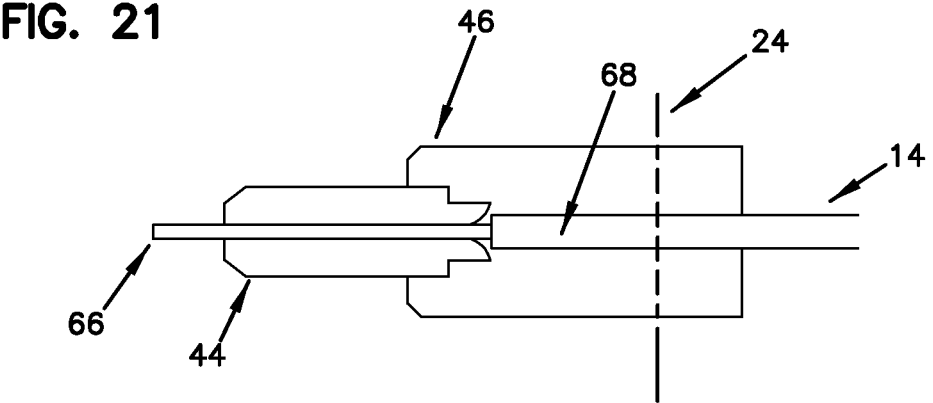
FIG. 21 is a diagrammatic view illustrating a top cross-sectional view of one of the ferrule assemblies of the flexible optical circuit placed within the cassette of FIG. 1, the cross-section taken by bisecting the ferrule assembly along its longitudinal axis.
Figure 22:
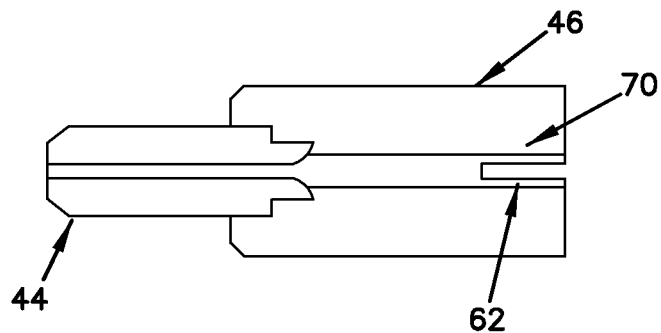
FIG. 22 is a diagrammatic view illustrating a side cross-sectional view of the ferrule assembly of FIG. 21, the cross-section taken by bisecting the ferrule assembly along its longitudinal axis.
Figure 23:
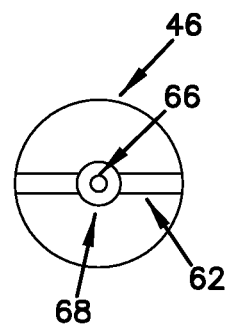
FIG. 23 is a diagrammatic view illustrating the ferrule assembly of FIG. 21 from the rear side.
Figure 24:
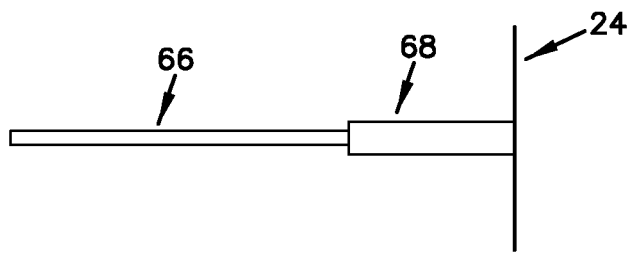
FIG. 24 is a diagrammatic view illustrating a side view of one of the pigtails extending from the substrate of the flexible optical circuit to be terminated to the ferrule assembly of FIG. 21.
Figure 25:
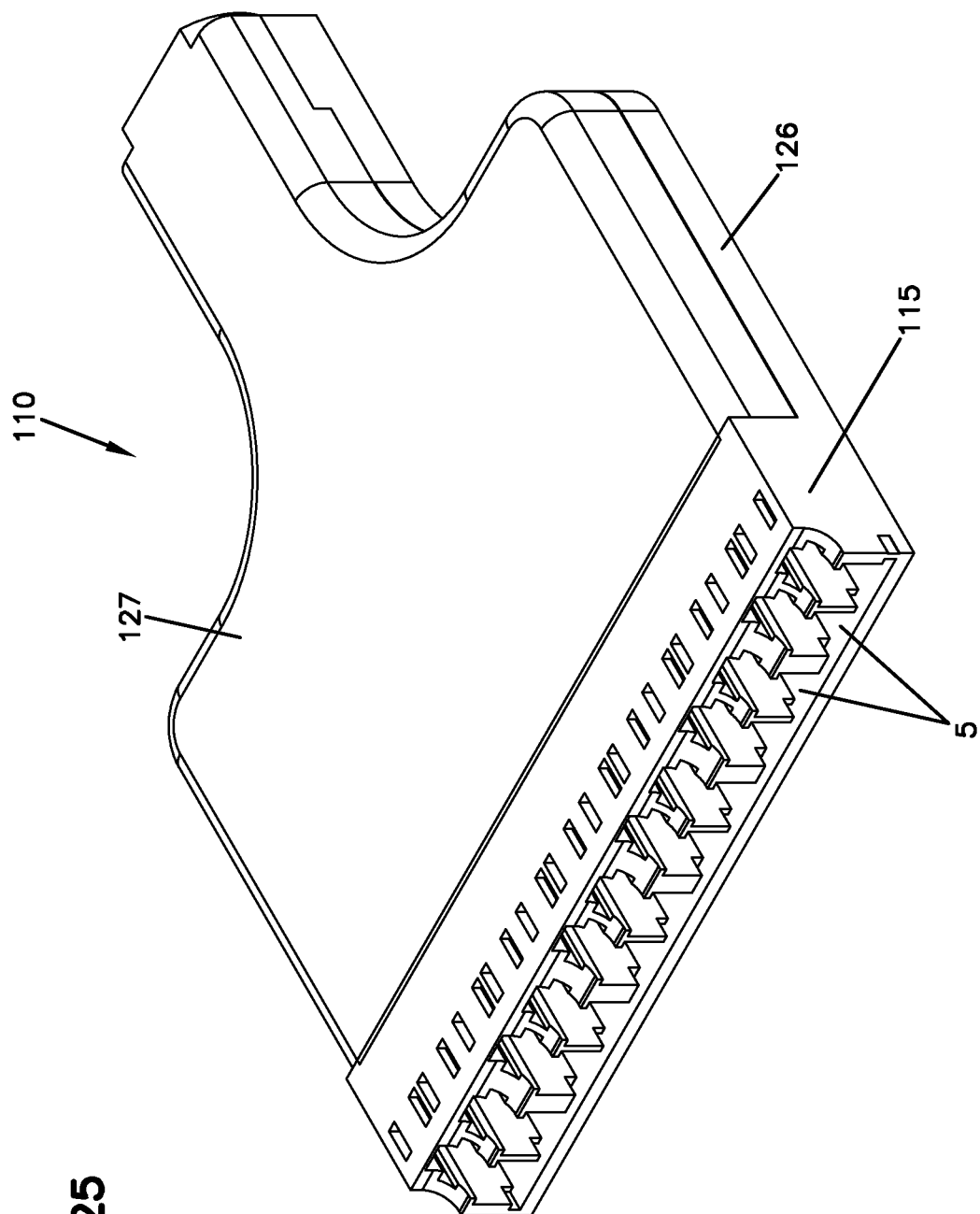
FIG. 25 is a top, front, right side perspective view of a second embodiment of a fiber optic cassette having features that are examples of inventive aspects in accordance with the present disclosure, the fiber optic cassette shown in a fully-assembled configuration.
Figure 26:
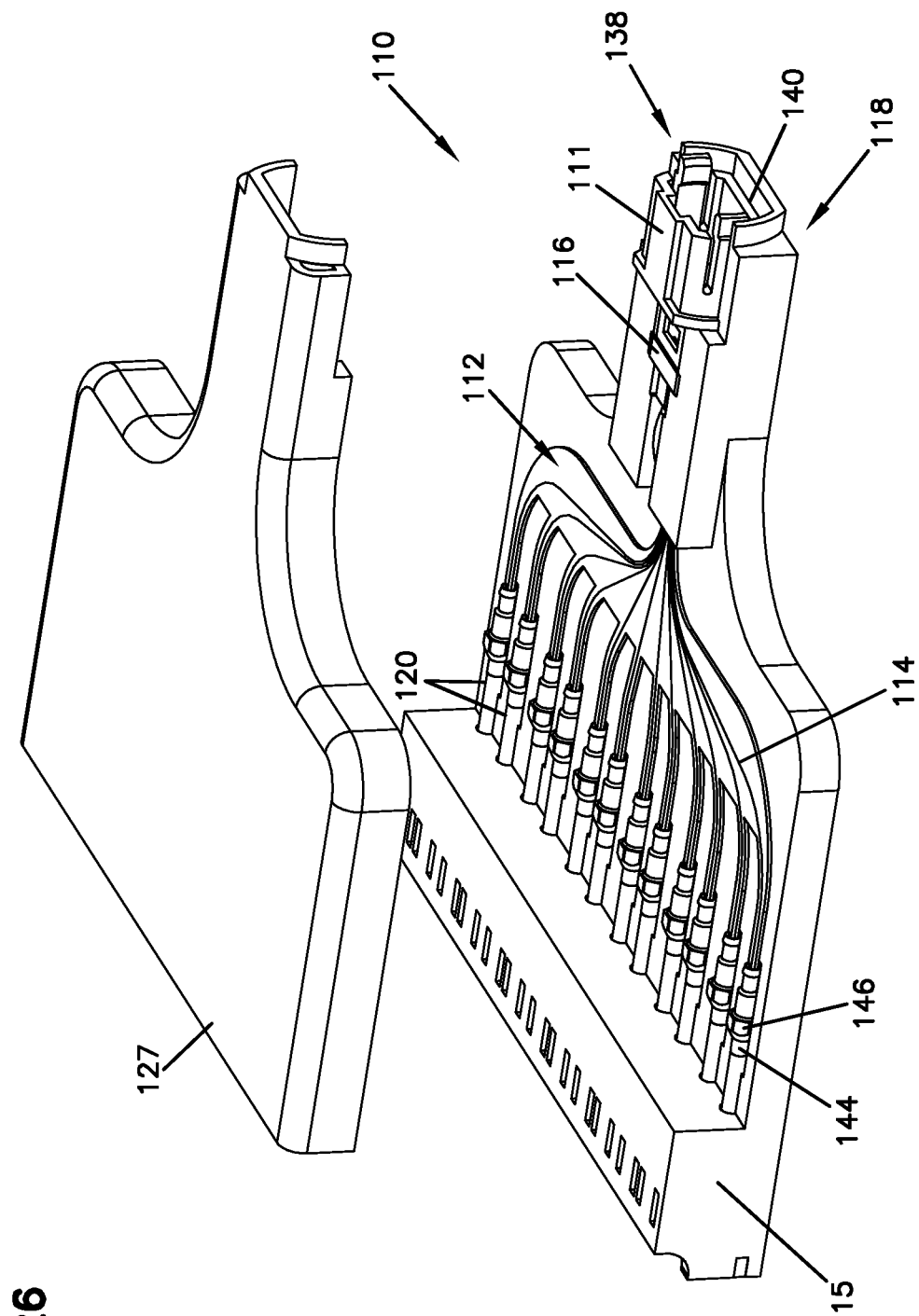
FIG. 26 is a partially exploded view of the fiber optic cassette of FIG. 25 taken from a top, rear, right side perspective of the fiber optic cassette.
Figure 27:
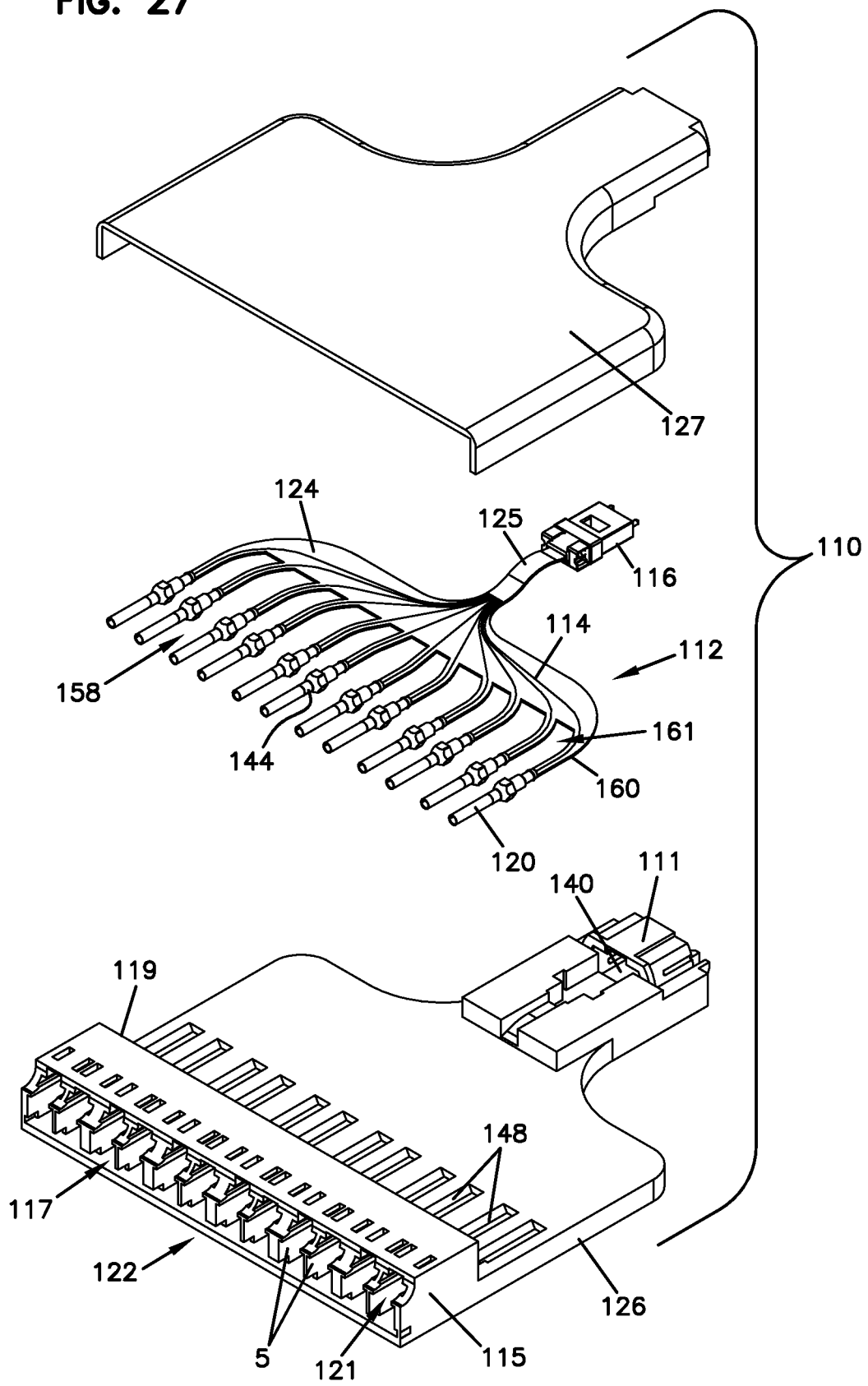
FIG. 27 is a fully exploded view of the fiber optic cassette of FIG. 25 taken from a top, front, right side perspective of the fiber optic cassette.
Figure 28:
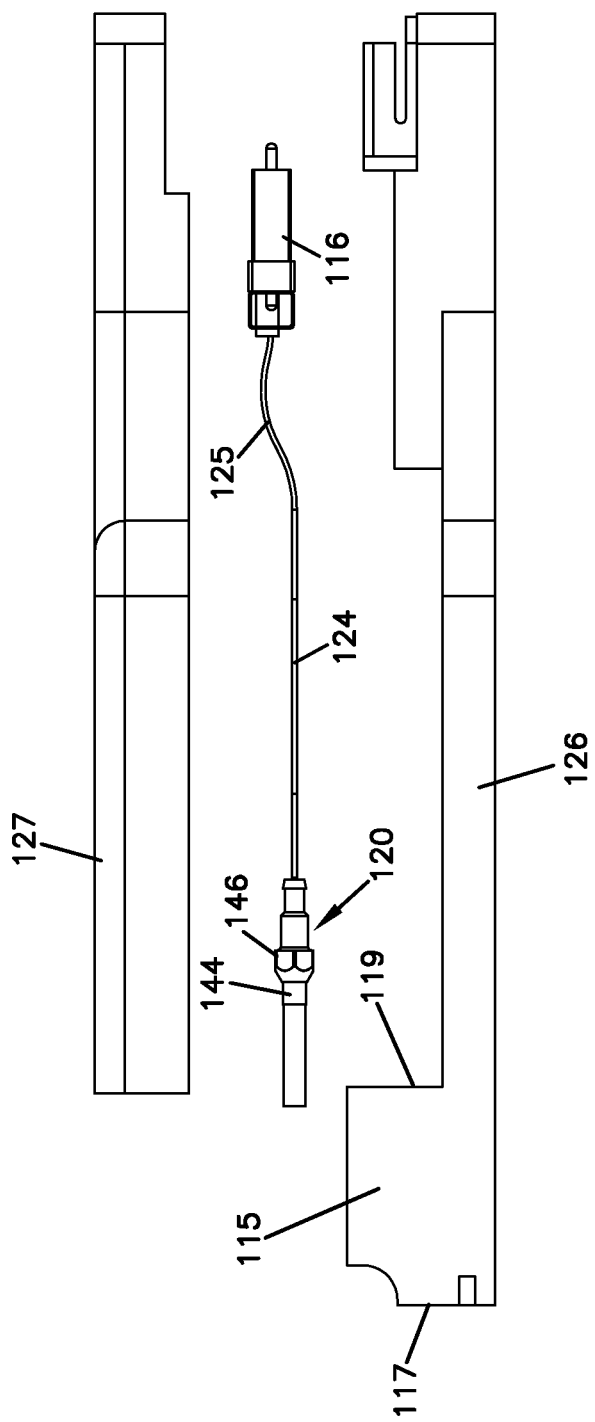
FIG. 28 is a fully exploded right side view of the fiber optic cassette of FIG. 25.
Figure 29:
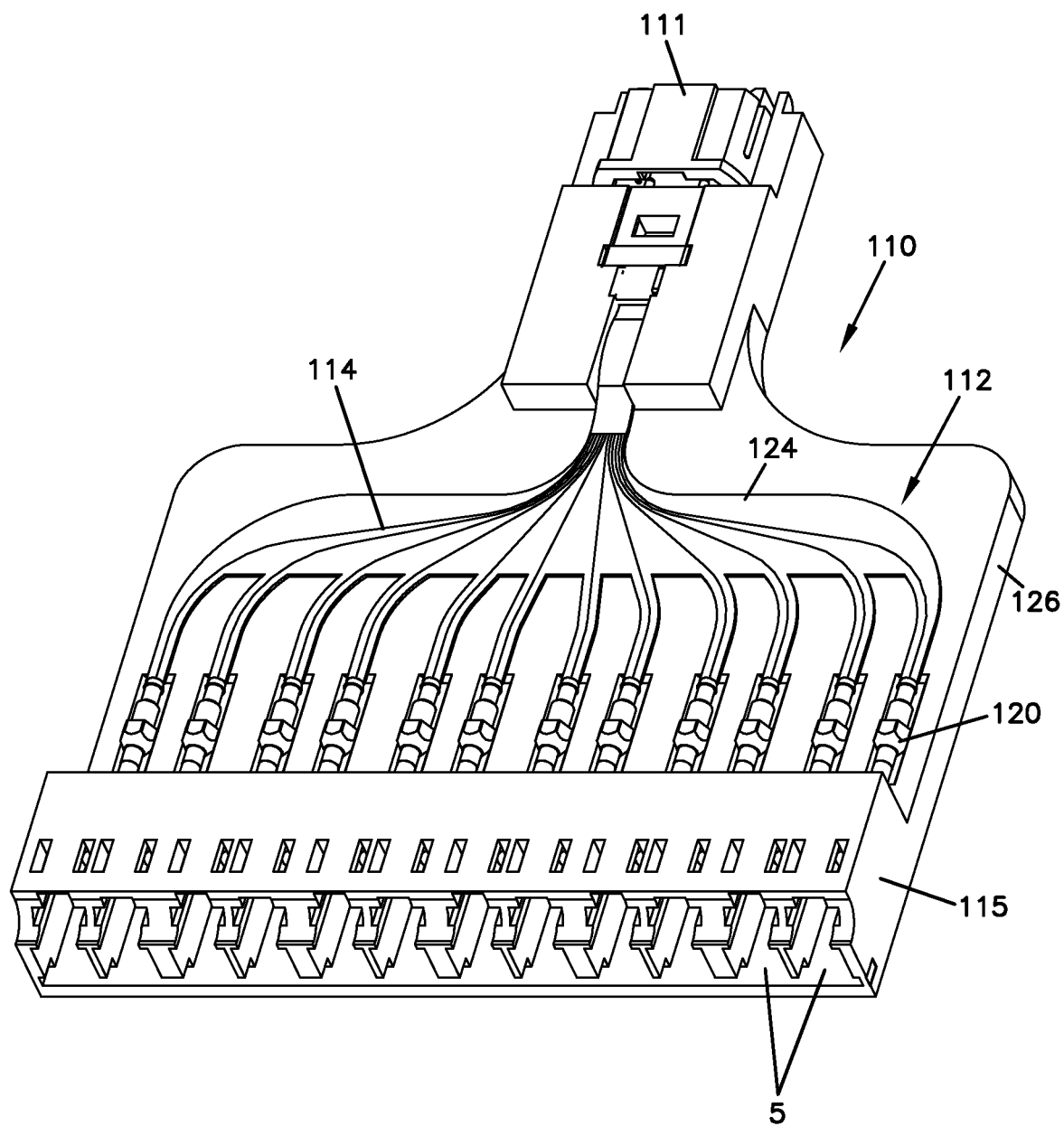
FIG. 29 is a partially assembled view of the fiber optic cassette of FIG. 25 taken from a top, front, right side perspective of the fiber optic cassette, wherein the cover has been removed to expose the interior features of the fiber optic cassette.
Figure 30:
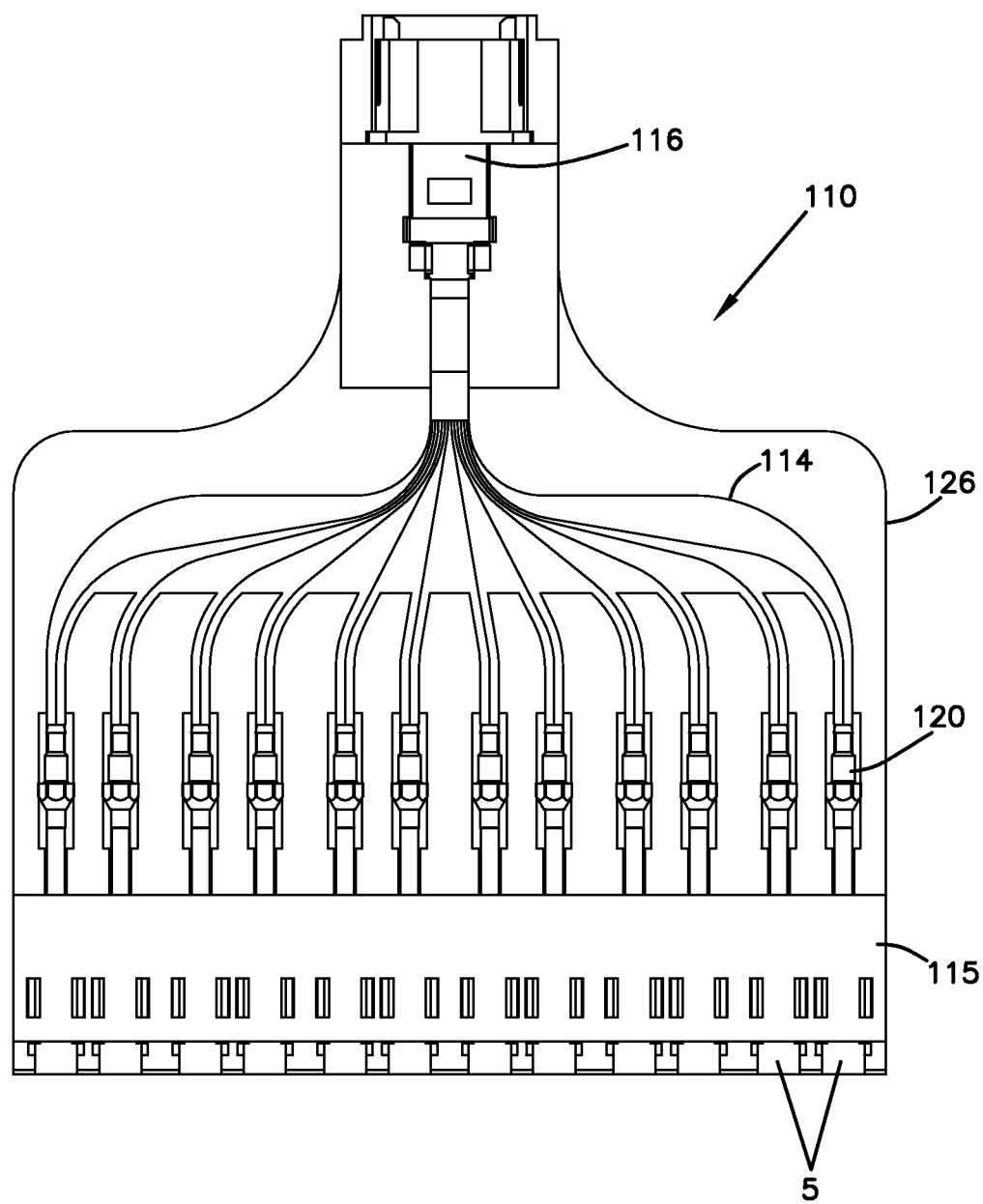
FIG. 30 is a top plan view of the partially assembled fiber optic cassette of FIG. 29.
Figure 31:
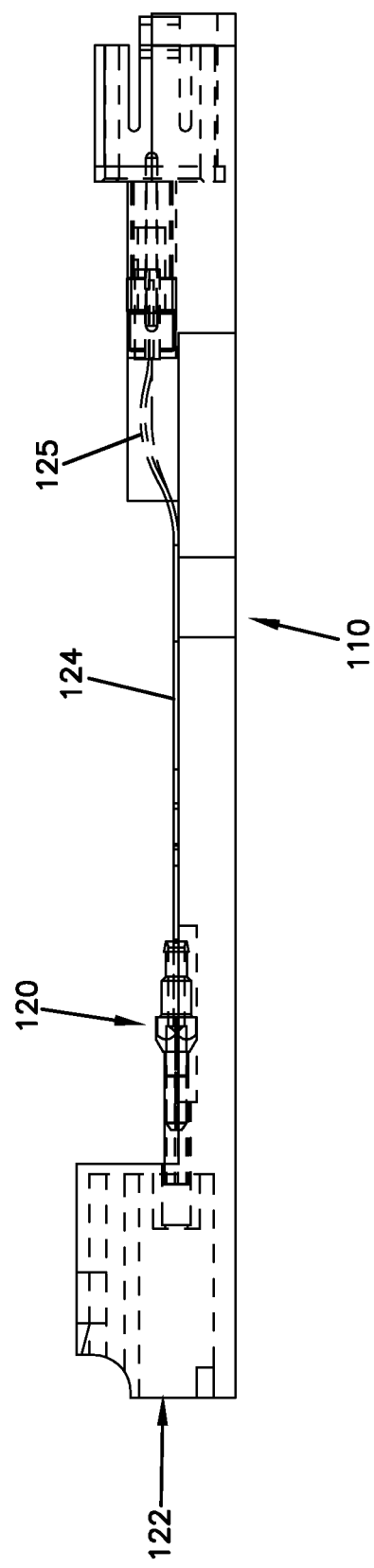
FIG. 31 is a right side view of the partially assembled fiber optic cassette of FIG. 29.
Figure 32:
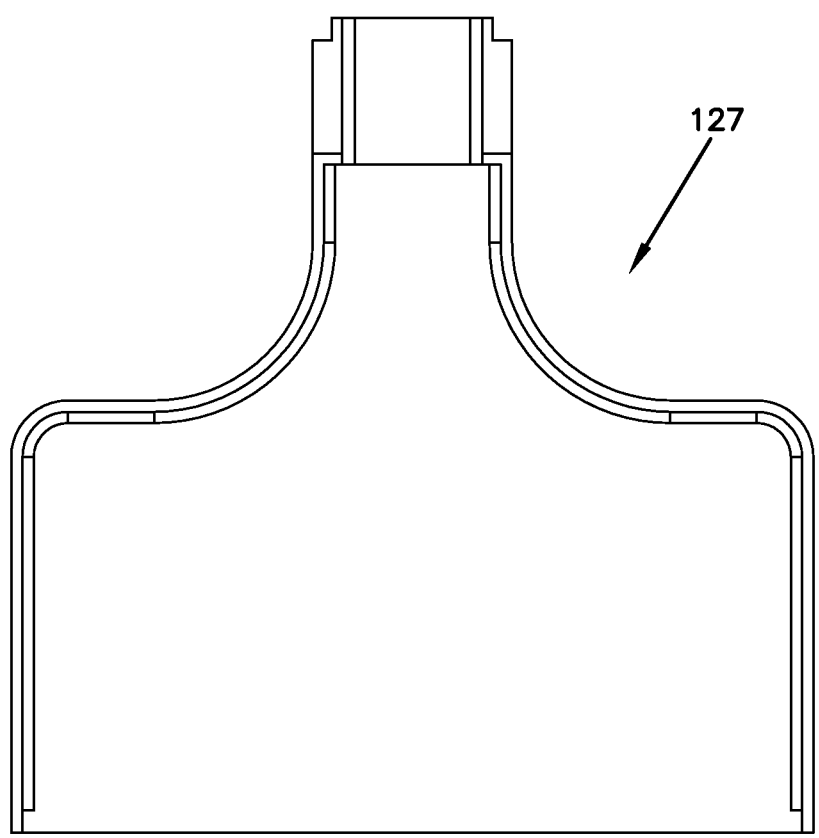
FIG. 32 is a bottom plan view of the cover of the fiber optic cassette of FIG. 25.
Figure 33:
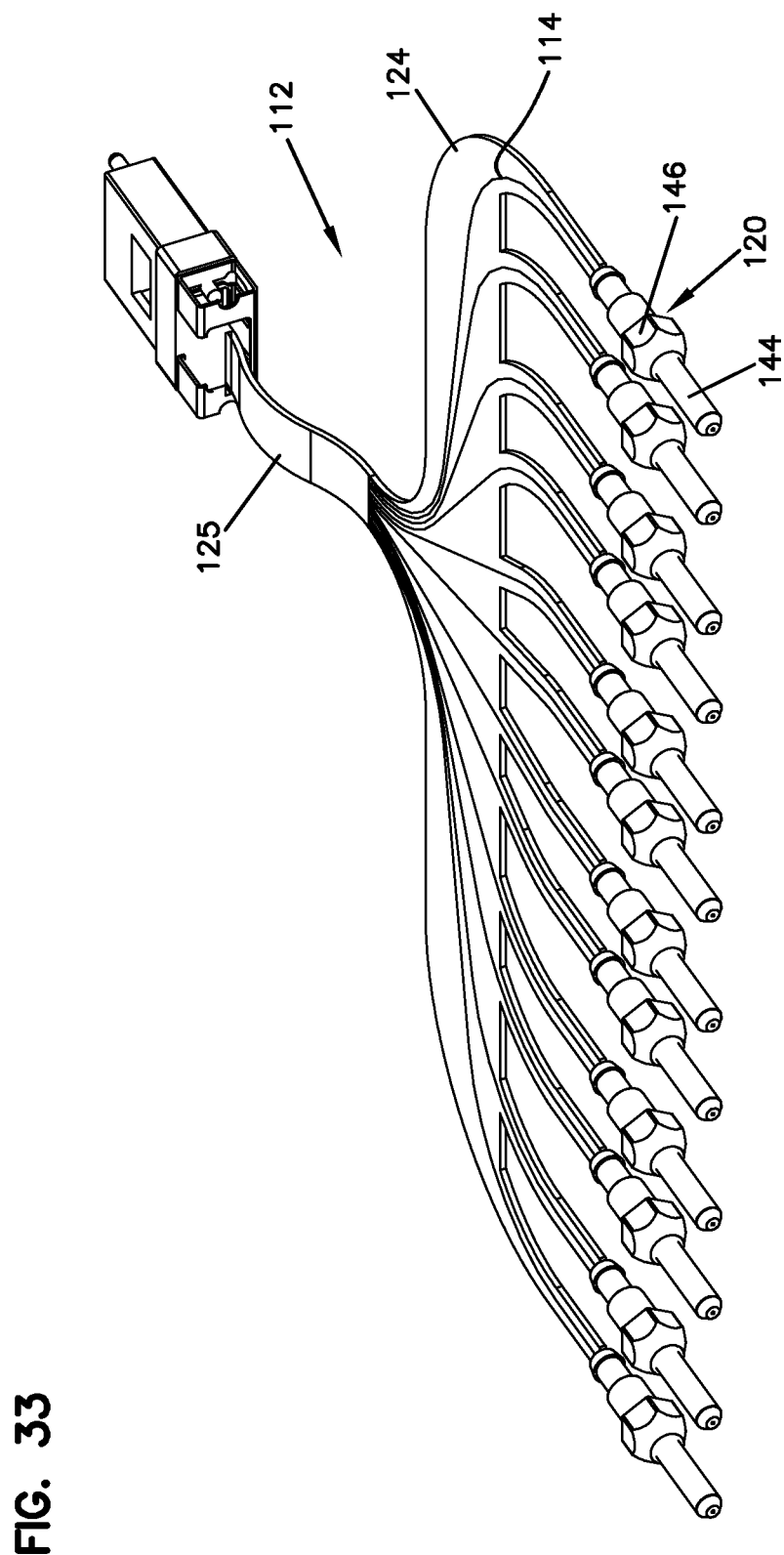
FIG. 33 is a top, front, right side perspective view of the flexible optical circuit of the fiber optic cassette of FIG. 25.
Figure 34:
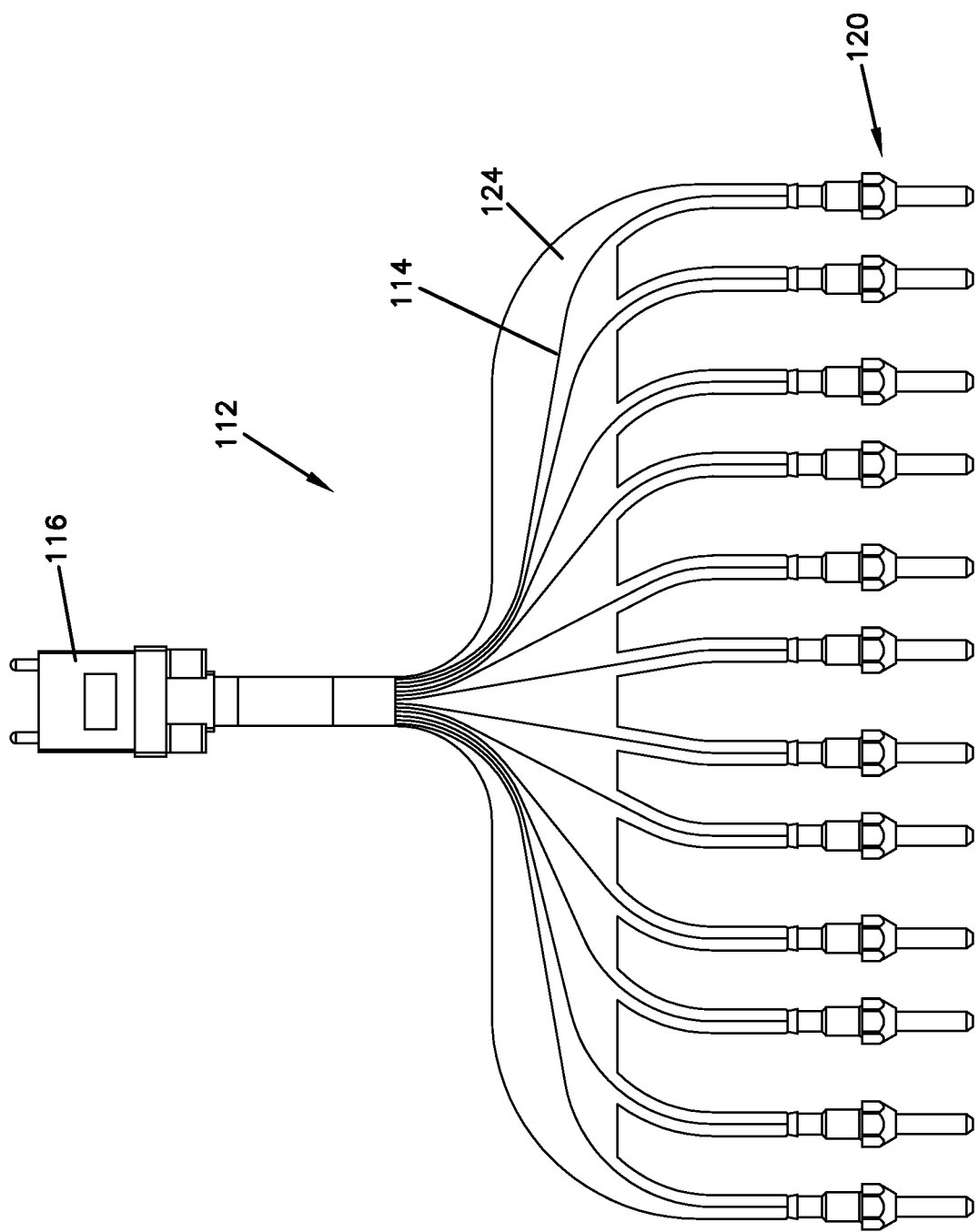
FIG. 34 is a top plan view of the flexible optical circuit of FIG. 33.

In the embodiment of the fiber optic cassette 10 shown in FIGS. 1-24, the non-conventional connectors 20 that are positioned adjacent the front 22 of the cassette 10 each define a hub 46 mounted over the ferrule 44. A cross-section of the interface is seen in FIGS. 15 and 15A. Each ferrule 44 is configured to terminate one of the fibers 14 extending out from the flexible circuit 12, as shown in FIGS. 21-24.

The non-conventional connectors 20 are placed within pockets 48 provided at a connection block or array 50 located at the front 22 of the cassette 10. A split sleeve 52 is also provided for ferrule alignment between the hub 46 and ferrule 44 of each non-conventional connector 20 and the ferrule of another mating connector that enters the cassette 10 from the front 22.

The mating connectors entering the cassette 10 from the front 22 of the cassette 10 may be connected through fiber optic adapters that are mounted on the connection block 50. The cassette 10 of FIGS. 1-24 is shown without the rows of adapters at the front 22 of the cassette 10 that would allow conventional connectors such as LC connectors to be mated to the non-conventional connectors 20 located within the interior 28 of the cassette 10. Such adapters or adapter blocks may be snap fit, ultrasonically welded, or otherwise attached to the rest of the cassette body 26. In the versions of the fiber optic cassettes 110, 210 illustrated in FIGS. 25-36 and 40-42, respectively, the rows of fiber optic adapters 5 are shown on the cassettes 110, 210.

In the illustrated embodiment of the cassette 10 of FIGS. 1-24, the adapters that would be used with the cassette 10 are sized to receive mating LC connectors. SC connectors can also be used with appropriate sized adapters.

The cassette 10 of FIGS. 1-24 can be sealed or can be openable, so as to allow repair, or cleaning of the inner hubs 46 and ferrules 44. In some cases, the adapter blocks can be snap fit to a rest of the body 26 for ease of assembly. Adapter blocks can also preferably be removed from a rest of the cassette 10 to allow for cleaning of the inner non-conventional connector 20. The flexible fiber optic circuit 12 allows the entire fiber bundle, including the MPO connector 16, to be able to be removed for cleaning or replacement.

Referring specifically now to FIGS. 13 and 16-24, fiber pigtails 14 extending out from a rear end 54 of the substrate 24 forming the flexible optical circuit 12 are ribbonized for termination to an MT ferrule 56 of the MPO connector 16. The fiber pigtails 14 extending out from a front end 58 of the substrate 24 are individually terminated to the ferrules 44 to be positioned at the front 22 of the cassette 10. As shown, the substrate 24 defines front extensions 60 (one per fiber 14) each provided in a spaced apart configuration for providing some flexibility to the substrate 24. The individual fibers 14 are separated out from the ribbonized section at the rear 54 of the substrate 24 and are routed through the substrate 24 to the individual front extensions 60. Each ferrule hub 46 defines a notch or a cut-out 62 for receiving front portions 64 of the front extensions 60 of the substrate 24.

Fiber pigtails 14 that extend from each of the front extensions 60 of the substrate 24 are illustrated in FIGS. 21-24 diagrammatically. Referring now to the diagrammatic views of FIGS. 21-24, according to one example embodiment, the fiber pigtails 14 extending from the substrate 24 may be defined by an optical fiber 66 that is made up of a fiber core surrounded by a cladding layer. A portion 68 of the front extension 60 of the substrate 24 forming the flexible optical circuit 12 is inserted into a cylindrical bore 70 extending through the center of the ferrule hub 46, while an exposed optical fiber 66 that is made up of the fiber core and the surrounding cladding (after the primary coating has been stripped) is inserted into the ferrule 44 (see FIG. 21). The cut-out 62 of the ferrule hub 46 receives the portion 68 of the front extension 60 of the substrate 24 in stabilizing the termination.

According to one example process step, by using a rigid substrate, when the fibers are being terminated to the ferrules 44, the ends of the fibers may be cleaved and ends of all of the ferrules 44 extending from the substrate 24 may be polished simultaneously.

As shown in FIGS. 11-13, 15, and 15A, in addition to the inherent ability of the substrate 24 of the flexible optical circuit 12 to provide a bias for the ferrules 44 of the non-conventional connectors 20 at the front 22 of the cassette 10 for ferrule interface variations, other structures may be used to supplement the inherent bias of the flexible circuit 12. For example, in the depicted embodiment of the cassette 10, a spring clip 72 is positioned within a pocket 74 in the cassette 10 and extends parallel to the longitudinal axis A of the cassette body 26. In a conventional fiber optic connector, the ferrule assemblies normally include springs such that when they are mated in an adapter, the ferrules are pressed together against the bias of the spring. In the depicted cassette 10, the spring clip 72 may be positioned to abut rear ends 75 of the ferrule hubs 46 so as provide some bias to the ferrules 44 when they are mating incoming connectors. The flexibility of the substrate 24 of the flexible optical circuit 12 allows the ferrules 44 of the non-conventional connectors 20 to flex back and the spring clip 72 provides additional bias to force them forwardly. The spring clip 72 may be adhered to the portions of the cassette 10 for rigidly fixing the spring clip 72 within the cassette 10.

It should be noted that a structure such as the spring clip 72 can be used on any of the embodiments of the fiber optic cassettes described and illustrated in the present application.

Referring now to FIGS. 25-36, another embodiment of a fiber optic cassette 110 is illustrated. The fiber optic cassette 110, similar to the cassette 10 of FIGS. 1-24, utilizes a flexible fiber optic circuit 112 within the body 126 for relaying fibers 114. In this embodiment, a multi-fiber connector 116 (in the form of an MPO connector) is oriented parallel to non-conventional connectors 120 that are at the front 122 of the cassette 110, generally perpendicular to the longitudinal axis A defined by the cassette 110. The multi-fiber connector 116 is mounted to the cassette 110 via a multi-fiber adapter 111 seated within a pocket 140 at a rear 118 of the cassette 110.

The flexible circuit 112 is configured to transition fibers 114 from the multi-fiber connector 116 at the rear 118 defining the signal entry location 138 to non-conventional connectors 120 at the front 122 of the cassette 110. The cassette 110 is shown to include multiple rows of adapters 5 in the form of an adapter block 115 at the front 122 of the cassette 110. Via the adapters 5, conventional connectors such as LC connectors may be mated with ferrules 144 of the non-conventional connectors 120 located at the front 122 of the cassette 110. The adapters 5 are arranged linearly and positioned along longitudinal axis A. In the illustrated embodiment, adapters 5 are sized to receive front LC connectors. SC connectors can also be used with appropriate sized adapters. In the illustrated embodiment, the adapters 5 are formed in a block construction 115 having a front end 117, and an opposite rear end 119. Front end 115 includes a profile for receiving LC connectors. At the rear end 119 of the adapter block 115, the ferrule assemblies of the non-conventional connectors 120, including the ferrule hubs 146 and the ferrules 144, are seated in pockets 148 aligned with ports 121 of the adapters 5. For each connector pair, a split sleeve 152 is also provided for ferrule alignment between hub and ferrule of each non-conventional connector 120 and the ferrule of a conventional LC connector.

As shown and as discussed previously, the adapter blocks 115 may be snap fit, ultrasonically welded or otherwise attached to a rest of the cassette body 126 or formed as part of the body 126. A cover 127 may be used to cover an area behind blocks 115. In FIGS. 26-31, the cassette 110 has been shown without the cover 127 to illustrate the internal features of the cassette 110.

As in the first embodiment of the cassette 10, the cassette 110 of FIGS. 25-36 is configured such that it can be sealed or can be openable, so as to allow repair, or cleaning of the inner hub 146 and ferrule 144. In some cases, the adapter blocks 115 can be snap fit to a rest of the body 126 for ease of assembly. Adapter blocks 115 can also preferably be removed from a rest of the cassette 110 to allow for cleaning of the inner non-conventional connector 120. The flexible fiber optic circuit 112 allows the entire fiber bundle, including the MPO connector 116 to be able to be removed for cleaning or replacement.

The termination of the fiber pigtails 114 extending from a front 158 of the substrate 124 of the flexible circuit 112 is similar to the termination for the ferrule assemblies described above with respect to the cassette 10 of FIGS. 1-24. At the rear 154 of the substrate 124, as described previously, the fibers 114 are ribbonized for termination to an MT ferrule 156.

The substrate 124 includes extensions 160 at the front side 158. The extensions 160 define cut-outs 161 between each one. The cutouts 161 allow flexibility for the substrate 124 and essentially enable the ferrules 144 of the non-conventional connectors 120 to be generally free floating structures to allow for movement in two different axes (e.g., upward/downward, front/back).

Referring specifically to FIGS. 27, 28, 31, 33, and 36, the substrate 124 of the flexible optical circuit 112 is also illustrated with a bent portion 125 adjacent the rear pocket 140 of the cassette 110. As discussed previously, one advantage of using a flexible substrate 124 to anchor the fibers 114 is to allow limited controlled movement of the substrate 124 either to accommodate any tolerance variances between the internal components and the cassette body 126 or to accommodate any movement of the internal ferrules 144 during connection to incoming connectors.

An example of a simple flexible optical circuit 312 having a substrate 324 that includes a design for controlled bending and allowing axial movement in the fibers 314 is illustrated in FIGS. 37-39. Either a U-bend or an S-bend 325 can be provided in the substrate 324 of the flexible optical circuit 312 for allowing axial movement for the fibers 314. With the tolerances of connector ferrules and molded polymeric structures (such as the cassette body), there can be a significant build up of ferrule interface variation. By allowing the substrate 324 of the flexible circuit 312 to bend in a controlled way, these tolerances can be accommodated.

Figure 40:
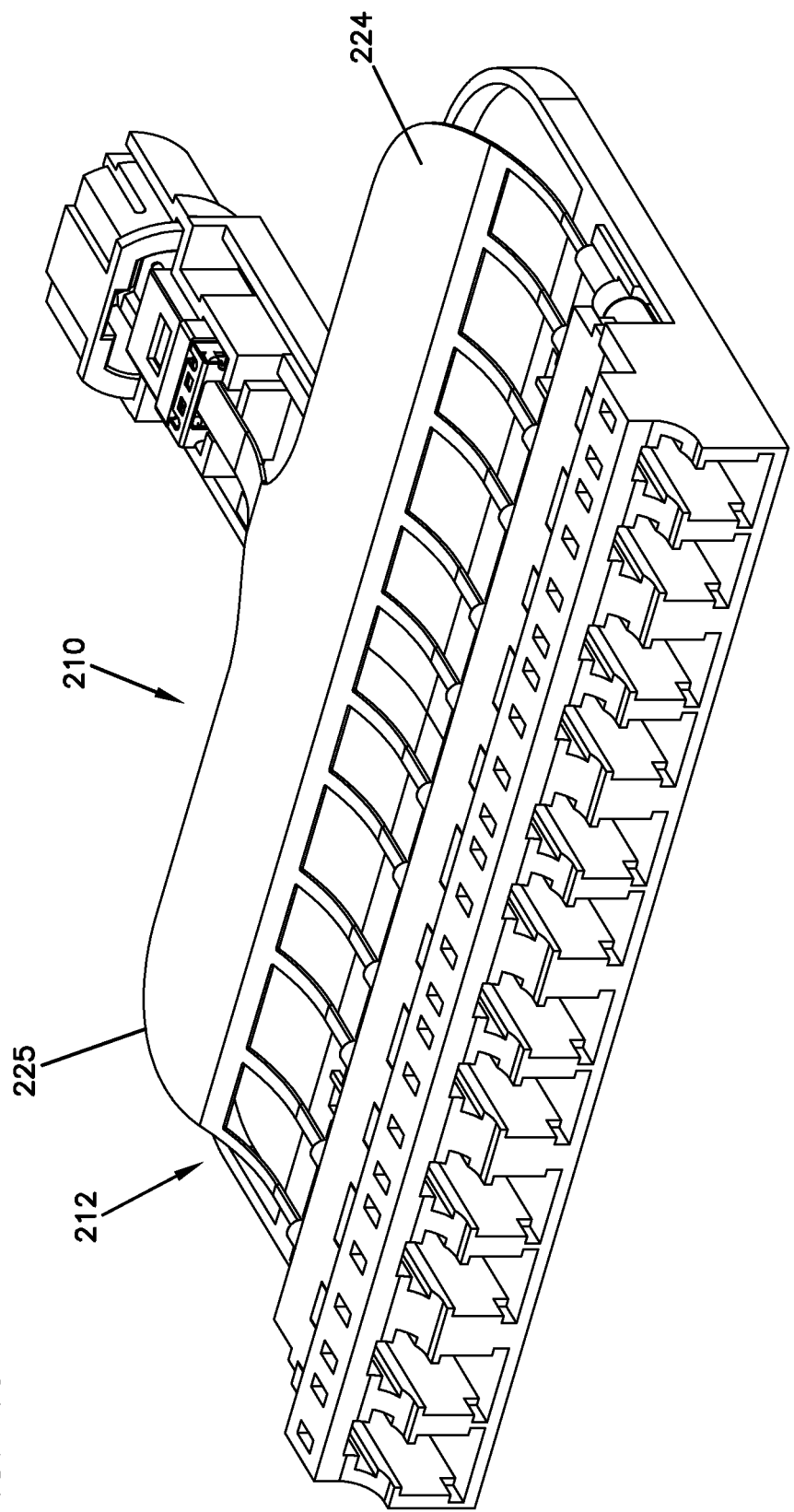
FIG. 40 is a top, front, right side perspective view of a third embodiment of a fiber optic cassette having features that are examples of inventive aspects in accordance with the present disclosure, the fiber optic cassette shown in a partially assembled configuration without the cover thereof.
Figure 41:
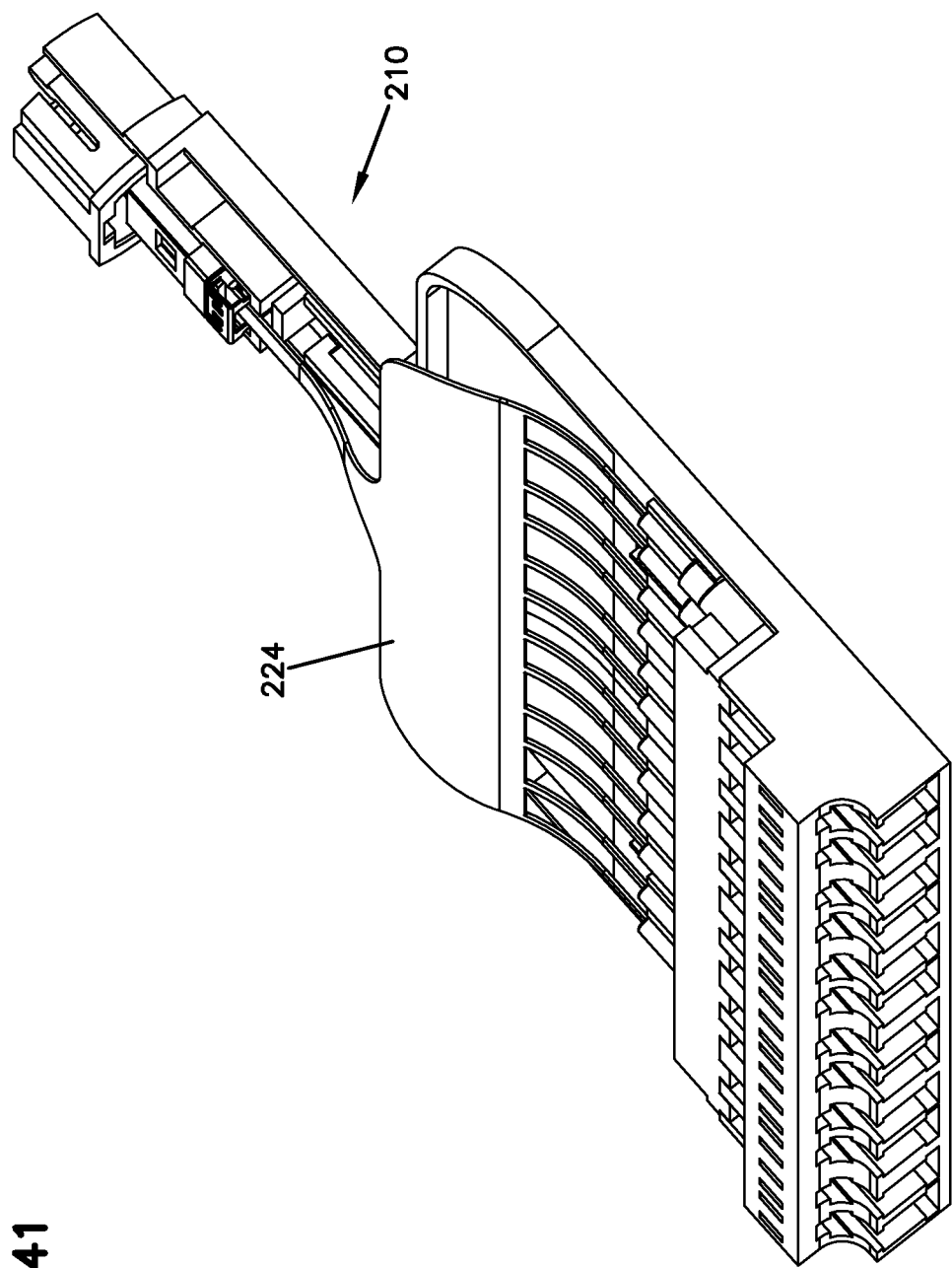
FIG. 41 is another top, front, right side perspective view of the fiber optic cassette of FIG. 40.
Figure 42:
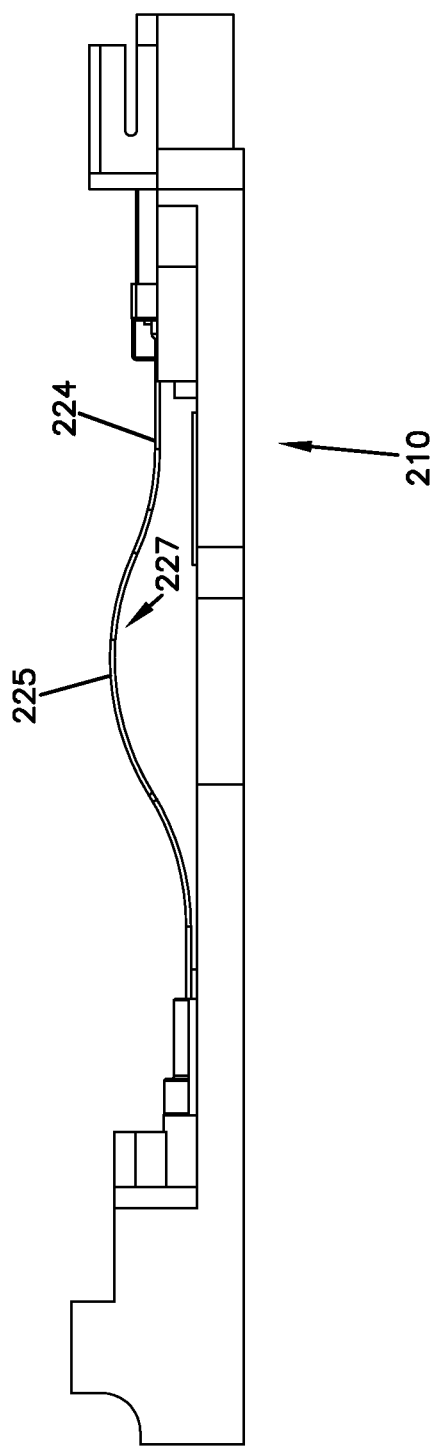
FIG. 42 is a right side view of the fiber optic cassette of FIG. 40.

FIGS. 40-42 illustrate another embodiment of a fiber optic cassette 210 utilizing a flexible optical circuit 212, wherein the bend 225 is provided generally in the middle portion 227 of the substrate 224 of the circuit 212. The substrate 224 of the cassette 210 of FIGS. 40-42 provides similar advantages as the cassettes 10, 110 described in previous embodiments.

Figure 43:
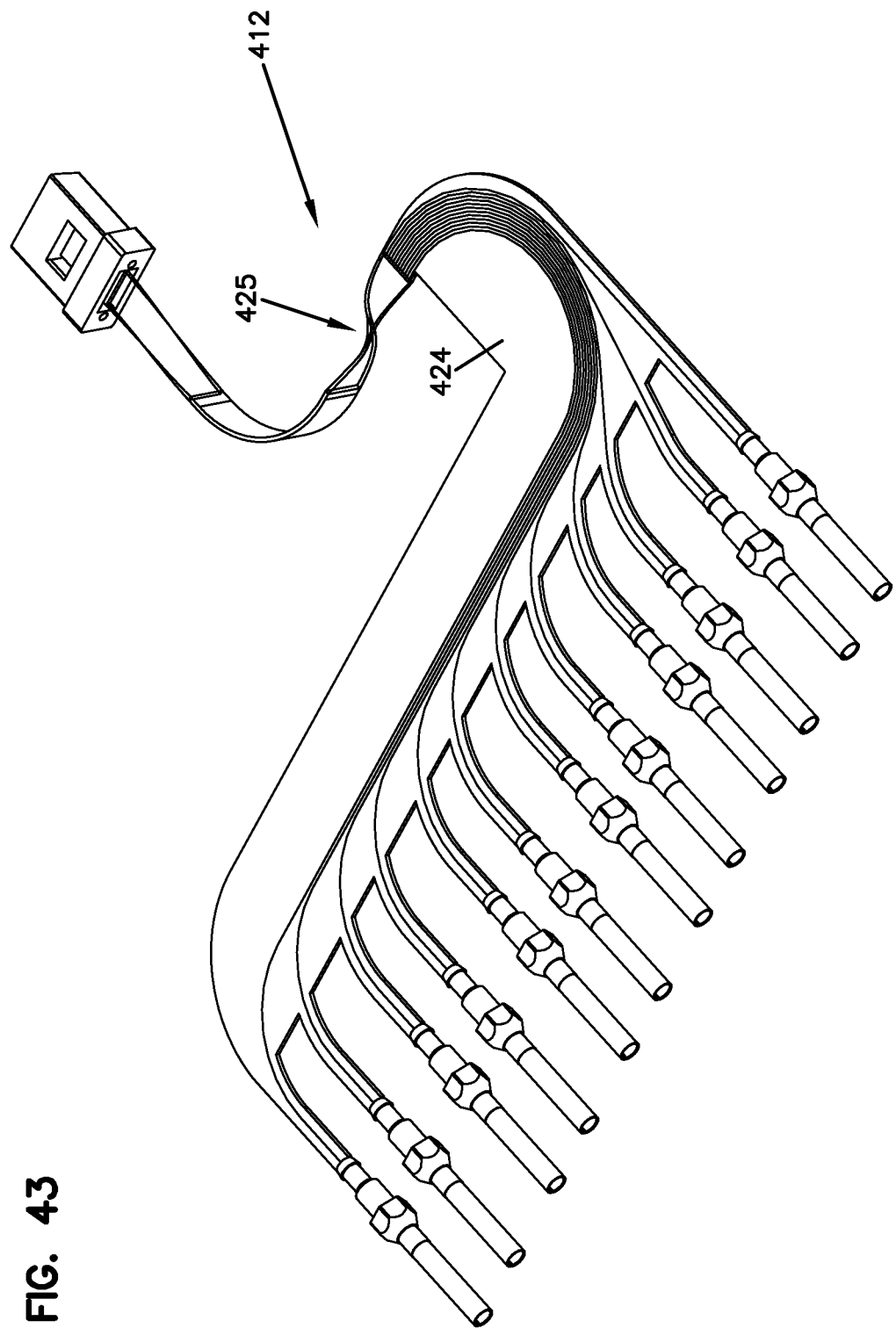
FIG. 43 illustrates a top, front, right side perspective view of a flexible optical circuit including a twist-bend in the substrate of the circuit.
Figure 44:
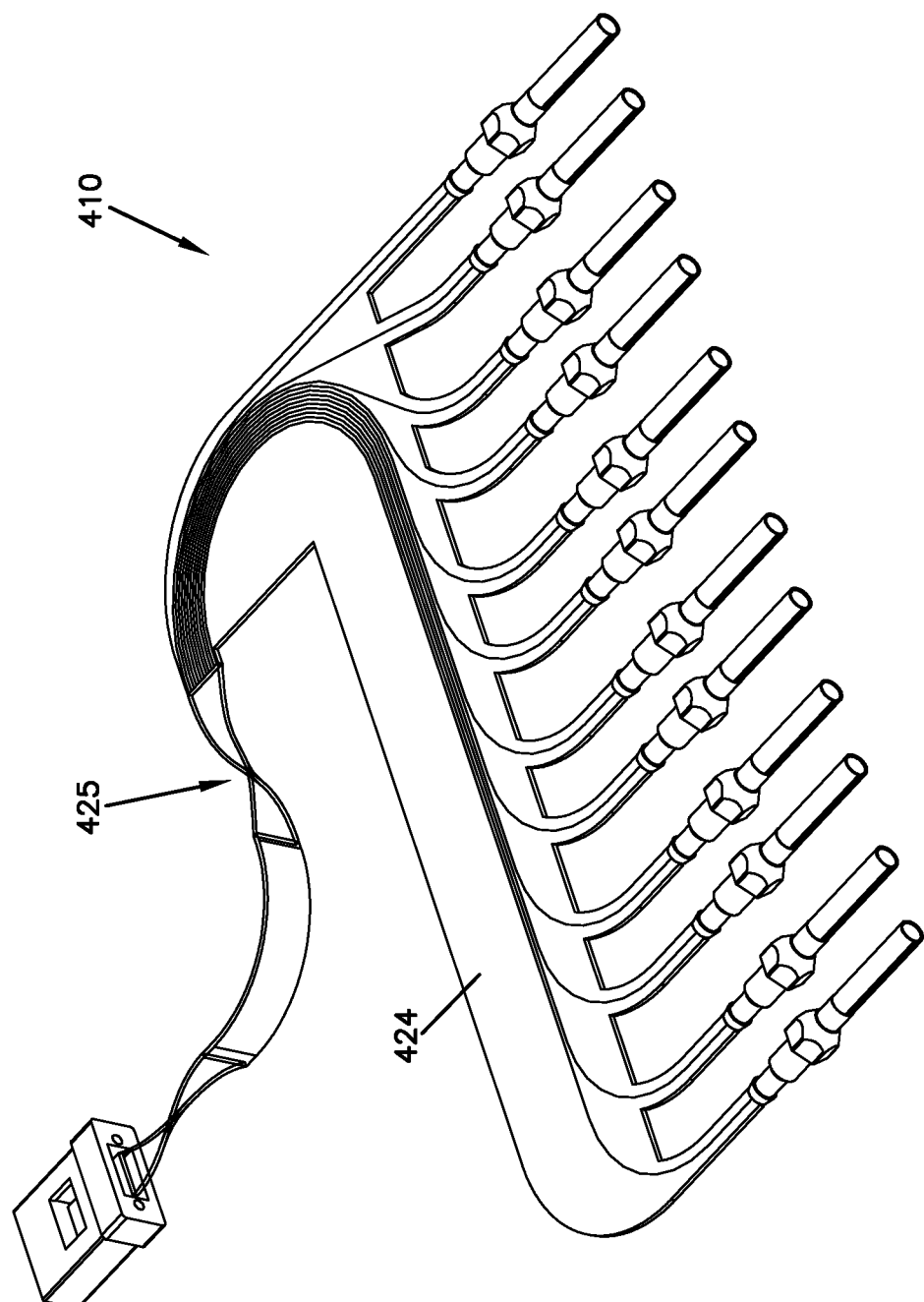
FIG. 44 is a top, front, left side perspective view of the flexible optical circuit of FIG. 43.
Figure 45:
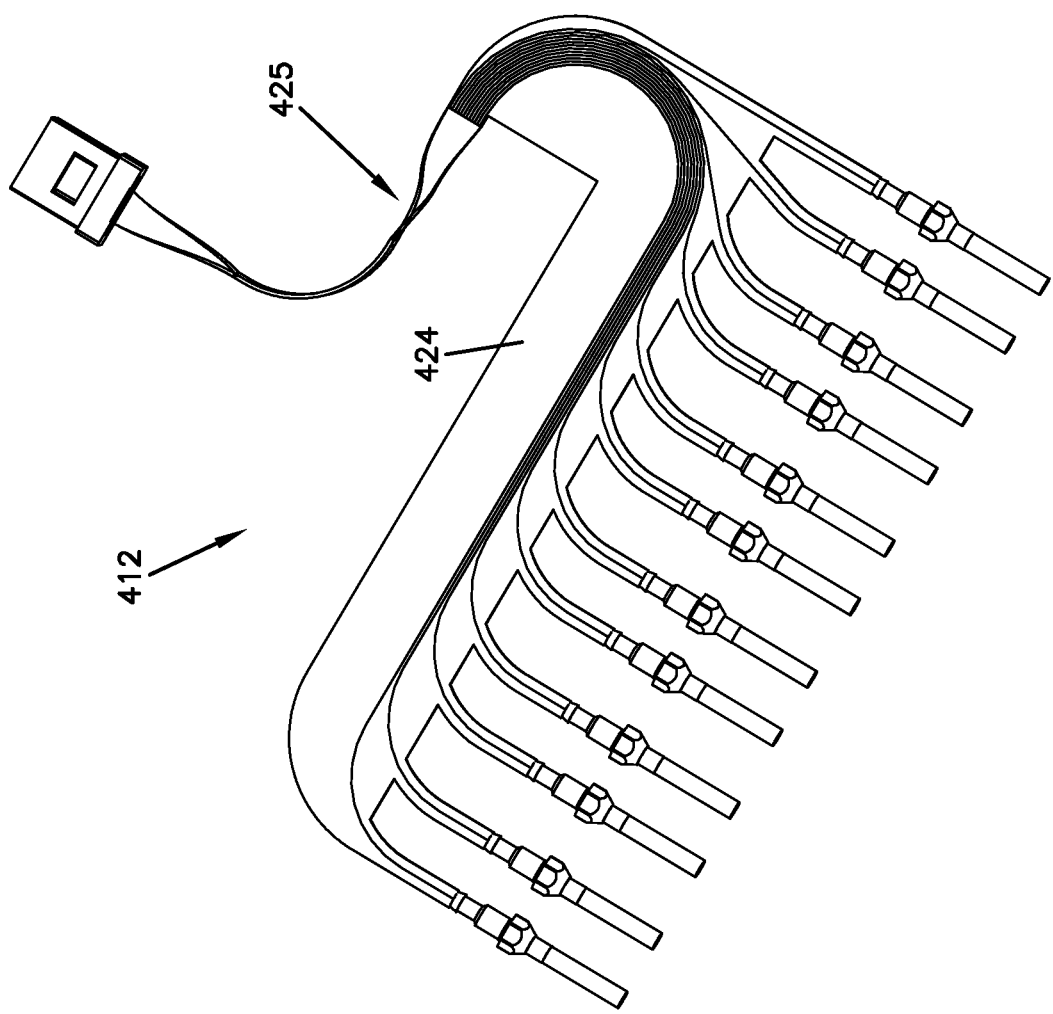
FIG. 45 is a top view of the flexible optical circuit of FIG. 43.
Figure 46:
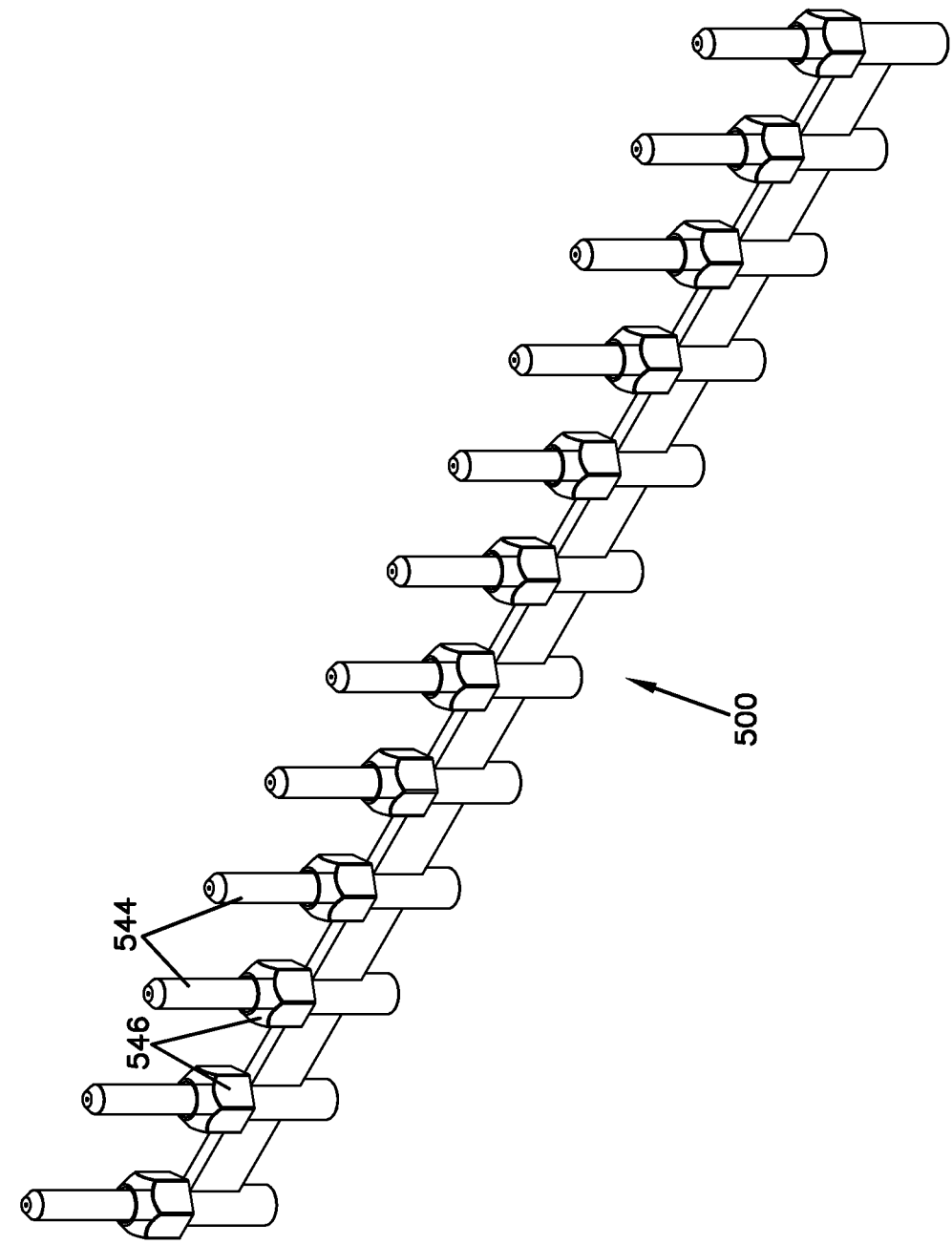
FIG. 46 is a perspective view of a multi-ferrule strip configured for use with the fiber optic cassettes of the present disclosure, the multi-ferrule strip including a plurality of ferrule hubs integrally molded together.
Figure 47:
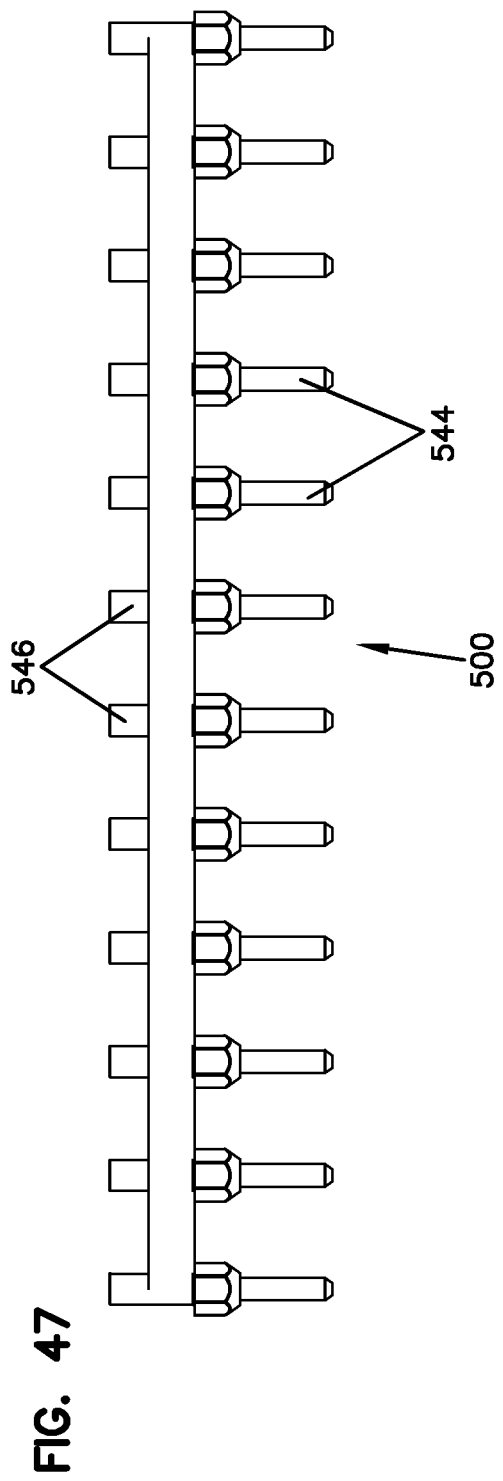
FIG. 47 is a top plan view of the multi-ferrule strip of FIG. 46.
Figure 48:
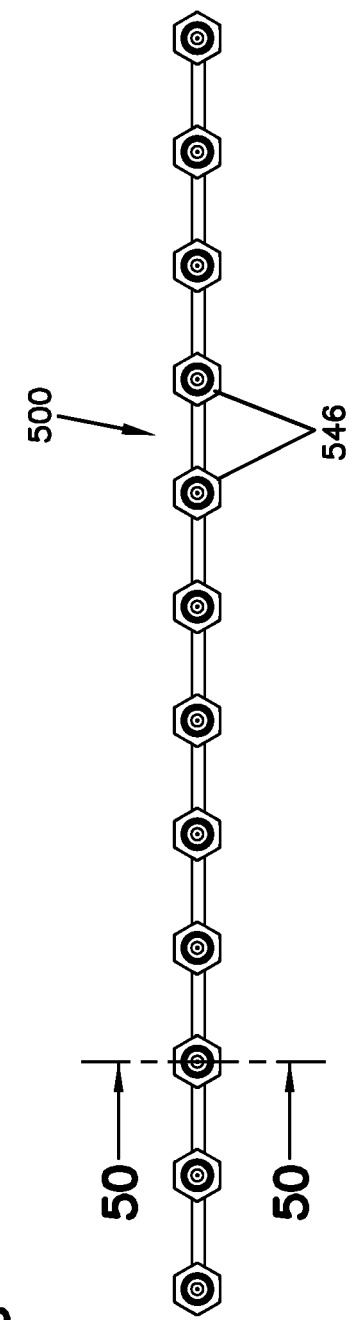
FIG. 48 is a front elevational view of the multi-ferrule strip of FIG. 46.
Figure 49:
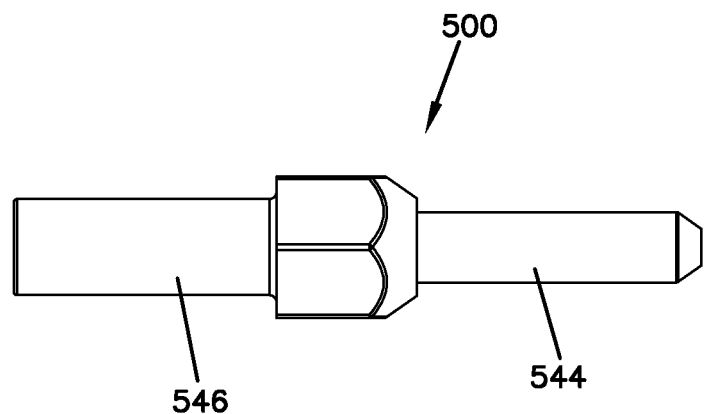
FIG. 49 is a left side view of the multi-ferrule strip of FIG. 46.
Figure 50:
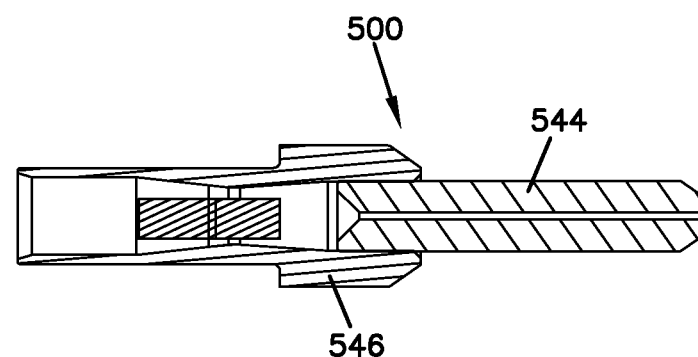
FIG. 50 is a cross-sectional view taken along line 50-50 of FIG. 48.

As another example, FIGS. 43-45 illustrate a flexible circuit 412 including a substrate 424 with a twist 425 in the ribbonized-fiber part of the substrate 424. Such a design can accommodate a large variation in distance between connector interfaces. As shown in the embodiment of the flexible circuit 412 of FIGS. 43-45, the MPO connector at the rear end of the substrate may define a longitudinal axis that is perpendicular to those of the non-conventional connectors at the front of the substrate 424. Thus, the fibers 14 extending from the MPO connector may follow an "S" or "Z" shaped pathway before being terminated to the front connectors. In the depicted embodiment, the optical fibers 14 enter the substrate 424 in a side-by-side, non-overlapping configuration and branch out therefrom as they extend to the non-conventional connectors at the front of the substrate. The substrate 424 allows the fibers 14 to follow such a path while preserving any minimum bend radius requirements. In a different example embodiment that will be discussed below shown in FIGS. 51, 52, the fibers entering the substrate at the back may be oriented parallel to the portions exiting from the front of the substrate. In such an example, the fibers may enter from the rear of the substrate, again, in a non-overlapping configuration and may branch out to the different non-conventional connectors at the front of the substrate, following minimum bend radius requirements.

Referring now to FIGS. 46-50, an embodiment of a ferrule strip 500 is illustrated. One of the issues normally encountered in assembly of the cassettes (e.g., 10, 110, 210) utilizing non-conventional connectors (e.g., 20, 120) at one end of the adapter blocks (e.g., 115) is the loading of the ferrule hubs (e.g., 46, 146) onto the flex circuit (e.g., 12, 112, 212) and handling of the ferrule hubs. According to one inventive method, the ferrules (e.g., 44, 144) may be over-molded with a polymeric multi-ferrule strip 500 that forms a plurality of integral hubs 546. The multi-ferrule strip 500 can be molded to hold the ferrules 544 at the correct pitch for insertion into the pockets (e.g., 48, 148) of the cassettes (e.g., 10, 110, 210).

Now referring generally to FIGS. 51-61, when using a flexible circuit that includes a plurality of fibers embedded therein, production yield may be a significant issue, especially given that all of the individual fibers have to be separately terminated into individual ferrules at the front of the flexible optical circuit. If there is any damage to one of the terminations (e.g., either to a fiber or to a ceramic ferrule), the entire flexible circuit may become unusable. The present disclosure contemplates methodologies for allowing individual retermination of the fibers if one of the optical fibers or ferrules fails.

Figure 51:
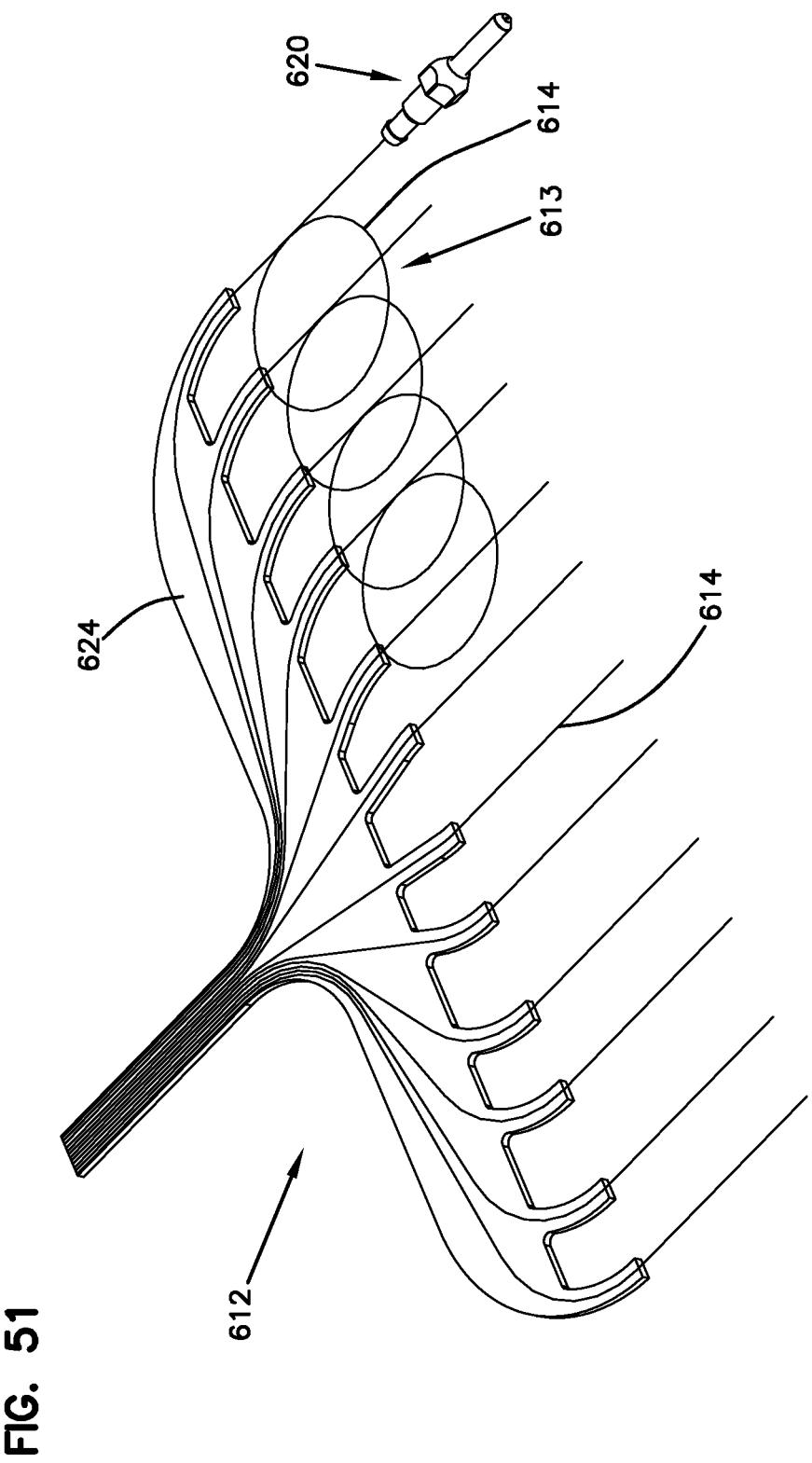
FIG. 51 is a perspective view of another embodiment of a flexible optical circuit including loops of buffered fiber between the substrate of the circuit and the ferrule assembly for repair/replacement.
Figure 52:
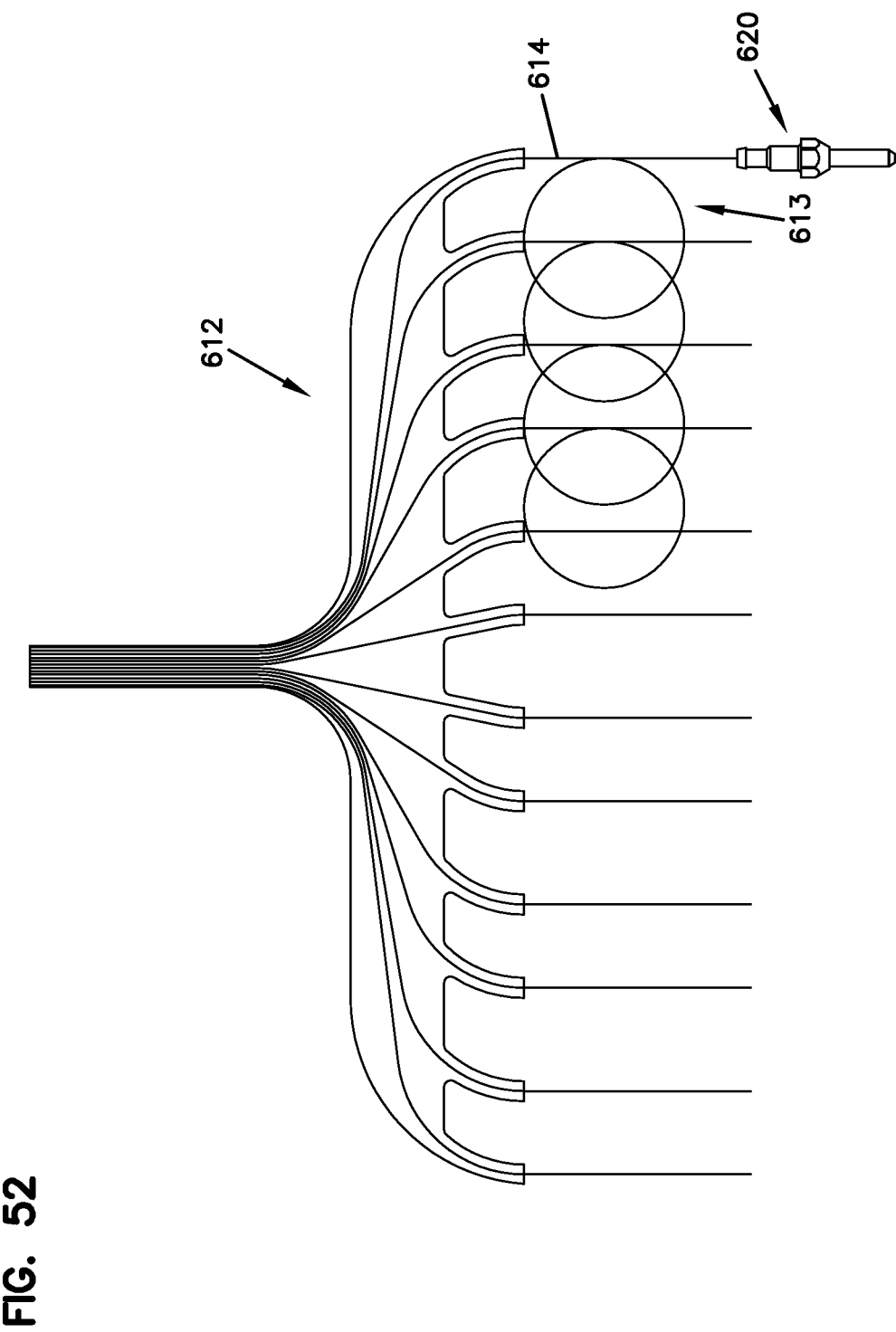
FIG. 52 is a top plan view of the flexible optical circuit of FIG. 51.

Referring specifically now to FIGS. 51-52, according to one embodiment methodology, a looped length 613 of buffered fiber 614 may be stored within the cassette between the flexible substrate 624 and each of the non-conventional connectors 620. If one of the terminations fails, a technician would be able to unloop the length 613 of fiber 614 and reterminate, saving the rest of the flexible circuit 612.

According to another methodology, as illustrated in FIGS. 53-61, instead of utilizing a single flexible substrate for all of the fibers relayed from the multi-fiber connector 716, a plurality of separate duplex substrates 724 can be used in a stacked arrangement. Each duplex stack can be mounted removably on the cassette and may be removed for repair or replacement if one of the terminations fails.

Figure 53:
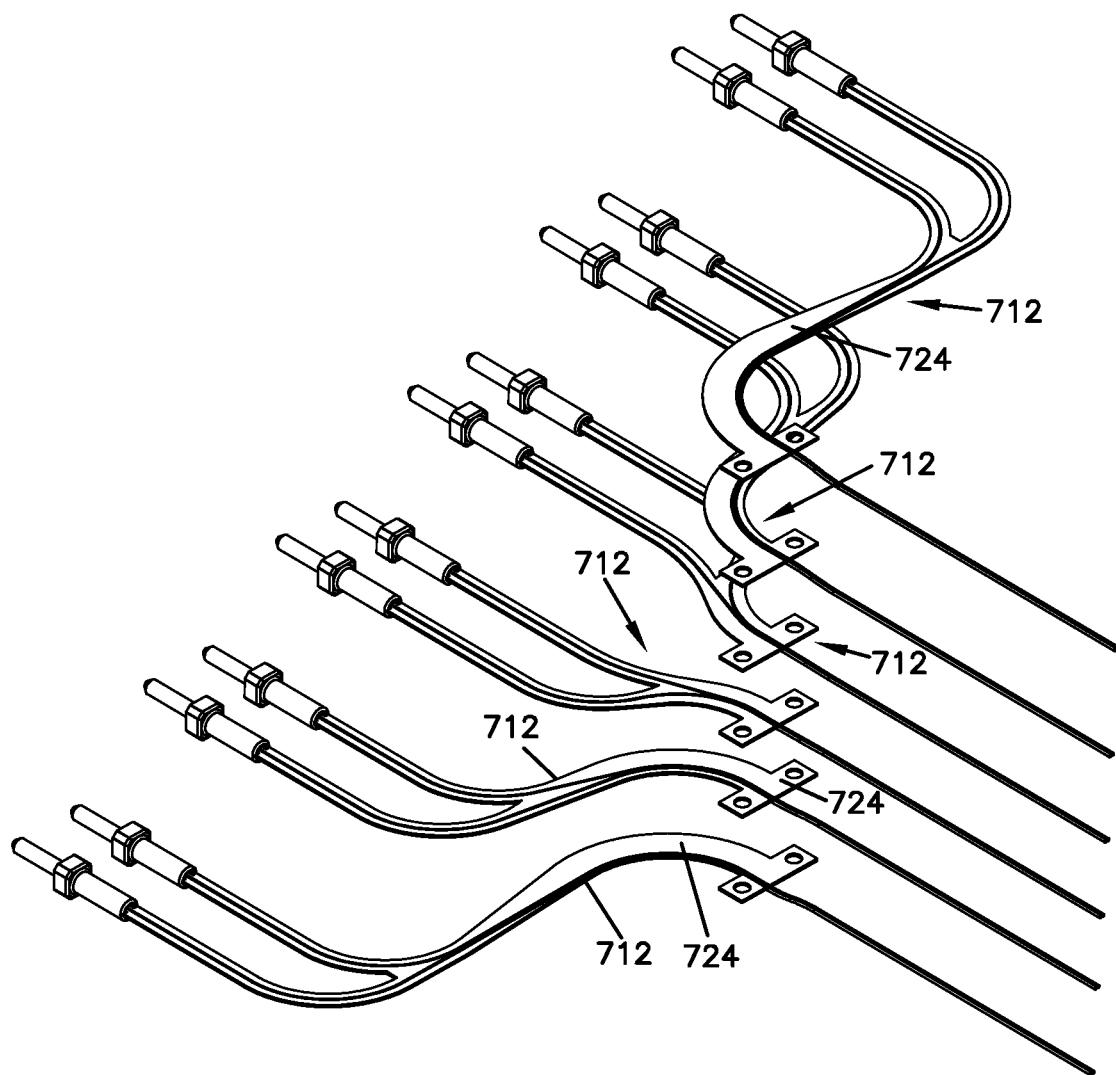
FIG. 53 illustrates a perspective view of a plurality of duplex flexible optical circuits in an exploded configuration, the duplex flexible optical circuits configured to be placed within the fiber optic cassettes of the present disclosure in a stacked arrangement.
Figure 54A:
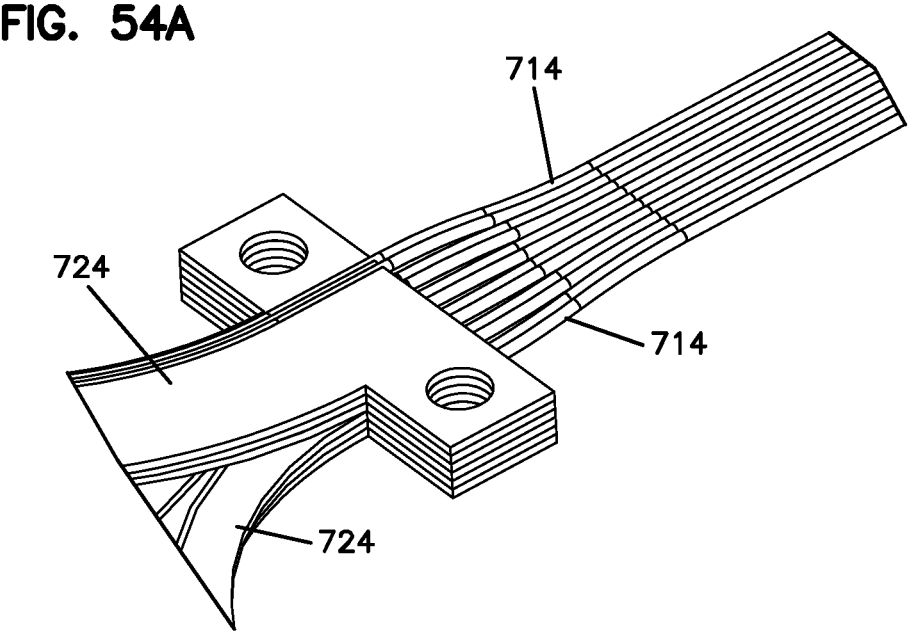
FIG. 54A is a close-up view illustrating the transition region of the stacked duplex flexible optical circuits of FIG. 54, wherein the fibers transition from a stepped configuration of the stacked circuits to a ribbonized flat section for termination to a multi-ferrule connector.
Figure 55A:
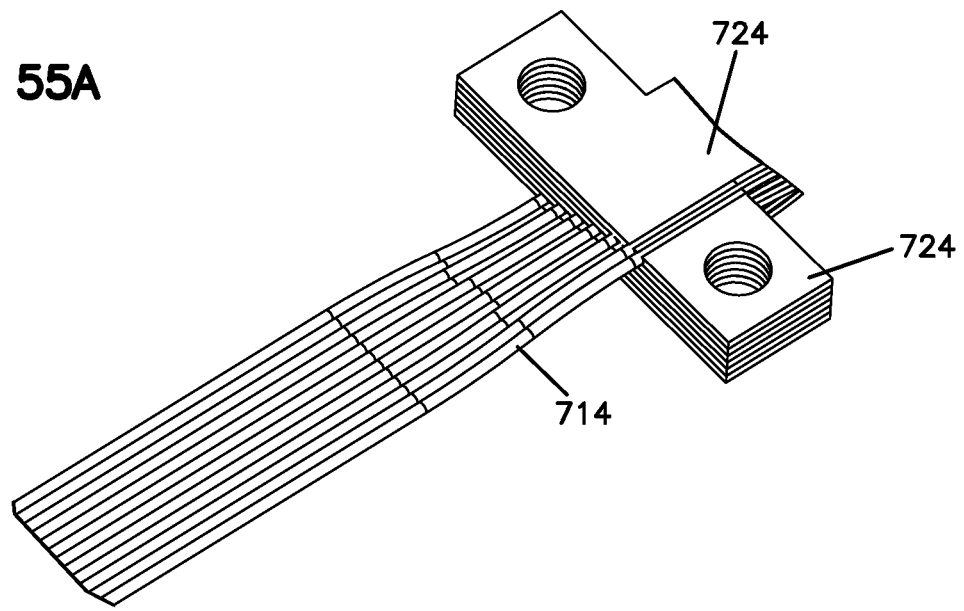
FIG. 55A is a close-up view illustrating the transition region of the stacked duplex flexible optical circuits of FIG. 55, wherein the fibers transition from a stepped configuration of the stacked circuits to a ribbonized flat section for termination to a multi-ferrule connector.
Figure 55:
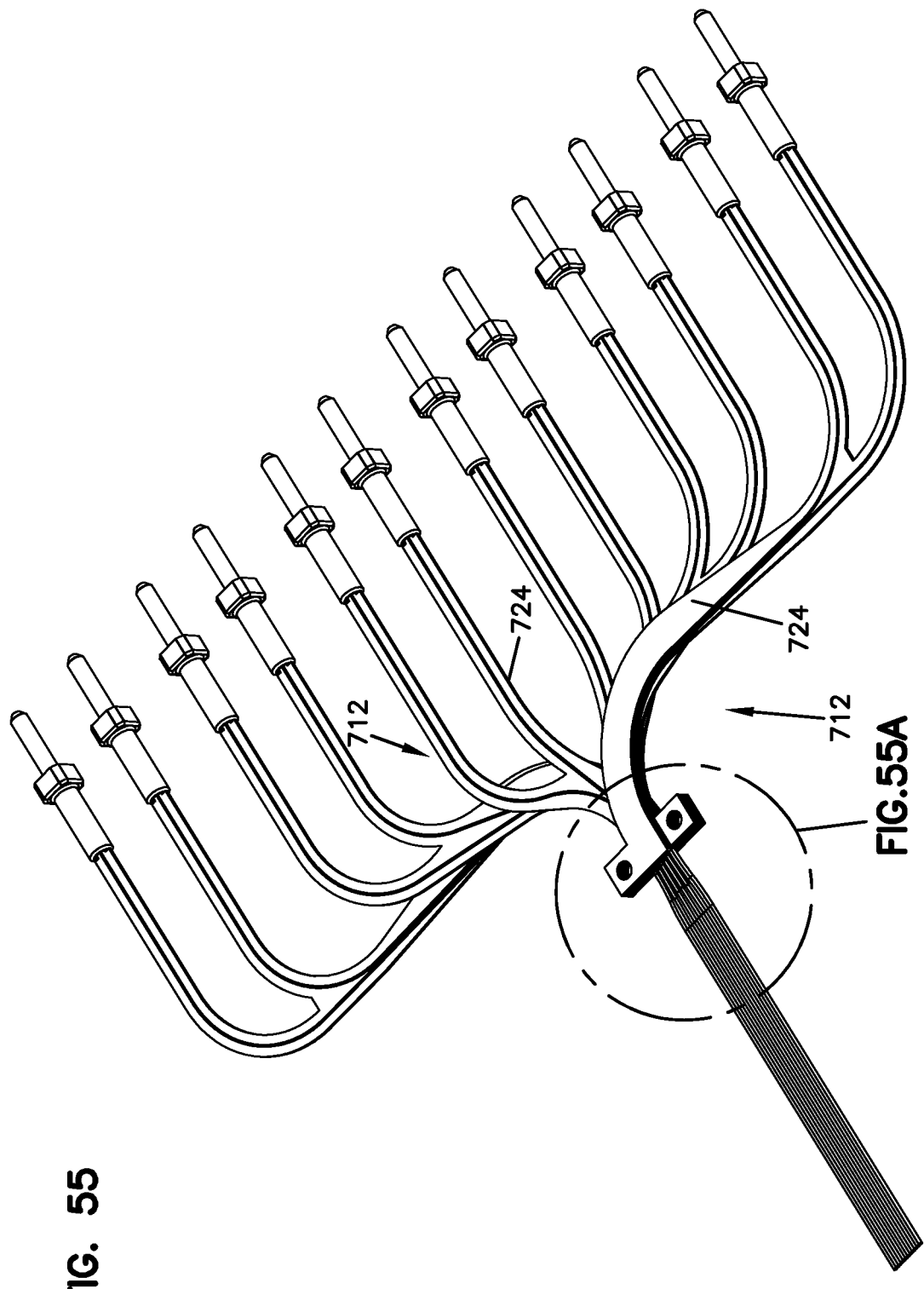
FIG. 55 illustrates a top, rear, left side perspective view of the plurality of duplex flexible optical circuits of FIG. 53 in a stacked arrangement.
Figure 56:
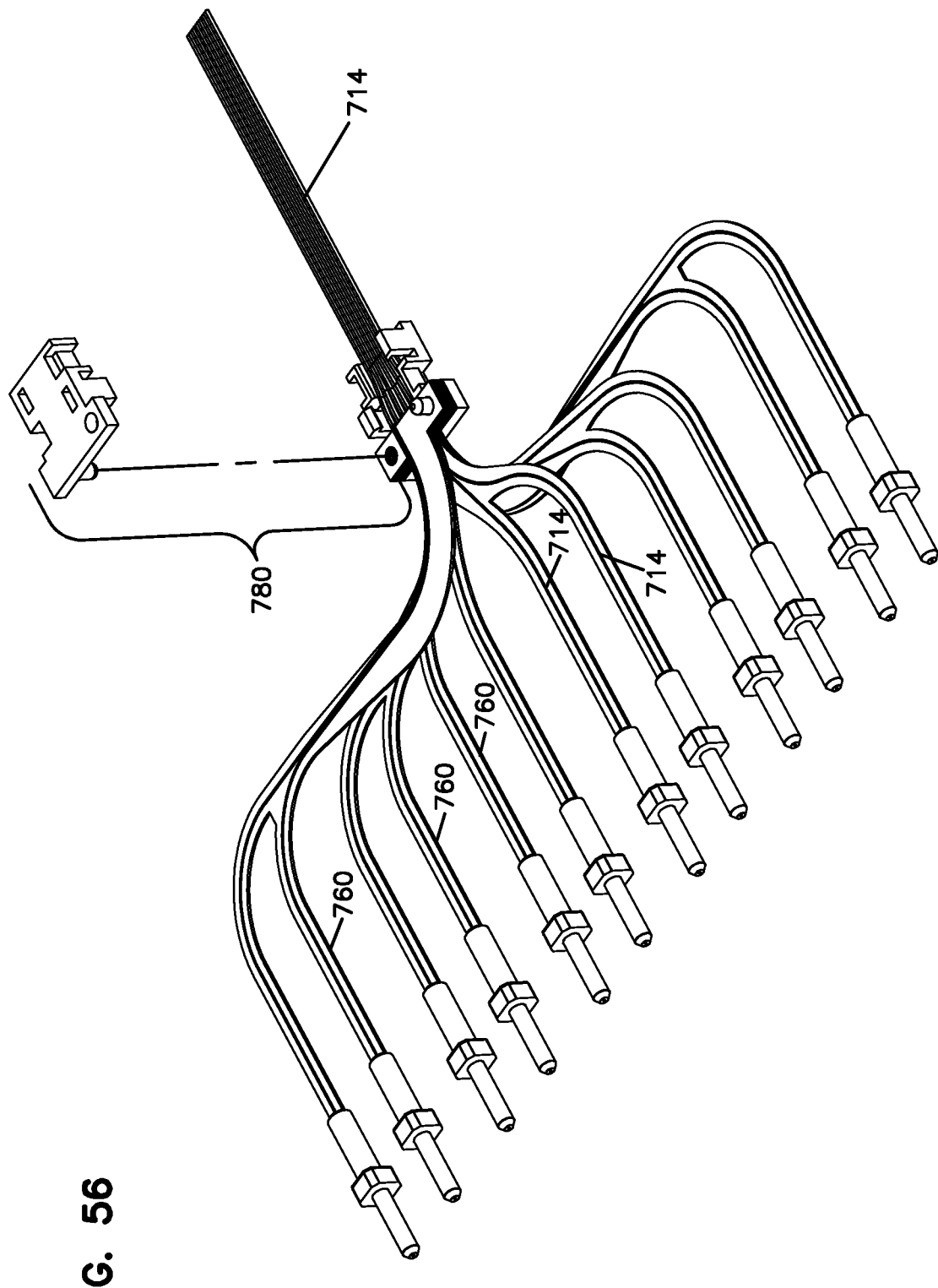
FIG. 56 is a top, front, right side exploded perspective view of a clamp structure used for clamping the plurality of duplex flexible optical circuits of FIG. 53 in a stacked arrangement, the clamp structure shown with the stack of the duplex flexible optical circuits placed therein.
Figure 57A:
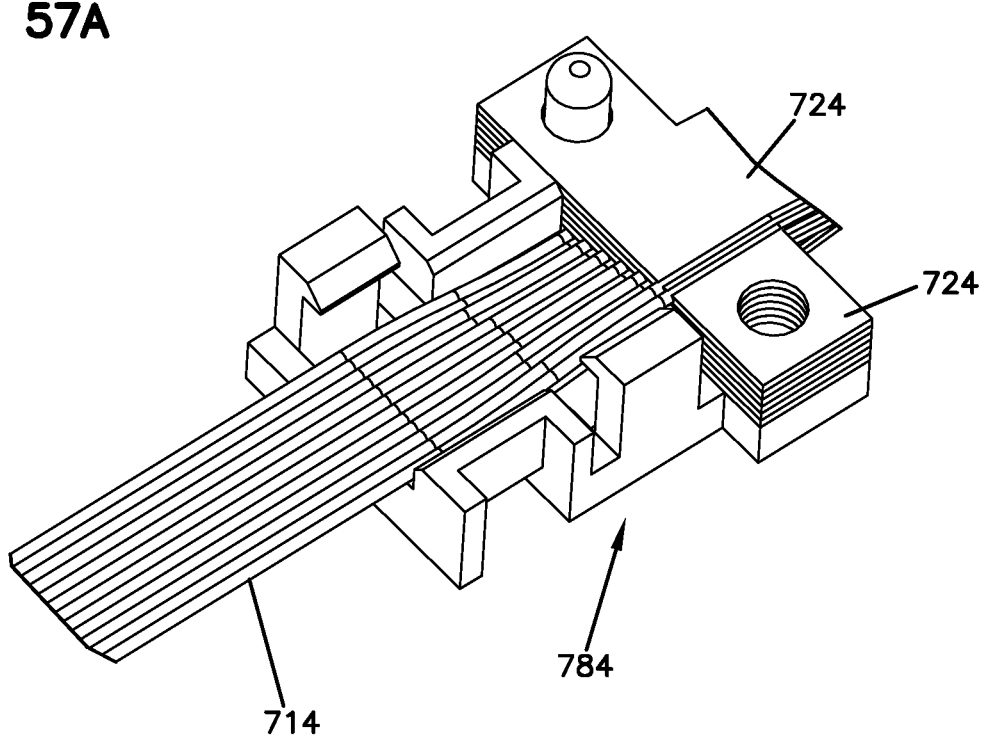
FIG. 57A is a close-up view illustrating the transition of the stacked duplex flexible optical circuits provided by the lower member of the clamp structure of FIG. 57.
Figure 60A:
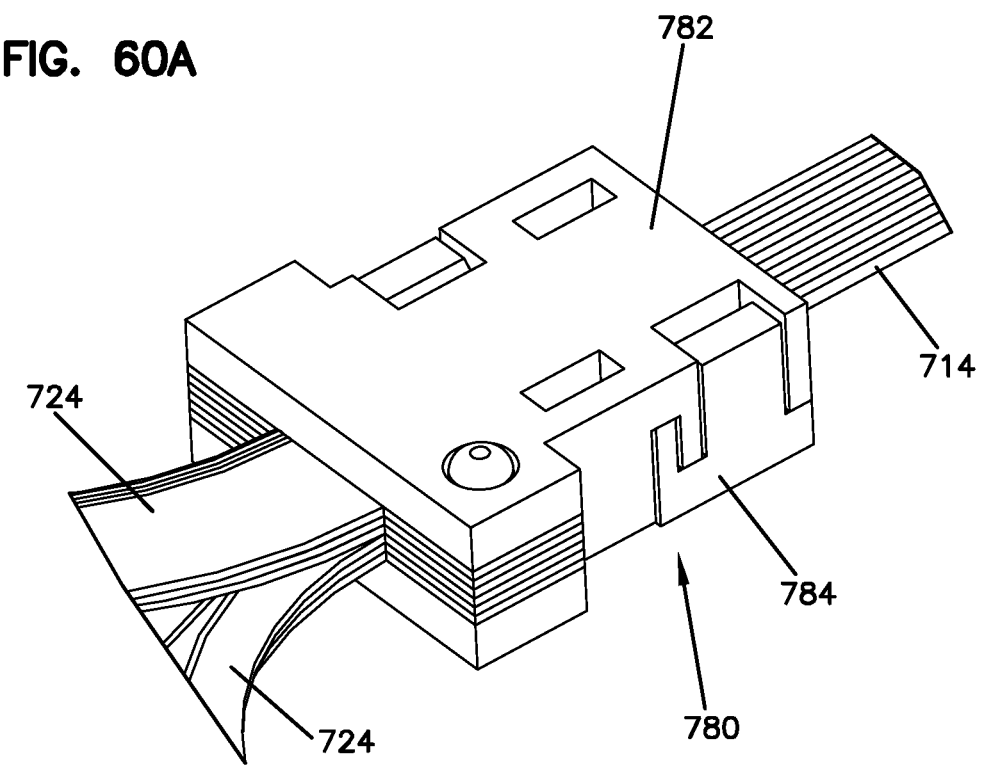
FIG. 60A is a close-up view illustrating the clamp structure of FIG. 60.
Figure 58:
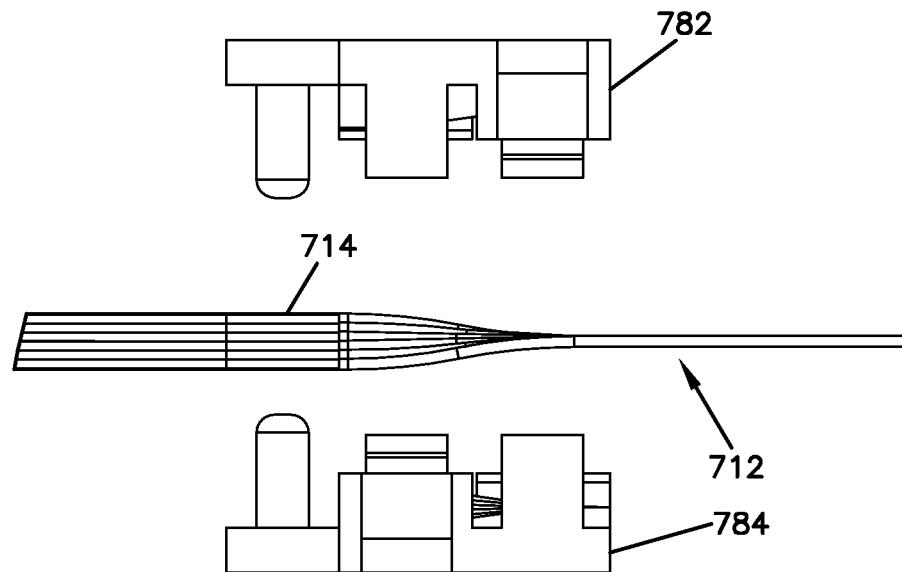
FIG. 58 is a right side exploded perspective view of the clamp structure of FIG. 56 and the plurality of duplex flexible optical circuits of FIG. 53.
Figure 59:
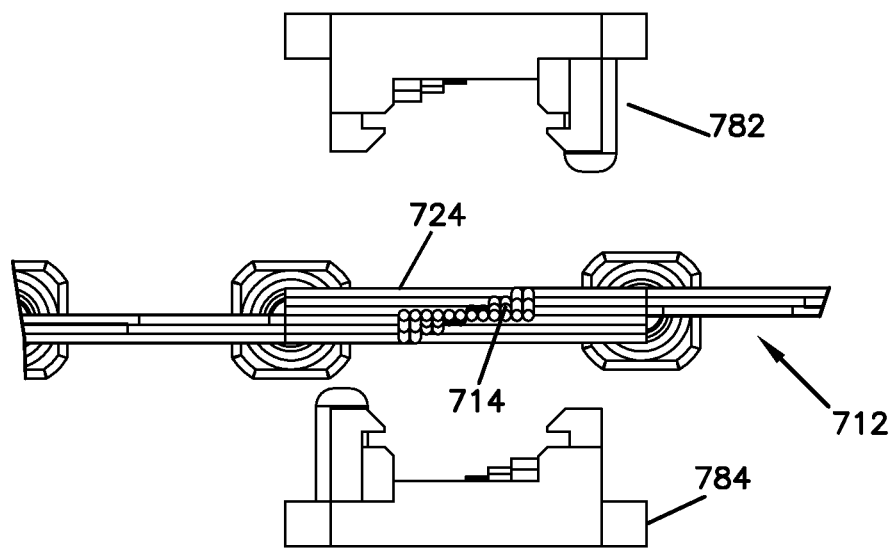
FIG. 59 is a rear exploded perspective view of the clamp structure of FIG. 56 and the plurality of duplex flexible optical circuits of FIG. 53.
Figure 60:
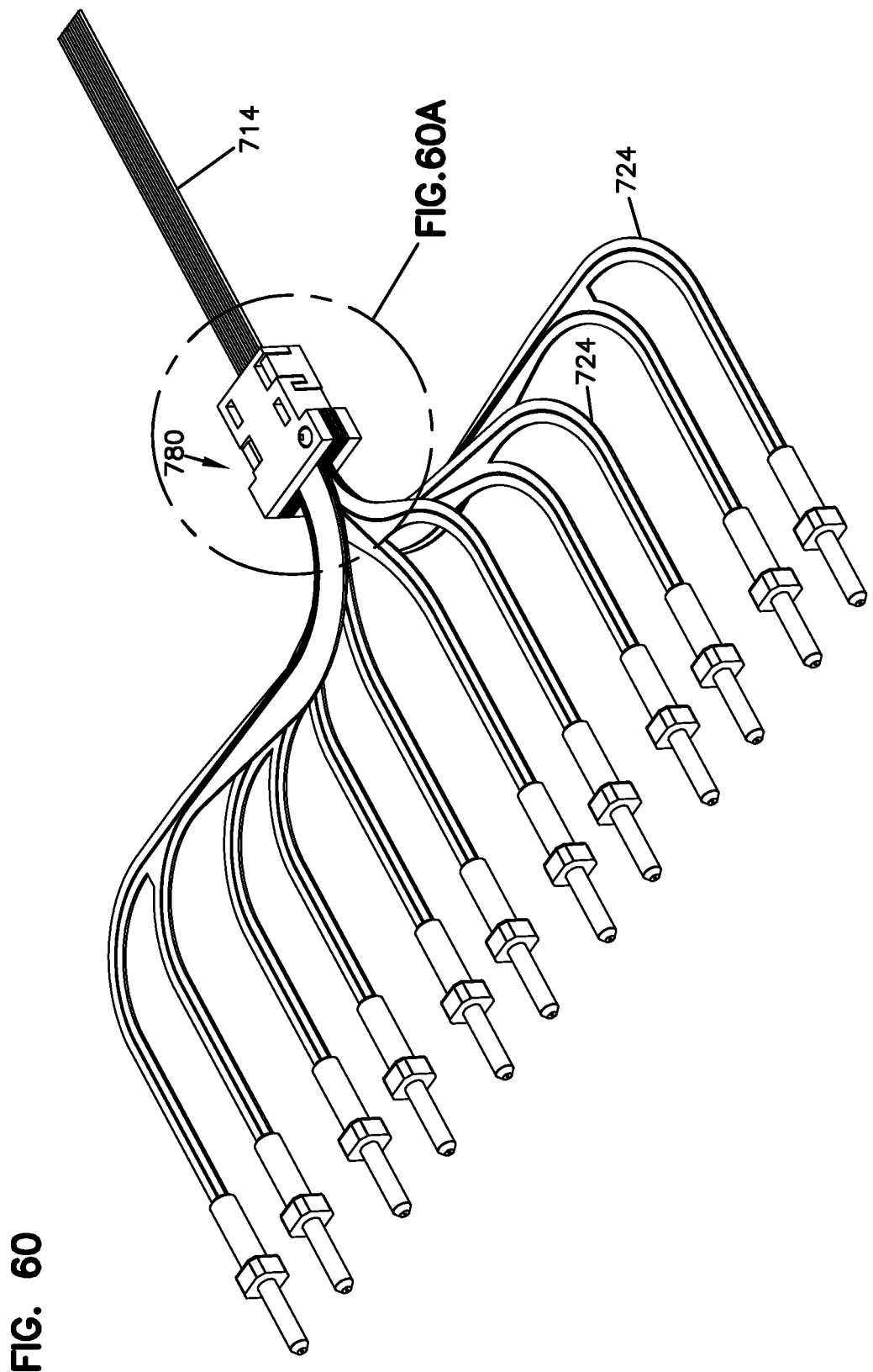
FIG. 60 illustrates the clamp structure of FIG. 56 and the plurality of duplex flexible optical circuits of FIG. 53 in a clamped arrangement.
Figure 61:
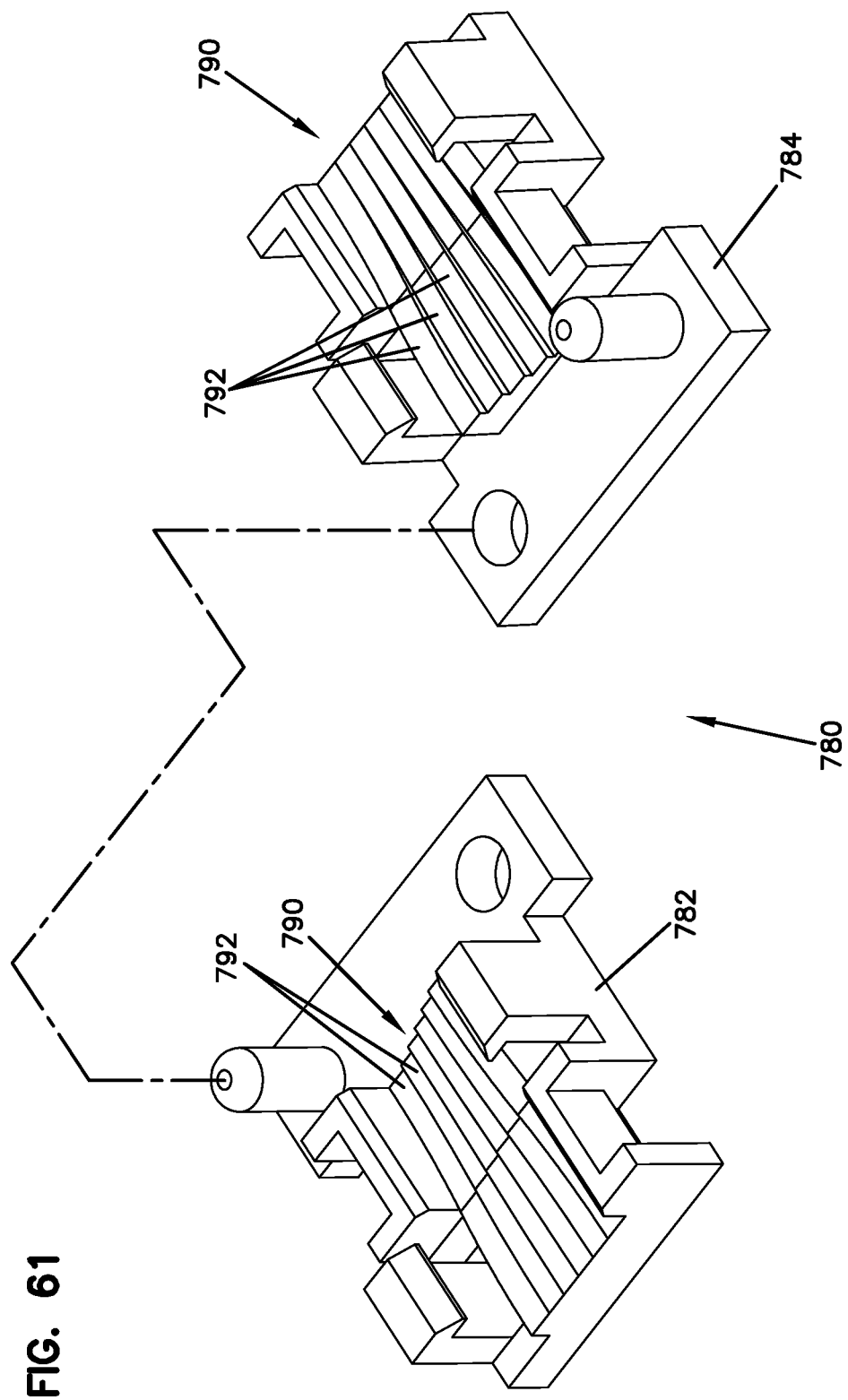
FIG. 61 illustrates the upper and lower members of the clamp structure of FIG. 56.

As shown in FIGS. 53-61, according to one embodiment, there may be six duplex flex circuits 712 including six substrates 724, totaling the twelve fibers 714 coming from an MPO connector. In such an embodiment, all six of the substrates 724 may be provided by, for example, manufacturing three different shapes and then flipping the three differently shaped substrates 180 degrees to provide the six needed duplex substrates 724 for the whole stack. As shown in FIGS. 53-55, the three different shapes would be configured such that, when stacked, front extensions 760 of the substrates 724 would be spaced apart to resemble the front extensions (e.g., 60, 160) of a single integral substrate (e.g., 24, 124, 224) and to fit within the internal configuration of a given cassette.

Referring now to FIGS. 54-61, since the portion of the fibers 714 that are to be terminated to the MT ferrule of an MPO connector have to be provided in a flat, ribbonized configuration for the termination and since the stacked flex circuits 712 have the fibers 714 in a stepped configuration, a clamp structure 780 that acts as a fiber transition device may be used within the cassette 712.

As shown in FIGS. 54-61, the clamp structure 780 may include an upper member 782 that is snap fit to a lower member 784 with cantilever arms 786 that have tapered tabs 788. Both the upper and the lower members 782, 784 of the clamp structure 780 provide a fiber channel/guide 790 that includes steps 792 for transitioning the fibers 714 from a stepped configuration to a flat configuration for terminating to the MT ferrule 756 of an MPO connector 716. The clamp 780 is designed such that stacked flex fibers 714 are converted to a linear plane so they can be ribbonized while maintaining the minimum bend radius requirements of the fibers 714. The upper and lower members 782, 784 of the clamp structure 780 removably snap together for both holding the stacked substrates 724 in position and for controlling the transition of the fibers 714 while supporting bend radius limitations. If any of the flex substrates, the ferrules, or the fibers are damaged, the clamp structure 780 can be taken apart, removing the flex substrate 724 to be repaired or replaced.

According to certain embodiments, any of the cassettes described above and illustrated herein may have a length of 3 to 4 inches (parallel to the longitudinal direction A), a width of 2 to 3 inches (front to back), and a height of approximately ½ inch. More preferably, the length may be 3 to 3½ inches, the width may be 2 to 2½ inches, and the height may be ½ inch. The height can vary as needed, such as to accommodate different formats of adapters 5 or multiple rows of adapters 5.

Figure 62:
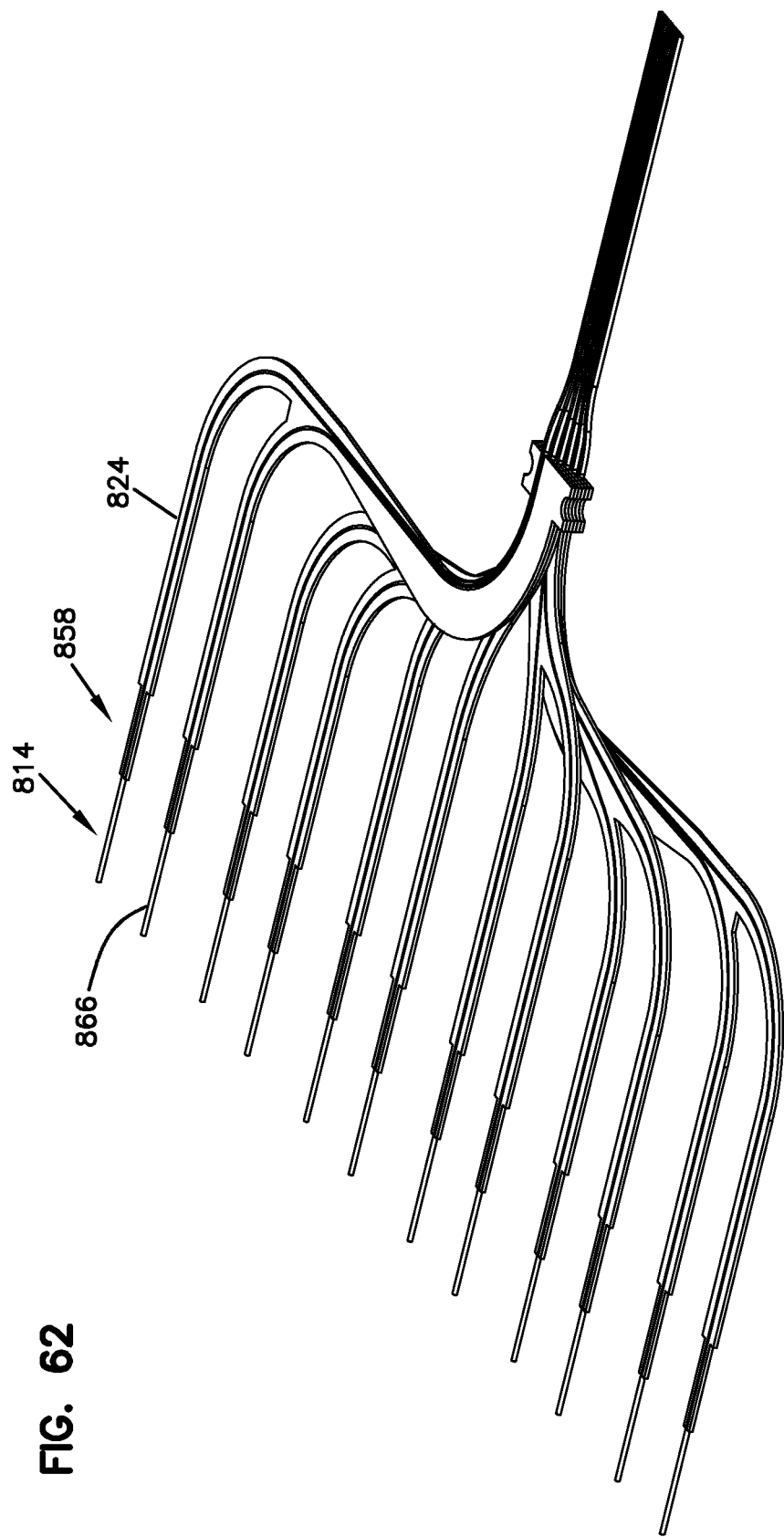
FIG. 62 is a top, rear, right side perspective view of a plurality of duplex flexible optical circuits similar to those of FIGS. 53-55 in a stacked arrangement, the duplex flexible optical circuits shown in an unterminated configuration.
Figure 63:
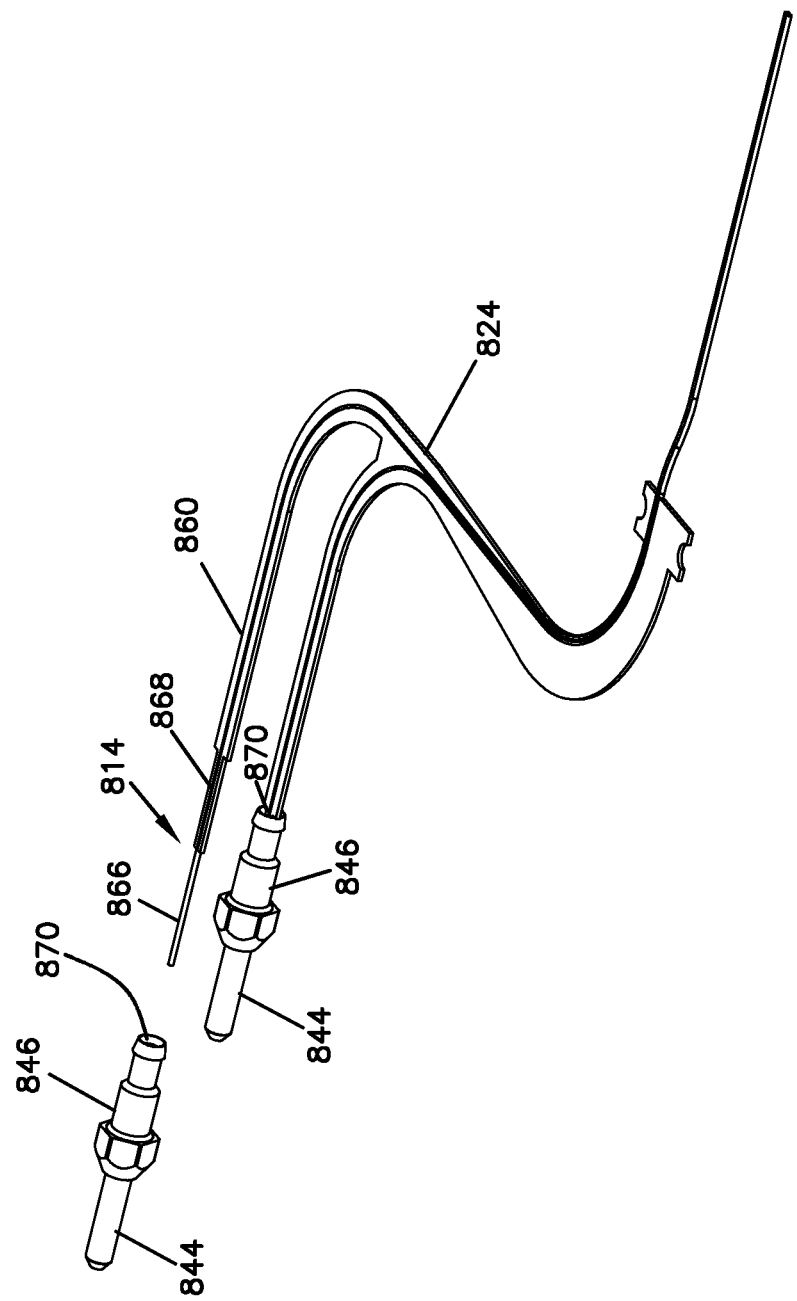
FIG. 63 illustrates one of the duplex flexible optical circuits of FIG. 62, wherein one of the pigtails is shown as terminated to a ferrule assembly and the other of the pigtails shown exploded off a ferrule assembly.
Figure 64:
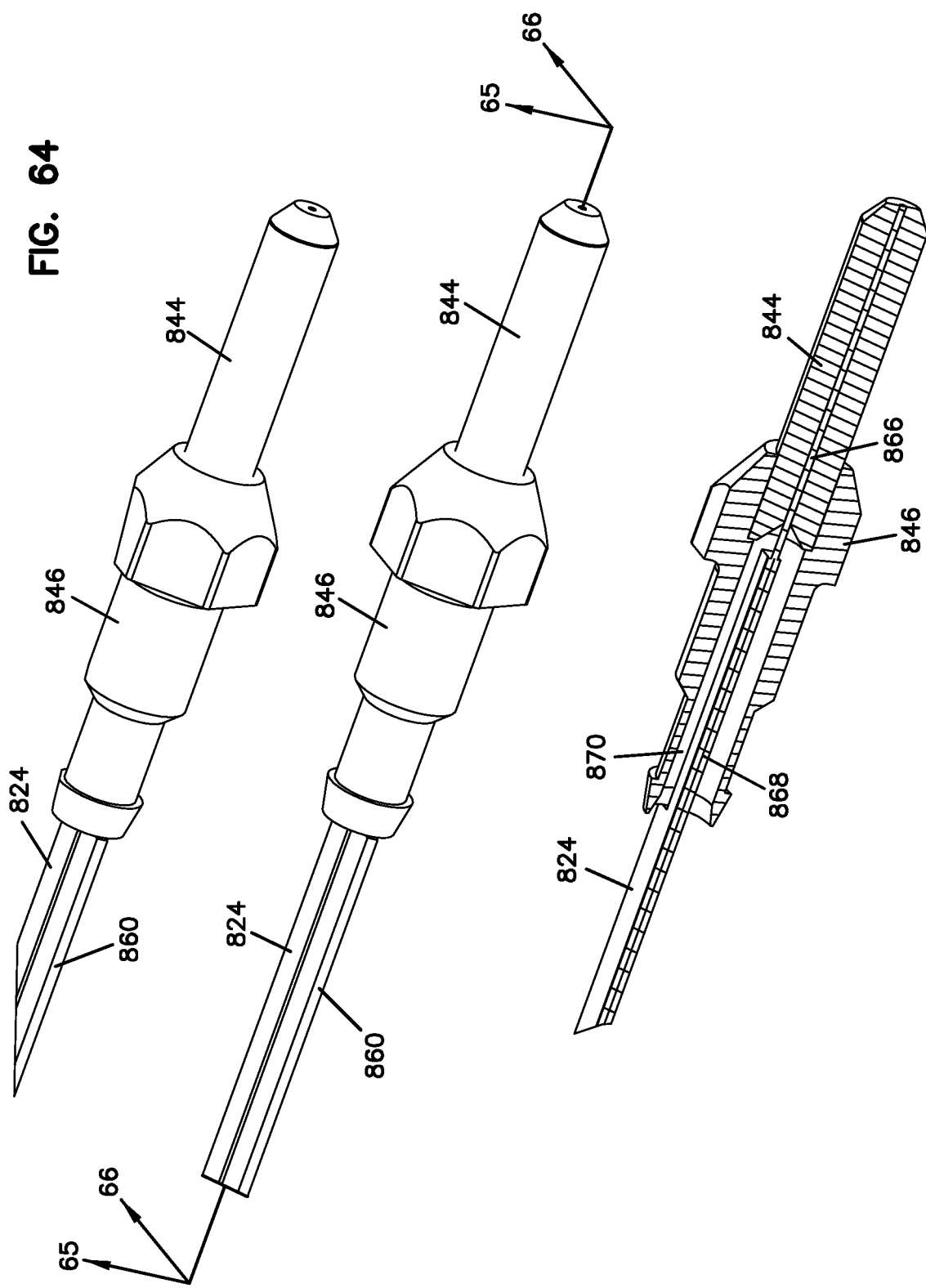
FIG. 64 illustrates a plurality of ferrule assemblies that have been terminated to the pigtails of the flexible optical circuits of FIGS. 62-63, wherein one of the terminated ferrule assemblies is shown in a cross-sectional view bisecting the ferrule assembly along its longitudinal axis.
Figure 65:
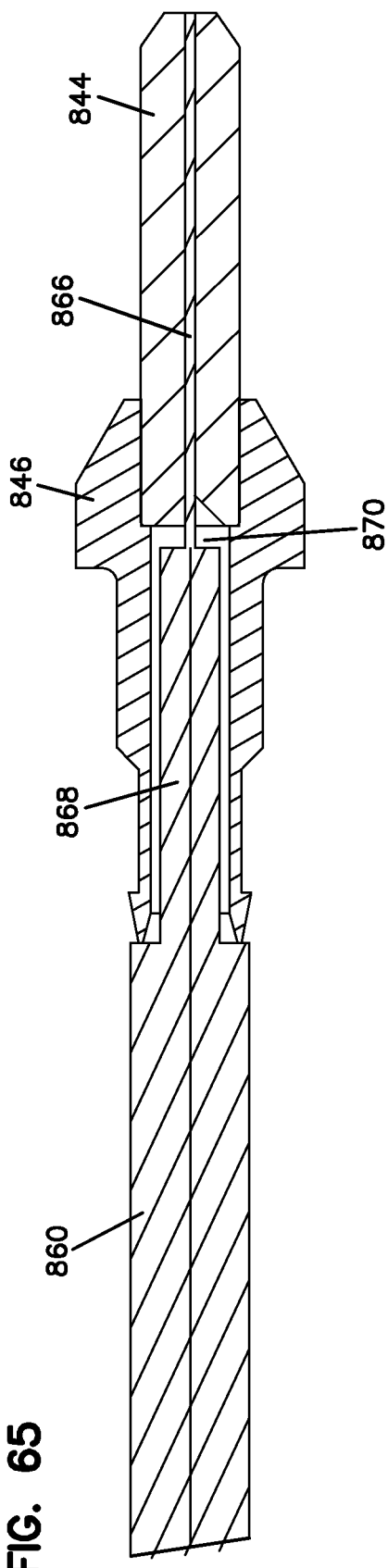
FIG. 65 is a cross-sectional view taken along line 65-65 of FIG. 64.
Figure 66:
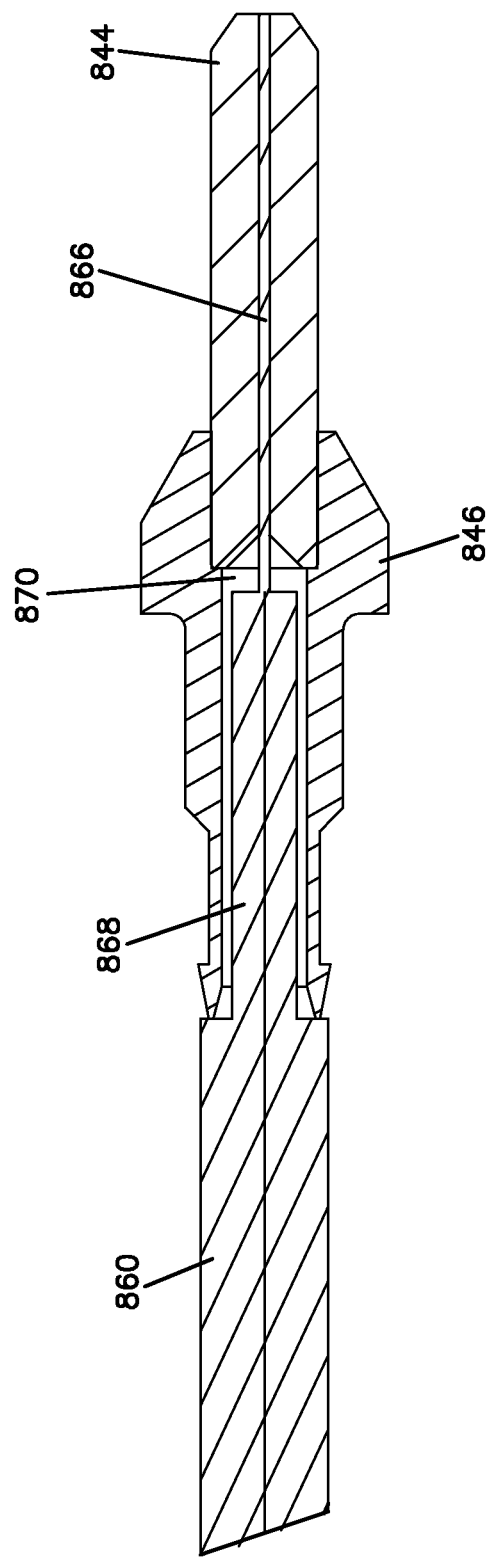
FIG. 66 is a cross-sectional view taken along line 66-66 of FIG. 64.
Figure 67:
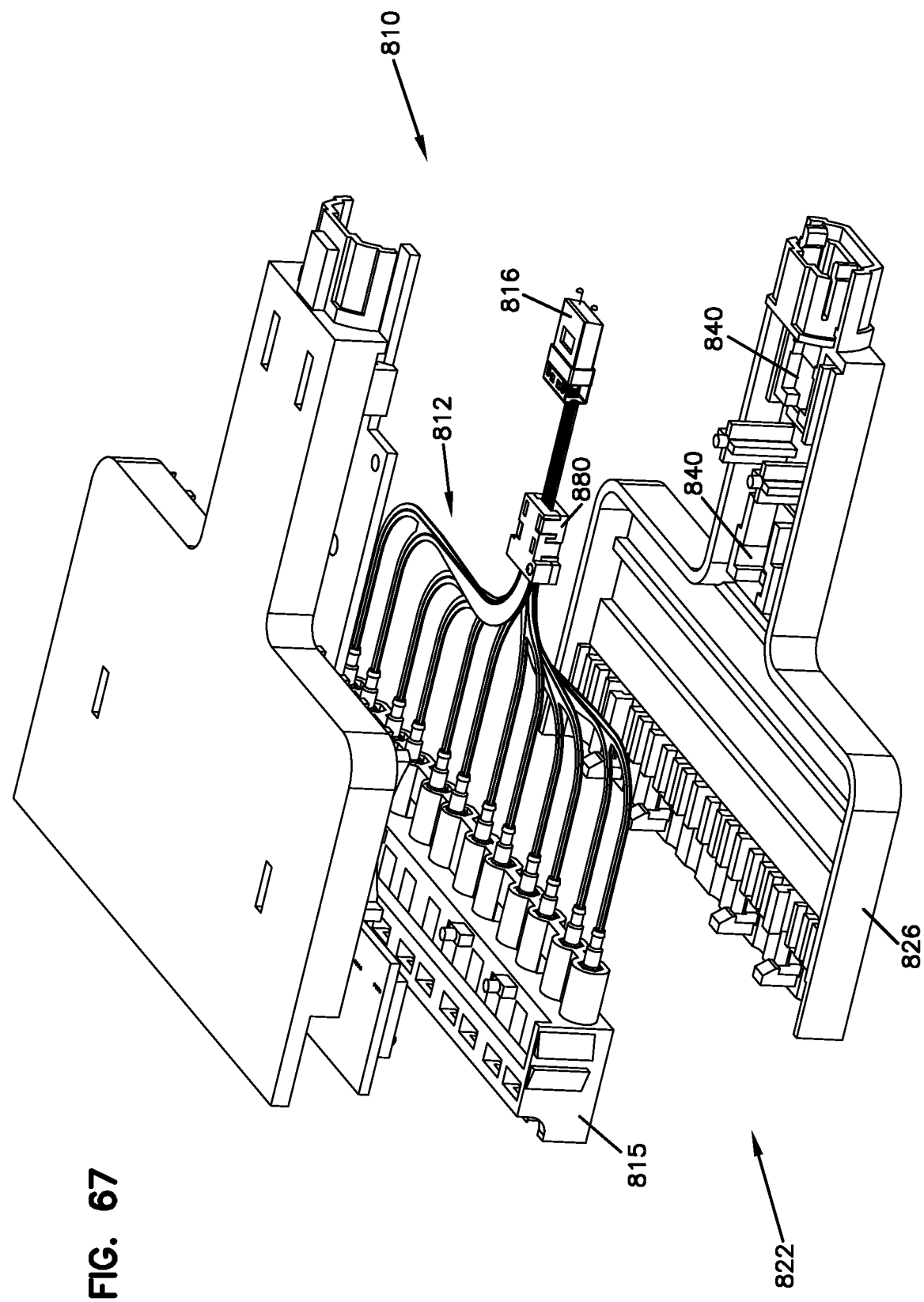
FIG. 67 is a top, rear, right side perspective view of another embodiment of a fiber optic cassette having features that are examples of inventive aspects in accordance with the present disclosure, the fiber optic cassette configured to house the duplex flexible optical circuits shown in FIGS. 62-64, the fiber optic cassette shown in a partially exploded configuration.
Figure 68:
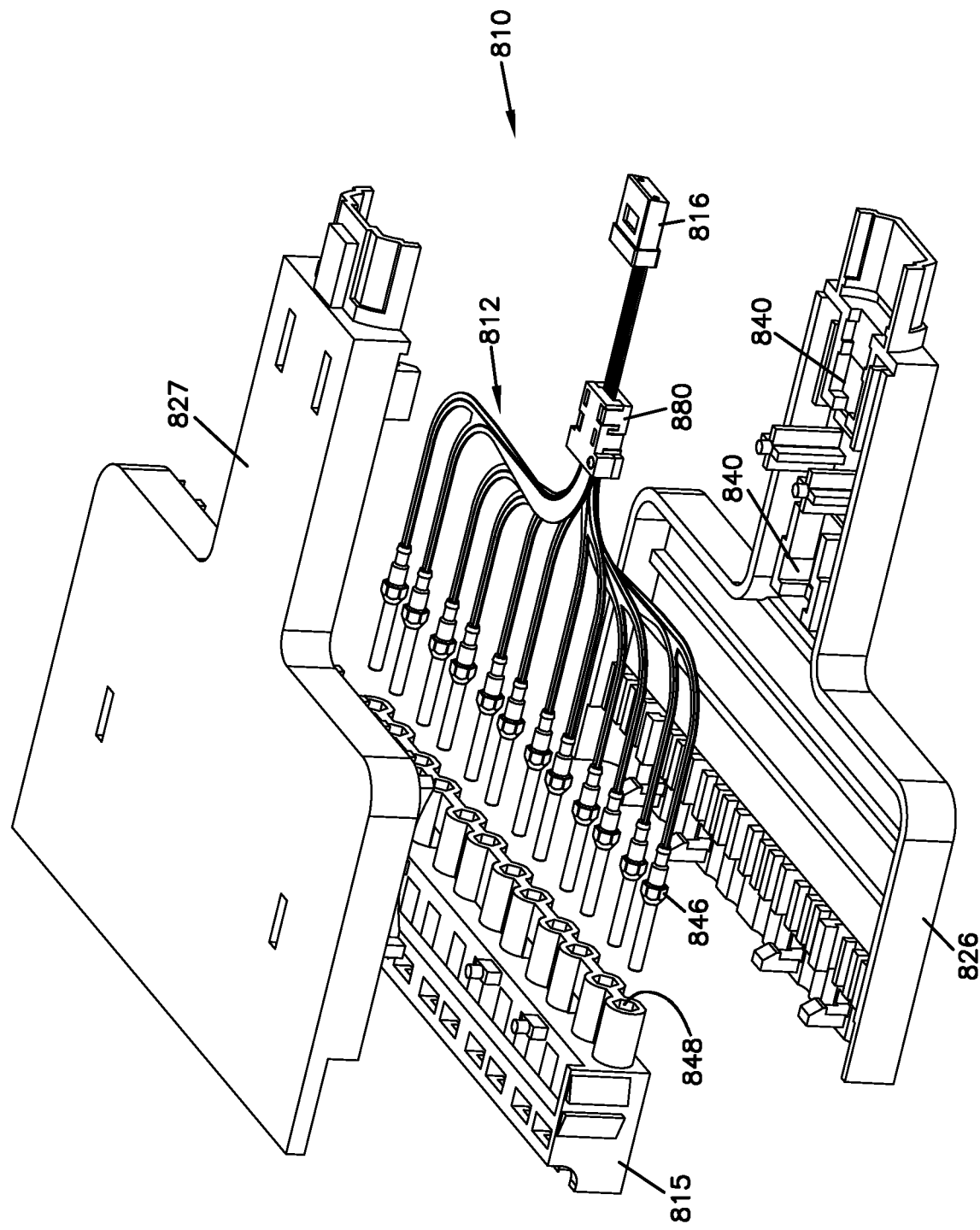
FIG. 68 illustrates the fiber optic cassette of FIG. 67 with the ferrule assemblies of the flexible optical circuits removed from the pockets of the adapter block of the cassette.
Figure 69:
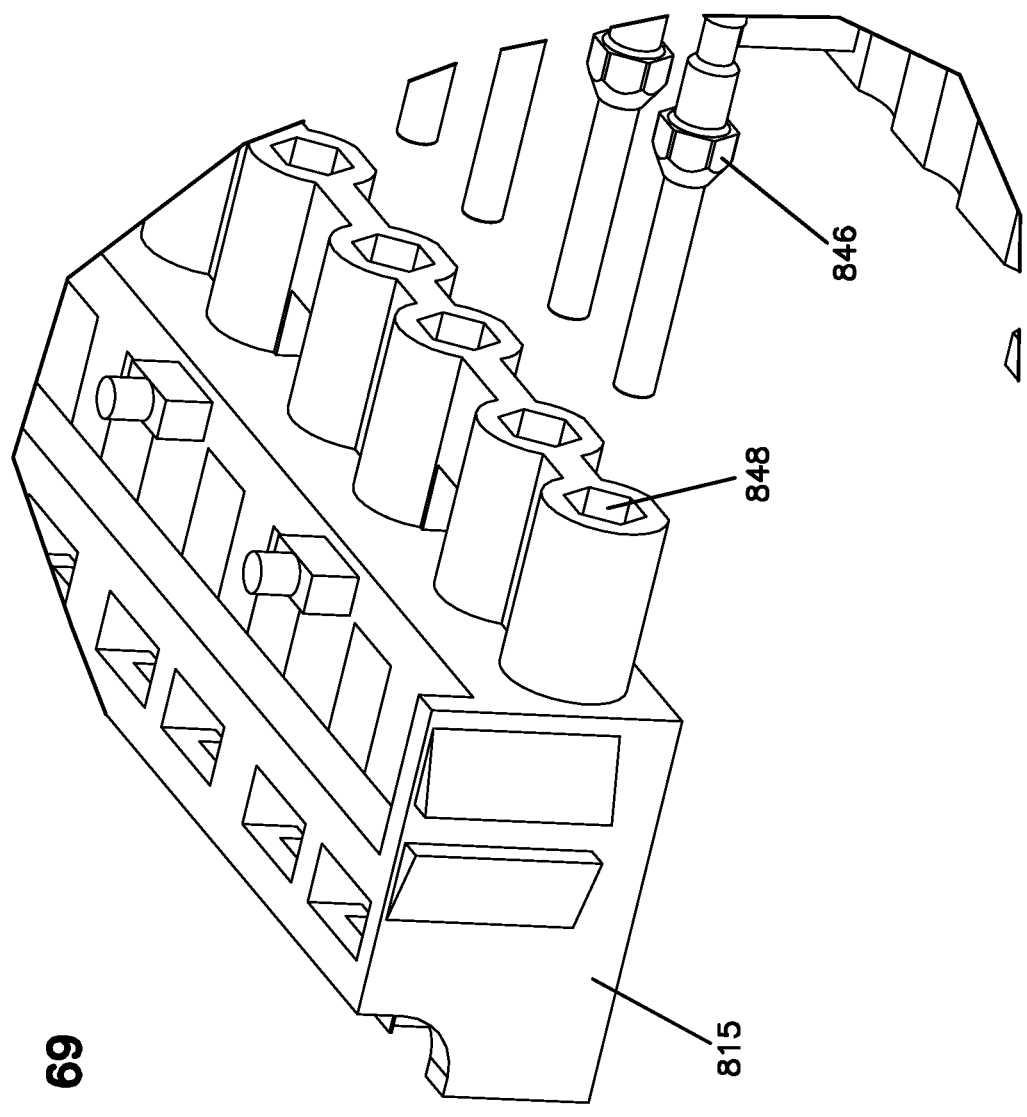
FIG. 69 is a close-up view of a portion of the fiber optic cassette of FIG. 68.
Figure 70:
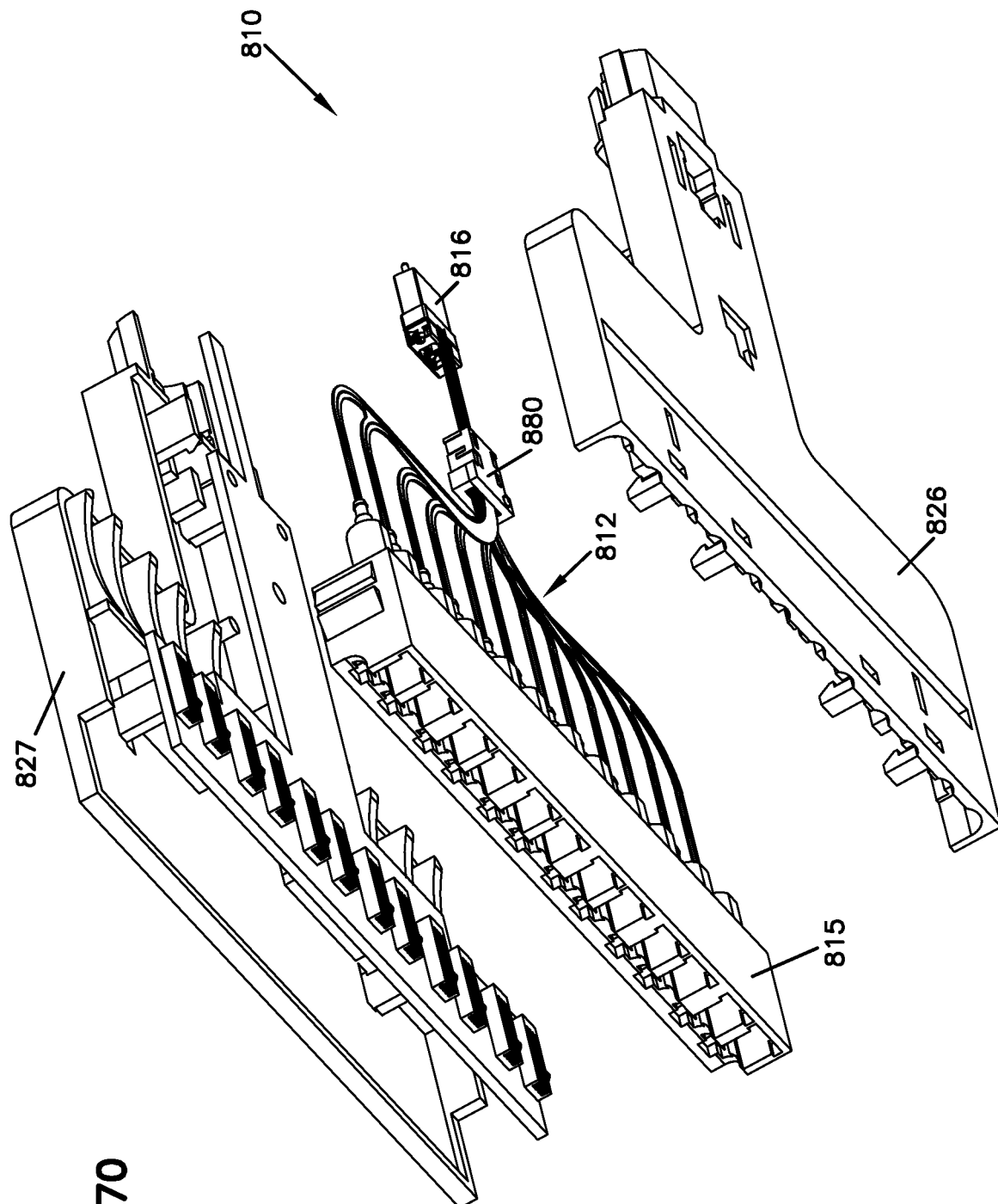
FIG. 70 illustrates the fiber optic cassette of FIG. 67 from a front, bottom, right side perspective view, the cassette shown in a partially exploded configuration.
Figure 71:
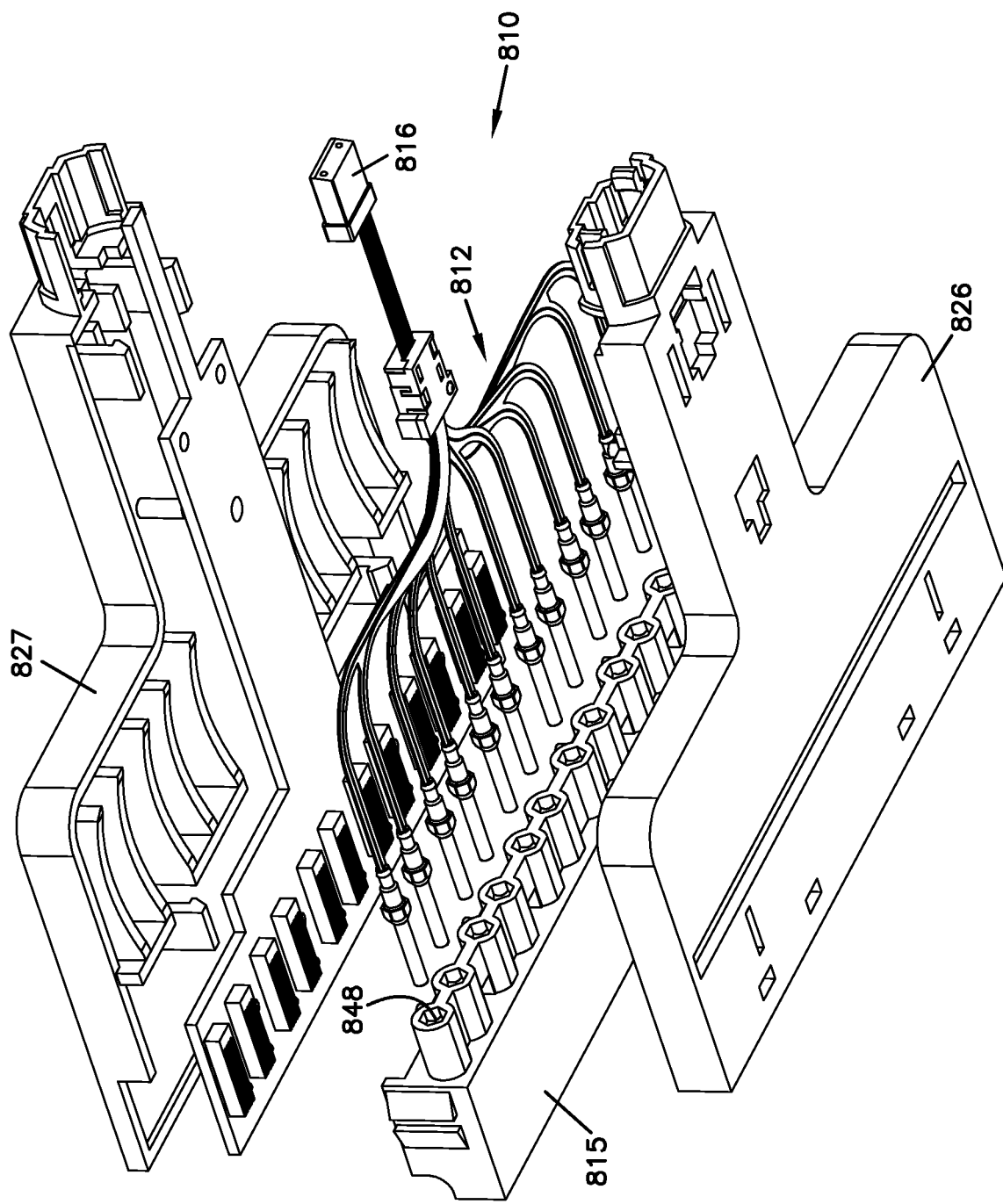
FIG. 71 illustrates the fiber optic cassette of FIG. 68 from a rear, bottom, right side perspective view.
Figure 72:
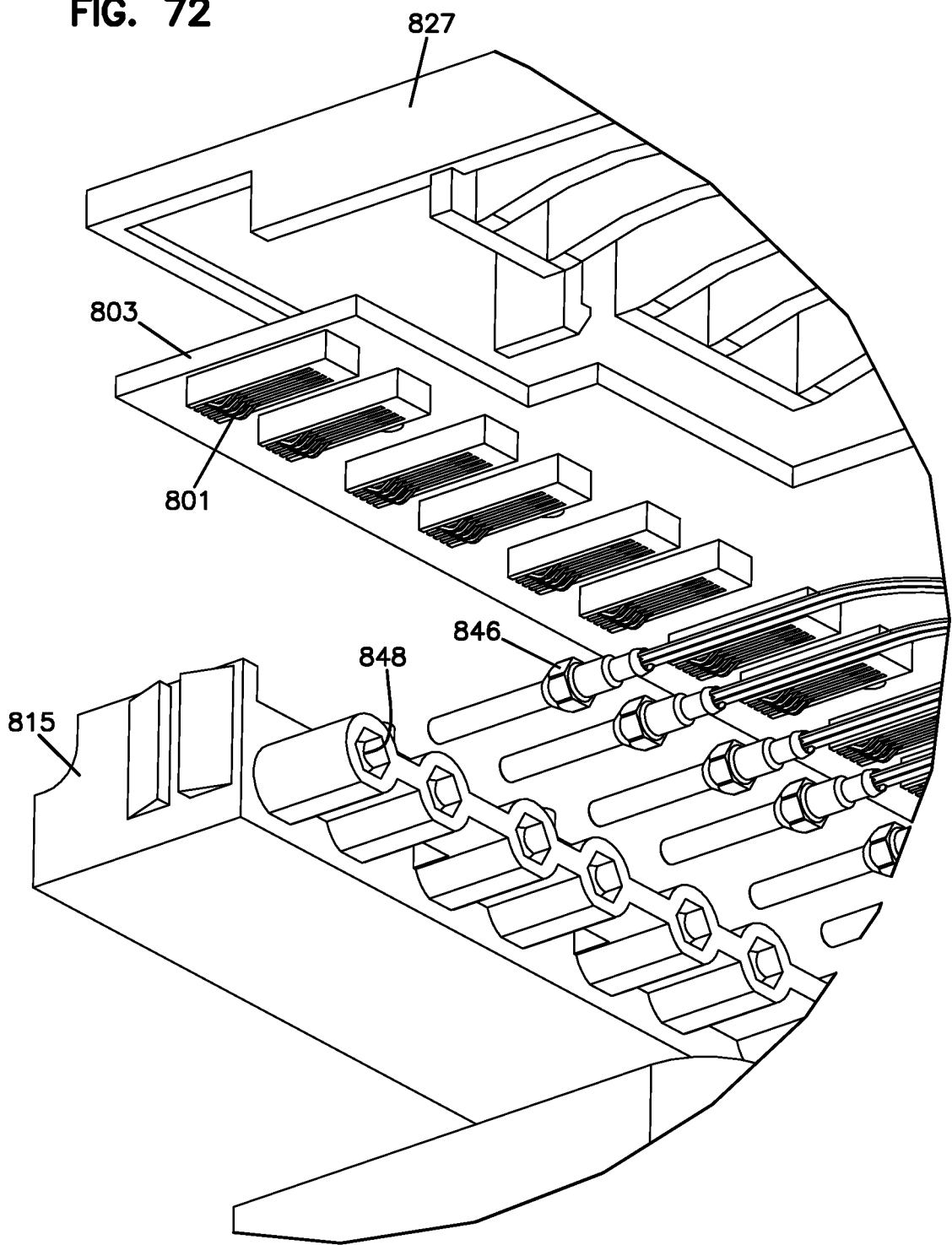
FIG. 72 is a close-up view of a portion of the fiber optic cassette of FIG. 71.

Referring now to FIGS. 62-66, another example method for terminating a fiber pigtail 814 extending out from a front end 858 of a flex substrate 824 to a ferrule of a non-conventional connector is illustrated. In the depicted embodiment, duplex flex circuits 812 similar to flex circuits 712 discussed above are used to illustrate the example termination method. As shown in FIG. 62, such duplex circuits 812 are provided in a stacked arrangement when being placed into a cassette body. According to the embodiment shown in FIGS. 62-66, the pigtails 814 that are to be individually terminated to ferrules 844 are formed by stripping a portion of the flex substrate 824 (including a primary coating layer of the fiber) such that an optical fiber 866 formed from a combination of a fiber core and a cladding layer is left. In certain embodiments, the optical fiber 866 formed from the fiber core and the cladding layer may be 125 micron in cross-dimension. The primary coating layer that is stripped is generally around 250 micron in cross-dimension according to one embodiment. The optical fiber 866 extends from a portion 868 of a front extension 860 of the flex substrate 824 that is to be inserted into the ferrule hub 846. According to certain embodiments, portion 868 defines a generally square cross-sectional shape having side dimensions of 0.5 mm each. Thus, the square cross-sectional portion 868 is able to be inserted into a cylindrical bore 870 extending through the center of a ferrule hub 846, which may be about 0.9 mm in diameter (see FIGS. 63-66). The exposed optical fiber 866 that is made up of the fiber core and the surrounding cladding (after the primary coating has been stripped) is inserted into the ferrule 844, as seen in FIGS. 64-66.

Now referring to FIGS. 67-73, an example of a cassette 810 that is configured for receiving stacked flex circuits such as the flex circuits 812 shown in FIGS. 62-66 is illustrated. The cassette 810 is similar in certain aspects to the cassettes 10, 110, and 210 shown in previous embodiments. However, the cassette 810 defines pockets 848 at the front end 822 of the cassette body that match the exterior shape of the ferrule hubs 846 (e.g., having hexagonal footprints), wherein the pockets 848 are configured to fully surround the ferrule hubs 846. The pockets 848 are formed from portions of the cassette body that are integrally formed with the adapter block 815 of the cassette 810. As shown, the adapter block 815 is removably inserted into the cassette body 826. The pockets 848, also having a hexagonal configuration, match the exterior shape of the ferrule hubs 846 and prevent rotation of the hubs therewithin. In this manner, the hubs are retained in a stable manner during termination, assembly, polishing, etc.

Even though the ferrule hubs 846 and the matching pockets 848 have been illustrated with a hexagonal cross-section in the depicted embodiment, in other embodiments, the keying mechanism can be provided using different cross-sectional shapes having flat portions (such as square, rectangular, etc.). For example, an embodiment of a ferrule usable with the cassettes of the present disclosure having squared ferrule hubs has been shown in FIGS. 53-57 and 60.

As shown, the cassette body 826 defines pockets 840 for receiving a clamp structure 880 (similar to the clamp structure 780 of FIGS. 56-61) and an MPO connector 816 that is terminated to the rear ends of the individual duplex flex substrates 824.

Still referring to FIGS. 67-73, the embodiment of the cassette 810 used with the stacked duplex flex circuits 812 has been illustrated with further additional aspects that may be used on the cassettes (e.g., 10, 110, 210) of the earlier embodiments. For example, in accordance with some aspects, certain types of adapters that form the adapter blocks at the fronts of the cassettes may be configured to collect physical layer information from one or more fiber optic connectors (e.g., LC connectors) received thereat. Certain types of adapters may include a body configured to hold one or more media reading interfaces that are configured to engage memory contacts on the fiber optic connectors. The one or more media reading interfaces may be positioned in each adapter body in different ways. In certain implementations, the adapter body may define slots extending between an exterior of the adapter body and an internal passage in which the ferrules of the connectors are received. Certain types of media reading interfaces may include one or more contact members that are positioned in such slots. A portion of each contact member may extend into a respective one of the passages to engage memory contacts on a fiber optic connector.

Figure 73:
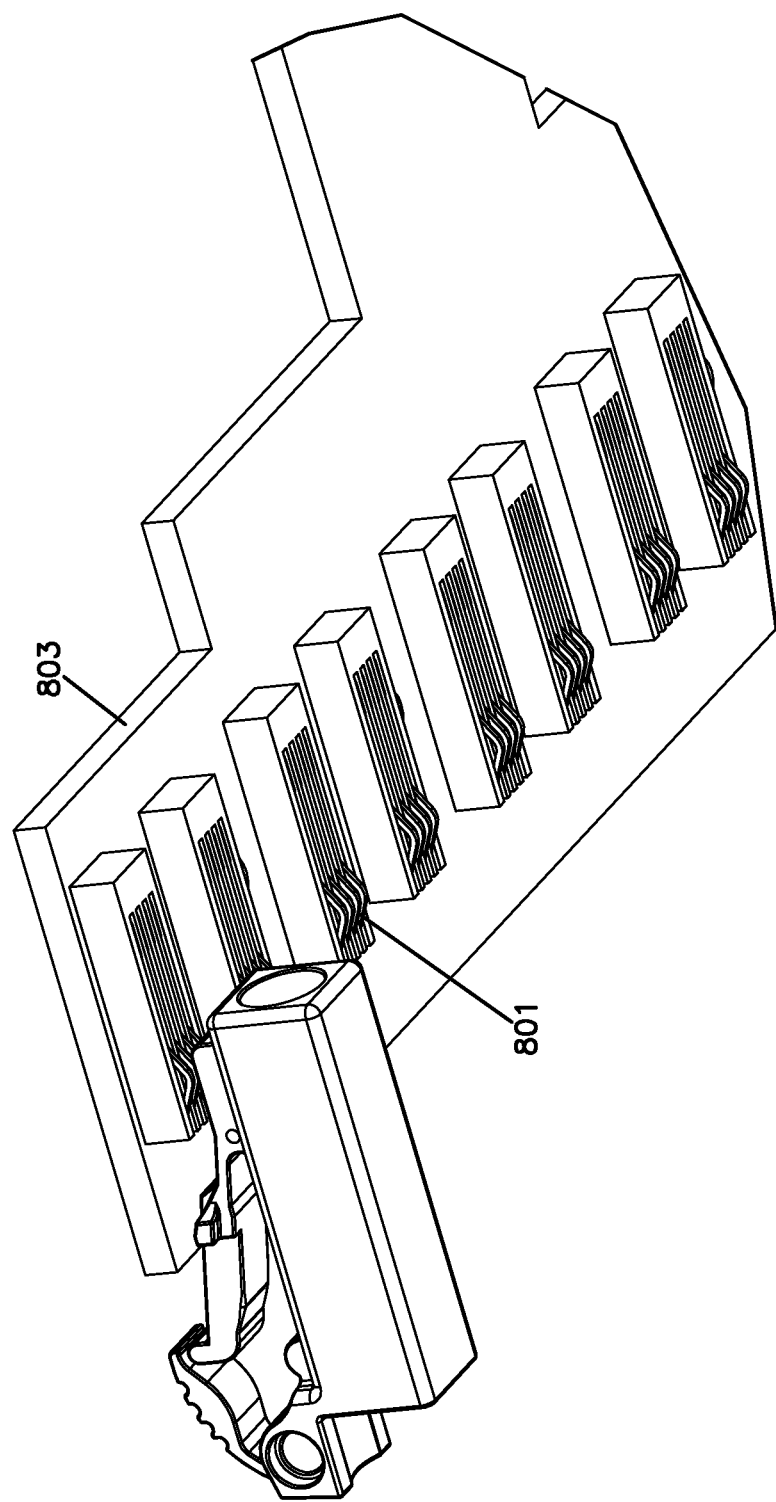
FIG. 73 illustrates a fiber optic connector making electrical contact with media reading interfaces of the printed circuit board of the cassette of FIGS. 67-72.

In the depicted example of the cassette 810 of FIGS. 67-73, the contacts 801 that extend into each of the adapter passages of the block 815 are on a removable structure. The contacts 801 are defined on a printed circuit board 803 that is placed between the flexible circuits 812 and the cover 827 of the cassette 810. The contacts 801 align with the top sides of the adapter passages and extend into the adapter passages so as to engage memory contacts of fiber optic connectors inserted into the adapter passages. The printed circuit board 803 is designed to relay the electrical signals from the contacts 801 at the front of the cassette 810 to the rear of the cassette 810 as shown in FIGS. 67-73. A conductive path may be defined by the printed circuit board 803 between the contacts 801 of the adapters at the front end with a master circuit board. The master circuit board may include or connect (e.g., over a network) to a processing unit that is configured to manage physical layer information obtained by the media reading interfaces. FIG. 73 illustrates a fiber optic connector making electrical contact with the media reading interfaces 801 of the printed circuit board 803 of the cassette 810.

Example adapters having media reading interfaces and example fiber optic connectors having suitable memory storage and memory contacts are shown in U.S. application Ser. No. 13/025,841, filed Feb. 11, 2011, entitled "Managed Fiber Connectivity Systems," the entire disclosure of which is hereby incorporated herein by reference.

In addition to the various uses and applications of the described cassettes, the cassettes can be used to terminate the fibers of a multi-fiber FOT cable, such as a 144-fiber cable, to make installation of the terminated cables easier and faster.

One advantage of the disclosed cassettes is that handling in the field of individual connectors, MPO connectors, or fanouts with upjackets are eliminated. The dimensions of the cassettes 10, 110, 210, 810 may be reduced by using flexible substrates (e.g., 24, 124, 224, 824) that allow optimization of the bend radius limits of the fibers by fixing the fibers in a given footprint or pattern. Also, manual handling and termination of individual fibers within the cassettes is reduced or eliminated, wherein automated, repeatable terminations may be provided within the cassettes.

The cassettes described and illustrated herein may be used by being mounted to different types of telecommunications fixtures. The cassettes of the present disclosure may be fixedly mounted or mounted, for example, as part of slidably movable modules or packs.

Although in the foregoing description, terms such as "top," "bottom," "front," "back," "right," "left," "upper," and "lower" were used for ease of description and illustration, no restriction is intended by such use of the terms. The telecommunications devices described herein can be used in any orientation, depending upon the desired application.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

The invention claimed is:

1. A fiber optic cassette comprising:
   a body;
   a cable entry location defined on the body for a cable to enter the cassette, wherein a plurality of optical fibers from the cable extend into the cassette body and form terminations at non-conventional connectors mounted to the body; and
   a flexible substrate positioned between the cable entry location and the non-conventional connectors of the body, the flexible substrate rigidly supporting the plurality of optical fibers;
   wherein each of the non-conventional connectors mounted to the body is formed of only a ferrule, a ferrule hub supporting the ferrule, and an alignment sleeve surrounding the ferrule.

2. A fiber optic cassette according to claim 1, wherein the substrate supports two optical fibers.

3. A fiber optic cassette according to claim 1, wherein the cassette includes twelve non-conventional connectors mounted to the body.

4. A fiber optic cassette according to claim 1, wherein the cassette defines a plurality of adapters for receiving incoming fiber optic connectors that mate with the non-conventional connectors of the body.

5. A fiber optic cassette according to claim 4, wherein the adapters are configured to receive incoming fiber optic connectors that are of the LC format.

6. A fiber optic cassette according to claim 1, wherein the substrate is configured to allow bending in a direction generally perpendicular to the direction extending from the non-conventional connectors toward the cable entry location of the cassette.

7. A fiber optic cassette according to claim 1, wherein the cable entry location is defined by a multi-fiber connector.

8. A fiber optic cassette according to claim 7, wherein the multi-fiber connector is positioned adjacent a rear of the body of the cassette and the non-conventional connectors are positioned adjacent a front of the body of the cassette.

9. A fiber optic cassette according to claim 1, wherein the flexible substrate and the non-conventional connectors of the body are removable.

10. A fiber optic cassette according to claim 1, wherein at least a portion of the flexible substrate is physically inserted into at least a portion of each ferrule hub.

11. A fiber optic cassette according to claim 1, wherein each of the non-conventional connectors is mounted to a separate front extension of the flexible substrate, the front extensions being separated by cut-outs defined by the substrate for providing separate flexibility to each front extension.

12. A fiber optic cassette according to claim 1, further including a slack length of optical fiber located between the flexible substrate and each of the non-conventional connectors of the body.

13. A fiber optic cassette according to claim 1, wherein the cable entry location is defined by a multi-fiber connector that defines a longitudinal axis that is generally perpendicular to those of the non-conventional connectors.

14. A fiber optic cassette according to claim 1, wherein the ferrule hubs of all of the non-conventional connectors of the body are integrally molded as a single piece that supports multiple ferrules.

15. A method of assembling a fiber optic cassette, the method comprising:
providing a body;
mounting a multi-ferrule connector terminated to a multi-fiber cable to the body;
separating out at least a plurality of the optical fibers of the multi-fiber cable and fixedly supporting the plurality of the optical fibers extending from the multi-ferrule connector on a flexible substrate; and
terminating each of the plurality of optical fibers supported by the flexible substrate with a non-conventional connector that is formed of only a ferrule, a ferrule hub supporting the ferrule, and an alignment sleeve surrounding the ferrule.

16. A flexible optical circuit comprising:
a flexible substrate; and
a plurality of optical fibers physically supported by the flexible substrate;
wherein a first end of each of the optical fibers is terminated to a multi-ferrule connector that is coupled to the flexible substrate and a second end of each of the optical fibers is terminated to a non-conventional fiber optic connector that is coupled to the flexible substrate, the non-conventional fiber optic connector formed of only a ferrule, a ferrule hub that supports the ferrule, and an alignment sleeve surrounding the ferrule.

17. A flexible optical circuit according to claim 16, wherein the flexible substrate is configured to allow limited amount of bending.

18. A flexible optical circuit according to claim 16, wherein the multi-ferrule connector is an MPO connector.

19. A flexible optical circuit according to claim 16, wherein the plurality of optical fibers includes at least twelve optical fibers.

20. A flexible optical circuit according to claim 16, wherein at least a portion of the flexible substrate is physically inserted into at least a portion of each ferrule hub.

21. A flexible optical circuit according to claim 16, wherein each of the non-conventional connectors is mounted to a separate front extension of the flexible substrate, the front extensions being separated by cut-outs defined by the substrate for providing separate flexibility to each front extension.

22. A flexible optical circuit according to claim 16, wherein the multi-ferrule connector defines a longitudinal axis that is generally perpendicular to those of the non-conventional connectors.

23. A flexible optical circuit according to claim 22, wherein the optical fibers follow a generally "S" shaped configuration extending between the multi-ferrule connector and the non-conventional connectors.

* * * * *